(12) United States Patent
Maruyama et al.

(10) Patent No.: US 8,116,187 B2
(45) Date of Patent: Feb. 14, 2012

(54) DESIGN METHOD OF OPTICAL ELEMENT AND OPTICAL ELEMENT THROUGH WHICH A PLURALITY OF LIGHT BEAMS HAVING DIFFERENT DESIGN WAVELENGTHS PASS

(75) Inventors: Koichi Maruyama, Tokyo (JP); Yoshiyuki Tashiro, Tokyo (JP)

(73) Assignee: Hoya Corporation, Tokyo (JP)

( * ) Notice: Subject to any disclaimer, the term of this patent is extended or adjusted under 35 U.S.C. 154(b) by 1010 days.

(21) Appl. No.: 11/289,386

(22) Filed: Nov. 30, 2005

(65) Prior Publication Data
US 2006/0114796 A1   Jun. 1, 2006

(30) Foreign Application Priority Data

Dec. 1, 2004 (JP) .................................. 2004-348943
Apr. 12, 2005 (JP) .................................. 2005-114599

(51) Int. Cl.
G11B 7/135  (2006.01)
(52) U.S. Cl. ................................................ 369/112.07
(58) Field of Classification Search ............. 369/112.03, 369/112.05, 112.06
See application file for complete search history.

(56) References Cited

U.S. PATENT DOCUMENTS

| | | | | |
|---|---|---|---|---|
| 5,122,903 | A * | 6/1992 | Aoyama et al. | 359/565 |
| 6,462,875 | B1 * | 10/2002 | Ishii | 359/576 |
| 6,624,941 | B2 * | 9/2003 | Takeuchi et al. | 359/566 |
| 6,624,942 | B2 * | 9/2003 | Maruyama et al. | 359/566 |
| 6,654,184 | B1 * | 11/2003 | Maruyama | 359/742 |
| 6,927,375 | B2 * | 8/2005 | Yamamoto et al. | 250/201.5 |
| 7,227,704 | B2 * | 6/2007 | Koike | 359/719 |
| 2005/0063282 | A1 * | 3/2005 | Takada et al. | 369/112.04 |
| 2005/0078593 | A1 | 4/2005 | Maruyama et al. | |
| 2005/0094536 | A1 * | 5/2005 | Kimura | 369/112.05 |
| 2005/0094537 | A1 | 5/2005 | Ikenaka et al. | |
| 2005/0152259 | A1 | 7/2005 | Takeuchi et al. | |
| 2005/0265151 | A1 * | 12/2005 | Kimura et al. | 369/44.37 |
| 2005/0281173 | A1 | 12/2005 | Koreeda et al. | |

FOREIGN PATENT DOCUMENTS

JP   2000-171704   6/2000
JP   2004-362626   12/2004

OTHER PUBLICATIONS

Komma et al., "Compatible Objective Lens for Blu-ray Disc and DVD using Diffractive Optical Element and Phase-step Element which Corrects both Chromatic and Spherical Aberration," Matsushita Electric Industrial Co., Ltd, ISOM collected papers (We-F-20).
English Language Abstract of JP 2000-171704.
English Language Abstract of JP 2004-362626.

* cited by examiner

*Primary Examiner* — Will J Klimowicz
*Assistant Examiner* — Mark Fischer
(74) *Attorney, Agent, or Firm* — Greenblum & Bernstein, P.L.C.

(57) ABSTRACT

A method of designing an optical element to be used for an optical system in which each of a plurality of light beams having different design wavelengths passes through the optical element is provided. The method includes determining at least two types of optical path difference functions including first and second optical path difference functions in such a manner that proportion, brought by the first optical path difference function, between diffraction orders at which diffraction efficiencies of the plurality of light beams are maximized is different from proportion, brought by the second optical path difference function, between diffraction orders at which diffraction efficiencies of the plurality of light beams are maximized, and obtaining a shape defined by combining the at least two types of optical path difference functions so as to apply the obtained shape to at least one surface of surfaces of the optical element.

31 Claims, 33 Drawing Sheets

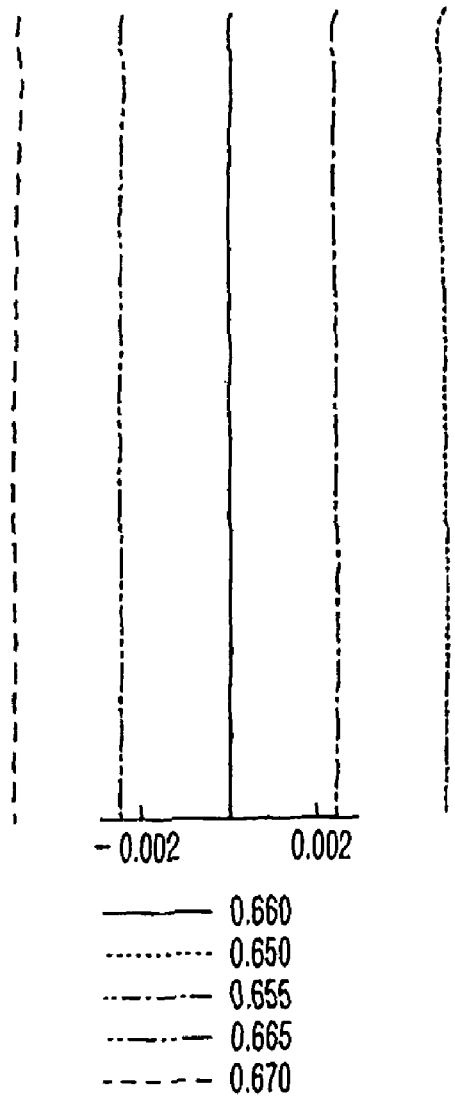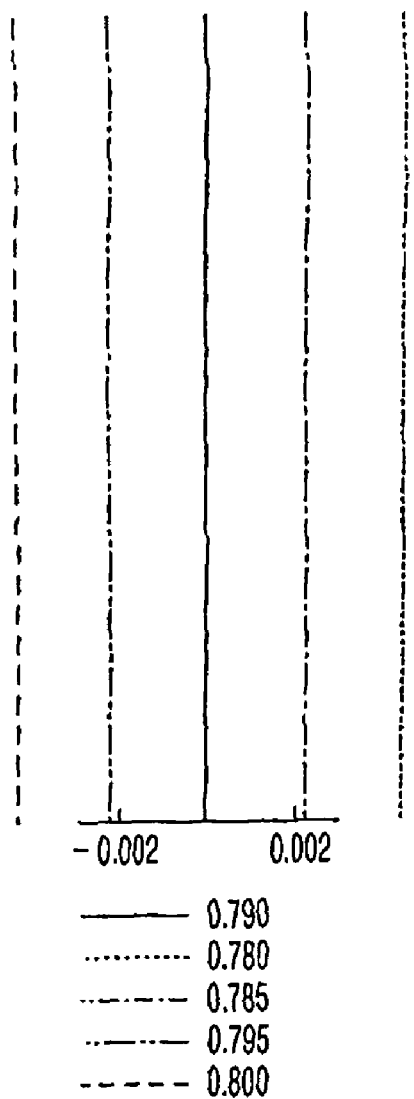

—— 0.660
········· 0.650
—··— 0.655
—··— 0.665
---- 0.670

—— 0.790
········· 0.780
—··— 0.785
—··— 0.795
---- 0.800

|  -0.002   0.002 |
| --- |
| ——— 0.408 |
| ·········· 0.398 |
| —·—·— 0.403 |
| —··—··— 0.413 |
| ----- 0.418 |

|  -0.002   0.002 |
| --- |
| ——— 0.660 |
| ·········· 0.650 |
| —·—·— 0.655 |
| —··—··— 0.665 |
| ----- 0.670 |

|  -0.002   0.002 |
| --- |
| ——— 0.790 |
| ·········· 0.780 |
| —·—·— 0.785 |
| —··—··— 0.795 |
| ----- 0.800 |

- 0.002    0.002
—— 0.408
········ 0.398
—··— 0.403
—···— 0.413
---- 0.418

- 0.002    0.002
—— 0.660
········ 0.650
—··— 0.655
—···— 0.665
---- 0.670

- 0.002    0.002
—— 0.790
········ 0.780
—··— 0.785
—···— 0.795
---- 0.800

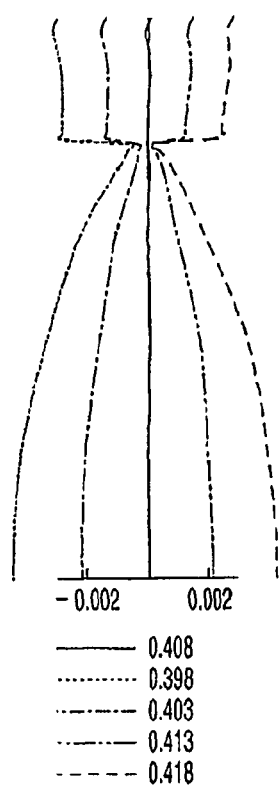
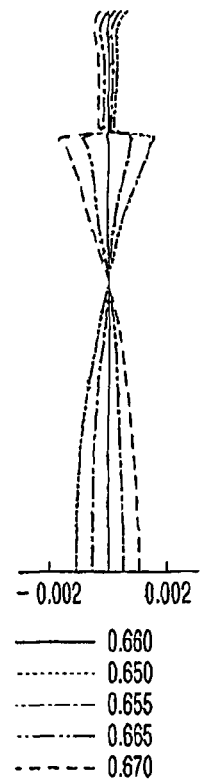
FIG.22A
― 0.408
⋯⋯ 0.398
―·― 0.403
―··― 0.413
― ― ― 0.418
FIG.22B
― 0.660
⋯⋯ 0.650
―·― 0.655
―··― 0.665
― ― ― 0.670
FIG.22C
― 0.790
⋯⋯ 0.780
―·― 0.785
―··― 0.795
― ― ― 0.800

—— 0.408
········ 0.413

—— 0.660
········ 0.665

—— 0.790
········ 0.795

- −0.005　　0.005
——— 0.408
·········· 0.413

- −0.005　　0.005
——— 0.660
·········· 0.665

- −0.005　　0.005
——— 0.790
·········· 0.795

——— 0.407
·········· 0.412

——— 0.657
·········· 0.662

——— 0.788
·········· 0.793

DESIGN METHOD OF OPTICAL ELEMENT AND OPTICAL ELEMENT THROUGH WHICH A PLURALITY OF LIGHT BEAMS HAVING DIFFERENT DESIGN WAVELENGTHS PASS

BACKGROUND OF THE INVENTION

The present invention relates to a design method of an optical element, such as an objective lens, used for an optical disc drive capable of recording data to and/or reproducing data from a plurality of types of optical discs based on different standards.

There are various types of optical discs on which digital information is recorded at various densities, respectively. For example, a DVD (digital versatile disc) has a recording density higher than that of a CD (compact disc) or a CD-R (CD Recordable) and has a cover layer thinner than that of the CD or CD-R.

Recently, new technical standards for optical discs, such as an HD DVD (High Definition DVD) and a BD (Blu-ray Disc), having further higher recording densities have been proposed. Such a new standard optical disc has a thickness of a cover layer smaller than or equal to that of the DVD. Under these circumstances, optical disc drives (i.e., optical systems in the optical disc drives) are required to support at least two types of optical discs. Hereafter, such an optical disc drive (objective lens) supporting at least two types of optical discs is frequently referred to as a compatible optical disc drive (objective lens).

For supporting a plurality of type of optical discs, an optical system for an optical disc drive is required to correct a spherical aberration which varies depending on the thickness of a cover layer of an optical disc being used, while changing a NA (numerical aperture) defining a beam spot size to a size suitable for the optical disc being used. In general, the beam spot diameter decreases as the wavelength of a light beam decreases. Therefore, a laser beam having a wavelength of about 660 nm, which is lower than a wavelength of about 780 nm for the CD, is used for the DVD, for example. For the new technical standard optical disc having higher recording density than the DVD, a laser beam having a shorter wavelength than that of the DVD (i.e., a so-called blue laser, for example, having a wavelength of about 408 nm) is used.

Furthermore, the optical system for the optical disc drive is required to suitably converge the light beam on a recording surface of an optical disc, on which the light beam of which wavelength varies depending on the type of the optical disc being used impinges, without causing a spherical aberration. For this reason, a conventional optical system of the compatible optical disc drive is configured to have a diffracting structure on one of surfaces of optical elements (e.g., an objective lens) in the optical system so that the light beam is suitably converged on a recording surface of each optical disc.

It is preferable that the optical element provided with the diffracting structure has the function of correcting a spherical aberration caused when a design wavelength of a laser beam varies depending on the change of an environmental condition, such as a temperature change or individual differences among light source devices. The term design wavelength means a wavelength of a light beam suitable for recordation and/or reproduction for an optical disc.

The degrees of freedom for design of a diffracting structure are limited. Therefore, it was assumed that if a diffracting structure is formed to support the two types of optical discs, giving additionally a correcting function for a wavelength shift (i.e., a function of correcting change of a spherical aberration caused by a wavelength shift in each of two different light beams for the two types of optical discs) to the diffracting structure is impossible.

Meanwhile, there is a demand for an optical disc drive capable of supporting the new technical standard optical disc as well as the existing optical discs (i.e., an optical disc drive capable of supporting three types of optical discs). However, the degrees of freedom of design of a diffracting structure are limited. Therefore, optical performance of a single diffracting structure is to converge, at the most, two types of light beams having different wavelengths on recording surfaces of the two types of optical discs, respectively. That is, if an optical system is configured to have a diffracting structure on one of surfaces of optical elements in the optical system, the optical system can support only two types of optical discs.

For solving such a problem, an optical system is proposed in an article "Compatible Objective Lens for Blu-ray Disc and DVD using Diffractive Optical Element and Phase-step Element which Corrects both Chromatic and Spherical Aberration", Yoshiaki Komma et al. of Matsushita Electric Industrial Co., Ltd, ISOM collected papers (We-F-20). The optical system proposed in the article is configured to have different diffracting structures on two lens surfaces, respectively. By this configuration, the optical system is able to suitably converge the laser beams for the DVD and BD on recording surfaces of the DVD and BD, respectively, while correcting a spherical aberration caused by a wavelength shift in each of the laser beams for the DVD and BD.

However, if the optical system is configured to have the diffracting structures on two lens surfaces as proposed in the above mentioned article, the possibility that the optical performance deteriorates due to a manufacturing error, such as decentering, may increase. Further, if the optical system is formed by a single objective lens for the reduction in the number of components and manufacturing cost, the diffracting structures are formed on the both surfaces of the objective lens. In this case, one of the surfaces of the objective lens (i.e., one of the diffracting structures) is exposed to the outside through a disc tray, by which the possibility that the diffracting structure exposed to the outside is damaged when a lens cleaner is used increases.

Therefore, from a practical point of view, the optical system proposed in the article can not be used in the optical disc drive although the optical system is able to provide a plurality of types of diffracting functions for an optical element in the optical system.

Japanese Patent Provisional Publication No. 2000-171704 discloses a method of designing a single diffraction surface having a plurality of optical functions. The design method disclosed in the publication 2000-171704 is a method for giving a plurality of optical functions to a single diffraction surface so that a light beam having a particular wavelength can be used most suitably. However, in this publication, a design method for designing an optical element which can provide an optical disc drive (an optical system) with the capability of supporting a plurality of types of optical discs is not disclosed.

SUMMARY OF THE INVENTION

The present invention is advantageous in that it provides a method of designing an optical element provided with a single diffracting structure having a plurality of diffracting functions.

According to an aspect of the invention, there is provided a method of designing an optical element to be used for an optical system in which each of a plurality of light beams having different design wavelengths passes through the optical element. The method includes determining at least two types of optical path difference functions including first and second optical path difference functions in such a manner that proportion, brought by the first optical path difference function, between diffraction orders at which diffraction efficiencies of the plurality of light beams are maximized is different from proportion, brought by the second optical path difference function, between diffraction orders at which diffraction efficiencies of the plurality of light beams are maximized, and obtaining a shape defined by combining the at least two types of optical path difference functions so as to apply the obtained shape to at least one surface of surfaces of the optical element.

With this configuration, the degrees of freedom in designing an optical element can be increased because the shape to be applied to the optical element is determined based on the at least two optical path difference functions giving different proportions. Since the optical path difference functions are determined in such a manner that the proportions at which the light beams take respective maximum values are different from each other, various types of diffracting functions can be given to a diffracting structure (i.e., a single diffraction surface) in regard to different wavelengths.

Optionally, the at least one surface to which the shape is applied is divided into an inner area including an optical axis of the optical element and an outer area situated outside the inner area. In this case, the determining step may be applied separately to the inner and the outer areas and the obtaining step may be applied separately to the inner and outer areas so that diffracting structures having different diffracting functions are formed in the inner and outer areas, respectively.

Still optionally, a diffracting structure having the shape obtained by the obtaining step may be symmetrical about an optical axis of the optical element.

Still optionally, the optical element may be used for an optical disc drive configured to record data to and/or reproduce data from each of first and second optical discs based on different standards, by using a first light beam having a first design wavelength for the first optical disc and a second light beam having a second design wavelength, different from the first design wavelength, for the second optical disc.

Still optionally, the shape may be obtained as a diffracting structure by the obtaining step. In this case, a first diffraction function of adjusting a spherical aberration, caused when the first optical disc is used, to a desired value and adjusting a spherical aberration, caused when the second optical disc is used, to a desired value may be principally given to the diffracting structure by the first optical path difference function. A second diffraction function of adjusting change of a spherical aberration caused by a wavelength shift which occurs when at least one of the first and second optical discs is used may be principally given to the diffracting structure by the second optical path difference function.

Still optionally, by the first diffraction function, the diffracting structure may generate an aberration having a direction in which each of the spherical aberration caused when the first optical disc is used and the spherical aberration caused when the second optical disc is used is corrected. By the second diffraction function, the diffracting structure may decrease change of the spherical aberration caused by the wavelength shift in which a wavelength of the first light beam shifts from the first design wavelength when the first optical disc is used.

Still optionally, the first diffraction function, in which the spherical aberrations caused when the first and second optical discs are used are adjusted, may be determined under a condition in which each of the first and second light beams is incident on the optical element as a collimated beam.

Still optionally, the optical disc drive may be configured to be capable of recording data to and/or reproducing data from a third optical disc based on a standard different from the standards of the first and second optical discs, by using a third light beam having a third design wavelength, different from the wavelengths of the first and second light beams, for the third optical disc.

Still optionally, the optical disc drive may be configured to be capable of recording data to and/or reproducing data from a third optical disc based on a standard different from the standards of the first and second optical discs, by using a third light beam having a third design wavelength, different from the wavelengths of the first and second light beams, for the third optical disc. In this case, the first and second optical path difference functions may be determined separately so that a spherical aberration caused when each of the first, second and third optical discs is used is adjusted to a desired value.

Still optionally, if thicknesses of cover layers of the first, second and third optical discs are defined as t1, t2 and t3, respectively, the thicknesses of the cover layers have a following relationship $t1 \leq t2 \leq t3$. If a numerical aperture suitable for recording data to and/or reproducing data from the first optical disc is defined as NA1, a numerical aperture suitable for recording data to and/or reproducing data from the second optical disc is defined as NA2, and a numerical aperture suitable for recording data to and/or reproducing data from the third optical disc is defined as NA3, the NA1, NA2 and NA3 have a relationship NA1>NA3 and NA2>NA3. In this configuration, the first design wavelength of the first light beam may be the shortest of all of the first, second and third design wavelengths, the second design wavelength of the second light beam may be longer than the first design wavelength of the first light beam, and the third design wavelength of the third light beam may be the longest of all of the first, second and third design wavelengths.

Still optionally, the proportion, brought by the first optical path difference function, between the diffraction orders at which the diffraction efficiencies of the first, second and third light beams are maximized, respectively, may be represented by 2:1:1 in order of the first, second and third light beams. Further, the proportion, brought by the second optical path difference function, between the diffraction orders at which the diffraction efficiencies of the first, second and third light beams are maximized, respectively, may be represented by 3:2:2 in order of the first, second and third light beams.

Still optionally, the method may include determining a third optical path difference function giving principally a third diffraction function of adjusting change of a spherical aberration caused by a wavelength shift which occurs when at least one of the first, second and third optical discs is used, to the diffracting structure.

Still optionally, the proportion, brought by the first optical path difference function, between the diffraction orders at which the diffraction efficiencies of the first, second and third light beams are maximized, respectively, may be represented by 2:1:1 in order of the first, second and third light beams. Further, the proportion, brought by the second optical path difference function, between the diffraction orders at which the diffraction efficiencies of the first, second and third light beams are maximized, respectively, may be represented by 3:2:2 in order of the first, second and third light beams. Further, the proportion, brought by the third optical path difference function, between the diffraction orders at which the diffraction efficiencies of the first, second and third light beams are maximized, respectively, may be represented by 10:6:5 in order of the first, second and third light beams.

According to another aspect of the invention, there is provided an optical disc drive, which includes a plurality of light source devices that respectively emit a plurality of light beams having different design wavelengths, and the optical element designed by the above mentioned method.

Optionally, in order to record data to and/or reproduce data from each of first and second optical discs based on different standards, a first light beam having a first design wavelength may be used for the first optical disc, and a second light beam having a second design wavelength may be used for the second optical disc. Further, in order to record data to and/or reproduce data from a third optical disc based on a standard different from the standards of the first and second optical discs, a third light beam having a third design wavelength may be used for the third optical disc in such a manner that the third light beam is incident on the optical element as a diverging beam.

According to another aspect of the invention, there is provided an optical element produced by the above mentioned design method.

According to another aspect of the invention, there is provided an objective lens for an optical disc drive capable of recording data to and/or reproducing data from three types of optical discs by selectively using one of three light beams which have different wavelengths and are substantially collimated beams. When a thickness of a first optical disc of the three types of optical discs to be used for recording data and/or reproducing data using a first light beam of the three light beams having a wavelength shortest of all the wavelengths of the three light beams is represented by t1, a thickness of a second optical disc of the three types of optical discs to be used for recording data and/or reproducing data using a second light beam of the three light beams having a wavelength longer than that of the first light beam is represented by t2, and a thickness of a third optical disc of the three types of optical discs to be used for recording data and/or reproducing data using a third light beam of the three light beams having a wavelength longest of all of the wavelengths of the three light beams is represented by t3, a relationship t1≦t2≦t3 is satisfied. When the wavelength of the first light beam shortest of all the three light beams is represented by $\lambda_1$, the wavelength of the second light beam longer than that of the first light beam is represented by $\lambda_2$, and the wavelength of the third light beam longest of all the three light beams is represented by $\lambda_3$, relationships $\lambda_1 < \lambda_2 < \lambda_3$ and $1.9 < \lambda_3/\lambda_1 < 2.1$ are satisfied. When a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, NA1, NA2 and NA3 have relationships of NA1>NA3 and NA2>NA3.

In this configuration, the objective lens includes a phase shifting structure on one of surfaces thereof. The phase shifting structure includes a plurality of annular refractive surface zones concentrically formed about an optical axis of the objective lens. The phase shifting structure has a first area for converging the third light beam on a recording surface of the third optical disc. The first area includes steps at boundaries between adjacent annular refractive surface zones, the steps giving at least two different changing amounts in an optical path length to the first light beam. Each of absolute values of the two different changing amounts in an optical path length are $(i_A + \Delta_A)$ times and $(i_B + \Delta_B)$ times the wavelength of the first laser beam, provided $i_A$ and $i_B$ represent natural numbers and also $i_A \neq i_B$, here, $-0.5 < \Delta_A < 0.5$, $-0.5 < \Delta_B < 0.5$. At least one of the at least two different changing amounts in an optical path length satisfies $i_A = (2k+1)$, provided k represents a natural number. If the at least one of the at least two different changing amounts in an optical path length satisfies $i_A = (2k+1)$, a diffraction order at which a diffraction efficiency for the third light beam is maximized is represented by a (k+1)-th order. $\Delta_A$ satisfies a condition $0.000 \leq \Delta_A \leq 0.384 \ldots$ (1).

By assigning an odd number (2k+1) to the value $i_A$ of at least one of the at least two different changing amounts in an optical path length, it is possible to give an excellent compatibility for the three types of optical discs based on different standards to the objective lens. Since the collimated beam is used for each of the three types of optical discs, aberrations caused during a tracking operation can be suppressed, so that a beam spot suitable for each of the three types of optical discs can be obtained.

In a particular case, $\Delta_A$ may satisfy a condition:
$$0.020 \leq \Delta_A \leq 0.324 \quad (2).$$

In a particular case, $\Delta_A$ may satisfy a condition:
$$0.020 \leq \Delta_A \leq 0.258 \quad (3).$$

In a particular case, $\Delta_A$ may satisfy a condition:
$$0.020 \leq \Delta_A \leq 0.178 \quad (4).$$

With this configuration, it becomes possible to secure a considerably high usage efficiency of light for the first light beam in a recording operation and/or a reproducing operation for the first optical disc having the highest recording density.

In a particular case, values of $i_A$ and $i_B$ of the at least two different changing amounts in an optical path length given by the steps in the first area may be 3 and 2, respectively.

In a particular case, values of $i_A$ and $i_B$ of the at least two different changing amounts in an optical path length given by the steps in the first area may be 5 and 2, respectively.

In a particular case, the at least two different changing amounts in an optical path length may include three different changing amounts in an optical path length. In this case, an absolute value of a changing amount in an optical path length different from $(i_A + \Delta_A)$ times and $(i_B + \Delta_B)$ times the wavelength of the first laser beam may be $(i_C + \Delta_C)$ times the wavelength of the first laser beam, provided $i_C$ represents a natural number and also $i_C \neq i_A$ and $i_C \neq i_B$, here, $-0.5 < \Delta_C < 0.5$, and values of $i_A$, $i_B$ and $i_C$ of the three different changing amounts in an optical path length given by the steps in the first area may be 3, 2 and 8, respectively.

In a particular case, values of $i_A$, $i_B$ and $i_C$ of the three different changing amounts in an optical path length given by the steps in the first area may be 3, 2 and 10, respectively.

In a particular case, values of $i_A$, $i_B$ and $i_C$ of the three different changing amounts in an optical path length given by the steps in the first area may be 5, 2 and 8, respectively.

In a particular case, values of $i_A$, $i_B$ and $i_C$ of the three different changing amounts in an optical path length given by the steps in the first area may be 5, 2 and 10, respectively.

According to another aspect of the invention, there is provided an objective lens for an optical disc drive capable of recording data to and/or reproducing data from three types of optical discs by selectively using one of three light beams which have different wavelengths and are substantially collimated beams. When a thickness of a first optical disc of the three types of optical discs to be used for recording data and/or reproducing data using a first light beam of the three light beams having a wavelength shortest of all the wavelengths of the three light beams is represented by t1, a thickness of a second optical disc of the three types of optical discs to be used for recording data and/or reproducing data using a second light beam of the three light beams having a wavelength longer than that of the first light beam is represented by t2, and a thickness of a third optical disc of the three types of optical discs to be used for recording data and/or reproducing data using a third light beam of the three light beams having a wavelength longest of all of the wavelengths of the three light beams is represented by t3, a relationship t1≦t2<t3 is satisfied. When the wavelength of the first light beam shortest of all the three light beams is represented by $\lambda_1$, the wavelength of the second light beam longer than that of the first light beam is represented by $\lambda_2$, and the wavelength of the third light beam longest of all the three light beams is represented by $\lambda_3$, relationships $\lambda_1 < \lambda_2 < \lambda_3$ and $1.9 < \lambda_3/\lambda_1 < 2.1$ are satisfied. When a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, NA1, NA2 and NA3 may have relationships of NA1>NA3 and NA2>NA3.

In this configuration, the objective lens includes a phase shifting structure on one of surfaces thereof. The phase shifting structure includes a plurality of annular refractive surface zones concentrically formed about an optical axis of the objective lens. The phase shifting structure has a first area for converging the third light beam on a recording surface of the third optical disc. The first area includes steps at boundaries of adjacent annular refractive surface zones, the steps giving at least two different changing amounts in an optical path length to the first light beam. Each of absolute values of the at least two different changing amounts in an optical path length are $(i_A+\Delta_A)$ times and $(i_B+\Delta_B)$ times the wavelength of the first laser beam, provided $i_A$ and $i_B$ represent natural numbers and also $i_A \neq i_B$, here, $-0.5 < \Delta_A < 0.5$, $-0.5 < \Delta_B < 0.5$. At least one of the at least two different changing amounts in an optical path length satisfies $i_A=(2k+1)$, provided k represents a natural number. If the at least one of the at least two different changing amounts in an optical path length satisfies $i_A=(2k+1)$, a diffraction order at which a diffraction efficiency for the third light beam is maximized is represented by a k-th order. Further, $\Delta_A$ satisfies a condition $-0.384 \leq \Delta_A \leq -0.070$ . . . (5).

By assigning an odd number (2k+1) to the value $i_A$ of the at least one of the at least two different changing amounts in an optical path length, it is possible to give an excellent compatibility for the three types of optical discs based on different standards to the objective lens. Since the collimated beam is used for each of the three types of optical discs, aberrations caused during a tracking operation can be suppressed, so that a beam spot suitable for each of the three types of optical discs can be obtained.

In a particular case, $\Delta_A$ may satisfy a condition
$-0.324 \leq \Delta_A \leq -0.070$      (6).

In a particular case $\Delta_A$ may satisfy a condition
$-0.258 \leq \Delta_A \leq -0.070$      (7).

In a particular case, $\Delta_A$ may satisfy a condition
$-0.178 \leq \Delta_A \leq -0.070$      (8).

In a particular case, the at least two different changing amounts in an optical path length may include three different changing amounts in an optical path length. In this case, an absolute value of a changing amount in an optical path length different from $(i_A+\Delta_A)$ times and $(i_B+\Delta_B)$ times the wavelength of the first laser beam may be $(i_C+\Delta_C)$ times the wavelength of the first laser beam, provided $i_C$ represents a natural number and also $i_C \neq i_A$ and $i_C \neq i_B$, here, $-0.5 < \Delta_C < 0.5$, and values of $i_A$, $i_B$ and $i_C$ of the three different changing amounts in an optical path length given by the steps in the first area may be 3, 2 and 10, respectively.

With regard to the above mentioned two aspects relating to the objective lens according to the invention, the objective lens may be a single element lens.

Still optionally, the phase shifting structure may include a second area situated outside the first area. In this case, the phase shifting structure in the second area may be configured to converge the first and second light beams on recording surfaces of the first and second optical discs, respectively, and not to contribute to converging the third light beams. The phase shifting structure in the second area may include a step at a boundary between adjacent annular refractive surface zones, the step giving at least a changing amount in an optical path length to the first light beam. An absolute value of the at least one changing amount in an optical path length given to the first light beam by the phase shifting structure in the second area may be different from an absolute value of one of the at least two different changing amounts in an optical path length given to the first light beam by the phase shifting structure in the first area.

Still optionally, given that a focal length of the objective lens is represented by f1 when the first optical disc is used, and a focal length of the objective lens is represented by f2 when the second optical disc is used, the objective lens may satisfy a condition: f1×NA1<f2×NA2 . . . (9). In this case, the phase shifting structure may have a third area situated outside the second area. The phase shifting structure in the third area may be configured to converge only the second laser beam and not to contribute to converging each of the first and third light beams. The phase shifting structure in the third area may include a step at a boundary between adjacent annular refractive surface zones, the step giving at least a changing amount in an optical path length to the second light beam. Further, an absolute value of the at least a changing amount in an optical path length given to the second light beam by the phase shifting structure in the third area may be different from an absolute value of a changing amount in an optical path length given to the second light beam by the phase shifting structure in the second area.

Alternatively, given that a focal length of the objective lens is represented by f1 when the first optical disc is used, and a focal length of the objective lens is represented by f2 when the second optical disc is used, the objective lens may satisfy a condition f1×NA1>f2×NA2 . . . (10). In this case, the phase shifting structure may have a third area situated outside the second area. The phase shifting structure in the third area may be configured to converge only the first laser beam and not to contribute to converging each of the second and third light beams. The phase shifting structure in the third area may include a step at a boundary between adjacent annular refractive surface zones, the step giving at least a changing amount in an optical path length to the first light beam. Further, an absolute value of the at least a changing amount in an optical path length given to the first light beam by the phase shifting structure in the third area may be different from an absolute value of the at least a changing amount in an optical path length given to the first light beam by the phase shifting structure in the second area.

According to another aspect of the invention, there is provided an optical system, which includes a plurality of light source devices that respectively emit a plurality of light beams having different design wavelengths, the objective lens having the above mentioned configuration, a beam splitter which directs each of the plurality of light beams to the objective lens, and a sensor that receives light returning from an optical disc.

BRIEF DESCRIPTION OF THE ACCOMPANYING DRAWINGS

FIG. 8A is a graph illustrating a spherical aberration caused in an optical disc drive according to a first example when a second laser beam for the second optical disc is used;

FIG. 8B is a graph illustrating the spherical aberration caused in the optical disc drive according to the first example when a third laser beam for the third optical disc is used;

FIG. 22A is a graph illustrating a spherical aberration caused in an optical disc drive according to the eighth example when the first laser beam is used;

FIG. 22B is a graph illustrating the spherical aberration caused in the optical disc drive according to the eighth example when the second laser beam is used;

FIG. 22C is a graph illustrating the spherical aberration caused in the optical disc drive according to the eighth example when the third laser beam is used;

DETAILED DESCRIPTION OF THE EMBODIMENTS

Figure 1:
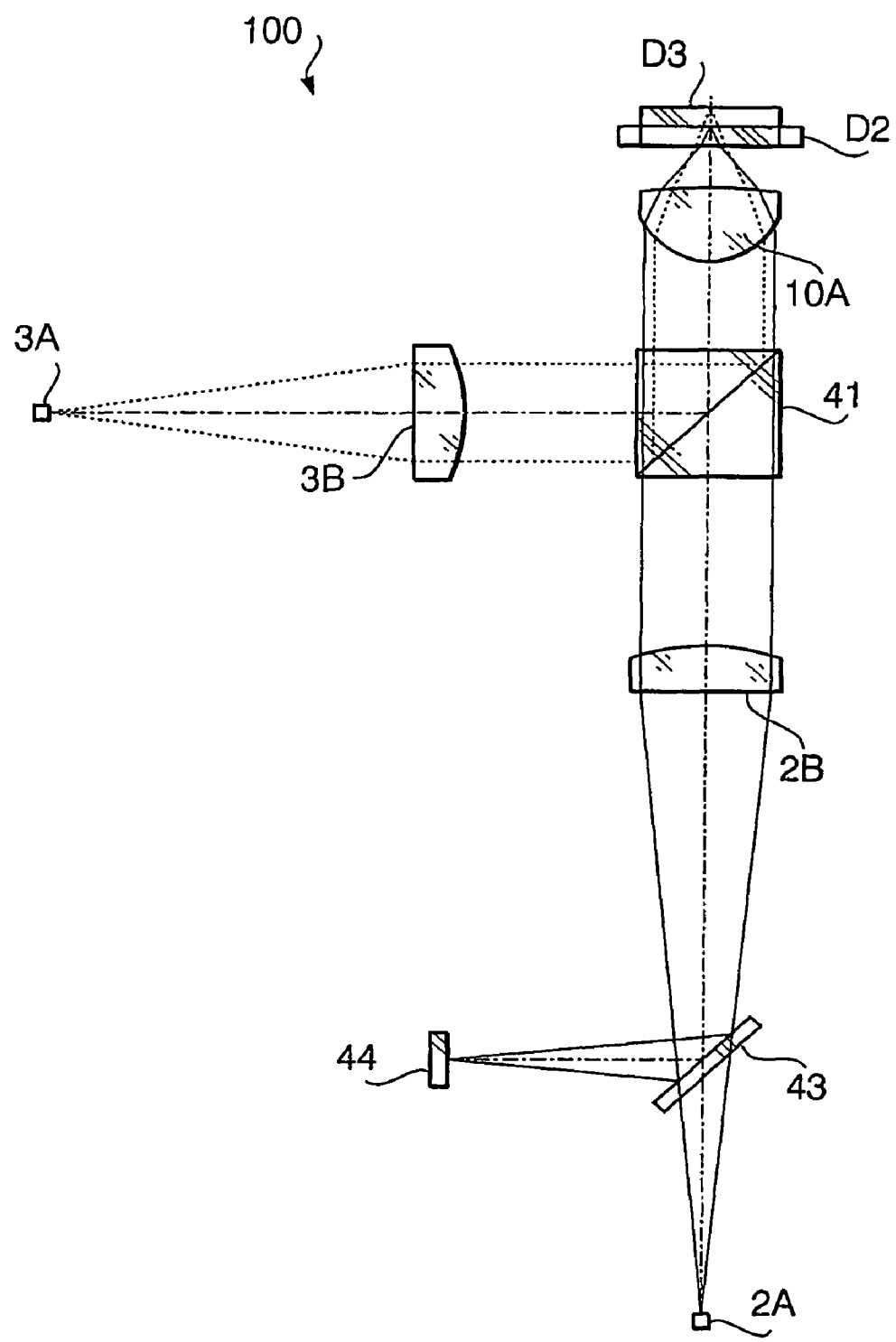
FIG. 1 shows a general configuration of an optical disc drive according to a first embodiment.

Hereinafter, embodiments according to the invention are described with reference to the accompanying drawings.

In the following, a design method of designing an optical element, and an objective lens designed according to the design method will be described. The optical element designed according to the embodiments enables an optical disc drive to have the capability of supporting at least two of three types of optical discs based on different standards (e.g., having different thicknesses of cover layers, and different recording densities).

As used herein, the term "optical disc drive" means an optical disc drive capable of recording data to and/or reproducing data from each optical disc.

In the following, a first type optical disc (such as an HD DVD or BD) having the highest recording density of all of the three types of optical discs is referred to as an optical disc D1, a second type optical disc (such as a DVD or DVD-R) having the second highest recording density of all of the three types of optical discs is referred to as an optical disc D2, and a third type optical disc (such as a CD or CD-R) having the lowest recording density of all of the three types of optical discs is referred to as an optical disc D3. Each of the optical discs D1, D2 and D3 is placed on a disc tray of the optical disc drive when the recordation or reproduction is performed.

If the thicknesses of cover layers of the optical discs D1, D2 and D3 are defined as t1, t2 and t3, respectively, the thicknesses of the cover layers have the following relationship.

$$t1 \leq t2 < t3$$

To support all of the optical discs D1, D2 and D3, an optical system of the optical disc drive is required to be configured to change a numerical aperture (NA) so that a suitable beam spot diameter can be obtained for recordation and/or reproduction of each of the optical discs D1, D2 and D3. If the numerical apertures suitable for the optical discs D1, D2 and D3 are defined as NA1, NA2 and NA3, respectively, the NA1, NA2 and NA3 have a following relationship.

$$NA1 > NA3 \text{ and } NA2 > NA3$$

In other words, to support the optical disc D1 having the highest recording density, a beam spot having a smaller diameter is required, and therefore a higher numerical aperture is required. On the other hand, to support the optical disc D3 having the lowest recording density, a necessary numerical aperture is relatively small.

In the optical disc drive, a plurality of type of laser beams having different wavelengths are used so that a suitable beam spot diameter can be obtained for each of the plurality of types of optical discs. Specifically, a first laser beam having the shortest wavelength of all of the laser beams is used for the optical disc D1 so that a beam spot having the smallest diameter can be formed on a recording surface of the optical disc D1, a second laser beam having the second shortest wavelength of all of the laser beams is used for the optical disc D2 so that a beam spot having the second smallest diameter can be formed on a recording surface of the optical disc D2, and a third laser beam having the longest wavelength of all of the laser beams is used for the optical disc D3 so that a beam spot having the largest diameter can be formed on a recording surface of the optical disc D3.

As used herein, the term "design wavelength" means a wavelength suitable for recordation and/or reproduction for each of the optical discs D1, D2 and D3.

First Embodiment

Hereafter, a design method according to a first embodiment and an objective lens 10A formed according to the design method will be described. The objective lens 10A can be used for two types of optical discs (i.e., the objective lens 10A has compatibility for the two types of optical discs). In this embodiment, the objective lens 10A is configured to support the optical discs D2 and D3. However, an objective lens of a different type having compatibility for another pair of optical discs may be designed by the design method according to the first embodiment.

FIG. 1 shows a general configuration of an optical disc drive (an optical system) 100 according to the first embodiment. The optical disc drive 100 includes a light source 2A emitting the second laser beam for the optical disc D2, a light source 3A emitting the third laser beam for the optical disc D3, coupling lenses 2B and 3B, a beam splitter 41, a half mirror 43, a light receiving unit (sensor) 44 and the objective lens 10A. Since the optical disc drive 100 is required to attain a numerical aperture suitable for the optical disc D3 which is smaller than a numerical aperture suitable for the optical disc D2, the optical disc drive 100 may be provided with an aperture stop (not shown) between the light source 3A and the objective lens 10A so that the diameter of the third laser beam can be reduced.

As shown in FIG. 1, the second and third laser beams emitted from the light sources 2A and 3A are converted into collimated beams by the coupling lenses 2B and 3B, respectively. That is, each of the coupling lenses 2B and 3B functions as a collimator lens. The second and third laser beams passed through the coupling lenses 2B and 3B are directed to a common light path by the beam splitter 41, and are incident on the objective lens 10A. Each beam passing through the objective lens 10A is converged onto a recording surface of a corresponding one of the optical discs D2 and D3. The laser beam reflected by the recording surface is deflected by the half mirror 43 and then is incident on the light receiving unit 44.

As described above, the collimated beam is incident on the objective lens 10A. Therefore, an off-axis aberration such as a coma can be effectively suppressed when the objective lens 10 is moved in a radial direction of the optical disc by a tracking operation.

Figure 2A:
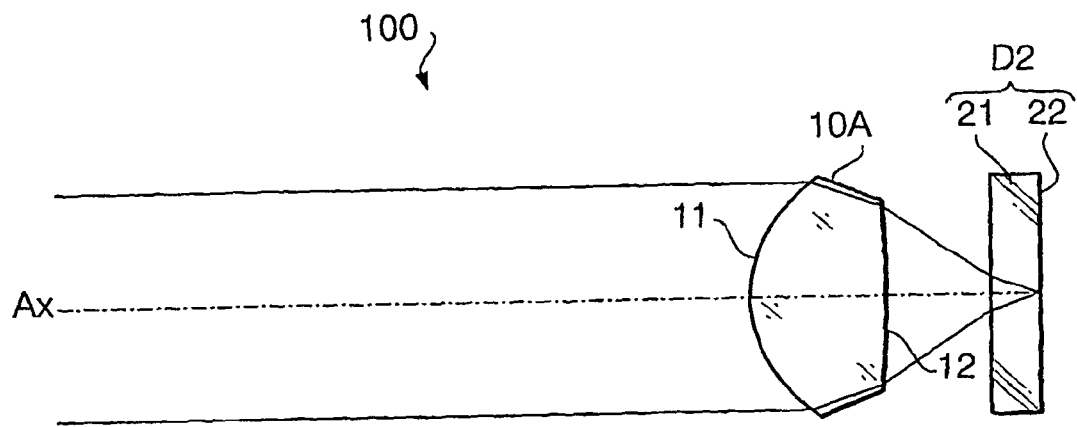
FIG. 2A shows a situation where a second optical disc having the second highest recording density is used in the optical disc drive of FIG. 1.
Figure 2B:
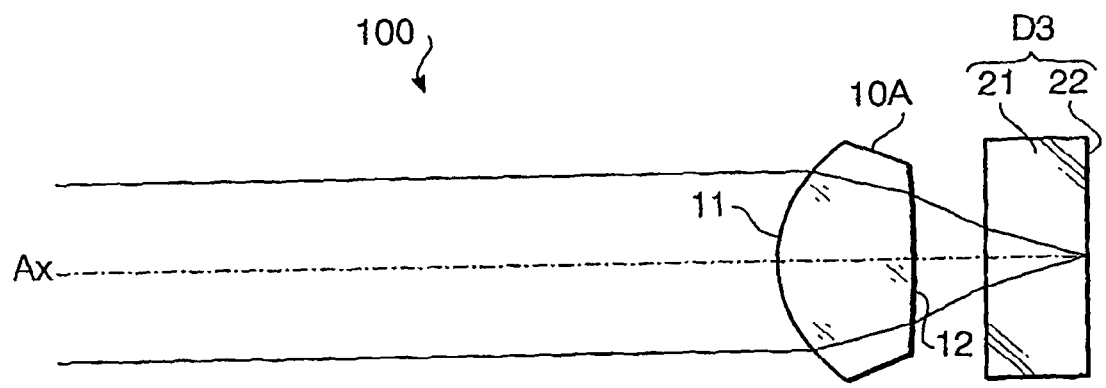
FIG. 2B shows a situation where a third optical disc having the lowest recording density is used in the optical disc drive of FIG. 1.

FIG. 2A shows a situation where the optical disc D2 is used in the optical disc drive 100. FIG. 2B shows a situation where the optical disc D3 is used in the optical disc drive 100. In FIGS. 2A and 2B, a reference axis Ax of the optical disc drive (the optical system) 100 is represented by a chain line. Although each of FIGS. 2A and 2B shows a situation where the reference axis Ax of the optical disc drive (optical system) 100 coincides with an optical axis of the objective lens 10A, the optical axis may shift from the reference axis Ax when the tracking operation is performed.

As shown in FIGS. 2A and 2B, the objective lens 10A is a single element biconvex lens made of resin, and has a first surface (a light source side surface) 11 and a second surface (an optical disc side surface) 12, each of which is formed to be an aspherical surface. An aspherical surface is expressed by a following equation:

$$X(h) = \frac{Ch^2}{1 + \sqrt{1 - (K+1)C^2h^2}} + \sum_{i=2} A_{2i}h^{2i}$$

where, X(h) represents a SAG amount which is a distance between a point on the aspherical surface at a height of h from the optical axis and a plane tangential to the aspherical surface at the optical axis, symbol C represents curvature (1/r) on the optical axis, K is a conical coefficient, and $A_{2i}$ (where i is an integer greater than or equal to 1) is an aspherical coefficient of fourth, sixth, eighth, tenth, twelfth . . . orders, respectively.

Each of the optical discs D2 and D3 has a cover layer 21 and a recording surface 22. More specifically, the recording surface 22 is sandwiched between the cover layer 21 and a label layer (not shown). An optical disc D1 (which will be described later) has the same configuration.

Since wavelengths of the second and third laser beams for the optical discs D2 and D3 are different from each other, a refractive index of the objective lens 10A varies depending on the type of the optical disc (the laser beam) being used. Further, the thicknesses of the cover layers of the optical discs D2 and D3 are different from each other. Therefore, a spherical aberration on the recording surface 22 changes depending on the type of the optical disc being used.

In addition, the wavelength of the second (third) laser beam may shift from the design wavelength for the optical disc D2 (D3) due to, for example, aging or individual differences between light source devices. If the wavelength of the laser beam shifts from the design wavelength, the spherical aberration on the recording surface 22 changes.

To support the optical discs D2 and D3 by correcting the spherical aberration which varies as described above, a diffracting structure having an effect on both of the second and third laser beams is formed on the first surface 11 of the objective lens 10A. In this embodiment, the diffracting structure has a first diffracting function (hereafter, frequently referred to as a two wavelength compatibility function) of suppressing the spherical aberration, caused by the wavelength difference between the second and third laser beams, to substantially zero, and has a second diffracting function (hereafter, frequently referred to as a wavelength shift compensation function) of canceling the spherical aberration caused by the wavelength shift of each of the second and third laser beams due to, for example, by aging or individual differences between light source devices.

More specifically, according to the two wavelength compatibility function, the spherical aberration on the recording layer 22 is sufficiently suppressed when each of the second and third laser beams is used so that a beam spot suitable for the recordation and/or reproduction for each of the optical discs D2 and D3 can be formed on the recording surface 22. According to the wavelength shift compensation function, a beam spot suitable for the recordation and/or reproduction for each of the optical discs D2 and D3 can be formed on the recording surface 22 even if the wavelength of the laser beam passing through the objective lens 10A shifts from the design wavelength.

Hereafter, the design method of designing the objective lens 10A will be described. In the design method, two different optical path difference functions are determined, and the two different optical path difference functions are combined with each other. The expression of "different optical path difference functions" means a situation where a proportion between diffraction orders, at which the laser beams (first to third beams if three beams are used in the optical disc drive 100) take respective maximum diffraction efficiencies, brought by one of the optical path difference functions is different from a proportion between diffraction orders, at which the laser beams (first to third beams if three beams are used in the optical disc drive 100) take respective maximum diffraction efficiencies, brought by the other of the optical path difference functions.

If one of the diffraction orders, at which the laser beams take respective maximum diffraction efficiencies, brought by one optical path difference function is different from a corresponding one of the diffraction orders, at which the laser beams take respective maximum diffraction efficiencies, brought by the other optical path difference function, the two optical path difference functions are considered to be different from each other.

In the following, a proportion between diffraction orders at which the laser beams take respective maximum diffraction efficiencies is simply expressed, for example, by an expression "3:2:2" when three laser beams are used. In this expression, the diffraction orders are arranged in order of the first, second and third laser beams. That is, the proportion "3:2:2" represents that the first laser beam takes the maximum diffraction efficiency at the third order diffracted light, the second laser beam takes the maximum diffraction efficiency at the second order diffracted light, and the third laser beam takes the maximum diffraction efficiency at the second order diffracted light.

For example, if a proportion brought by a first optical path difference function is "3:2:2" and a proportion brought by a second optical path difference function is "3:2:1", then the first and second optical path difference functions are considered to be different from each other.

If proportions given by the two optical path difference functions have an integral multiple relationship (e.g., a proportion given by the first optical path difference function is "2:1:1:" and a proportion given by the second optical path difference function is "4:2:2"), diffracting functions given by the first and second optical path difference functions are equal to each other. Therefore, in this embodiment, optical path difference functions are determined so that proportions given by the optical path difference functions do not have an integral multiple relationship.

Possible combinations of proportions to be given by the first and second optical path difference functions (hereafter, an optical path difference function is frequently referred to as an OPD function) include:

"2:1:1" for a first OPD function and "5:3:2" for a second OPD function.

"2:1:1" for a first OPD function and "5:3:3" for a second OPD function.

"2:1:1" for a first OPD function and "7:4:3" for a second OPD function.

"2:1:1" for a first OPD function and "8:5:4" for a second OPD function.

"3:2:2" for a first OPD function and "8:5:4" for a second OPD function.

"3:2:2" for a first OPD function and "10:6:5" for a second OPD function.

"5:3:2" for a first OPD function and "8:5:4" for a second OPD function.

"5:3:2" for a first OPD function and "10:6:5" for a second OPD function.

"5:3:3" for a first OPD function and "8:5:4" for a second OPD function.

"5:3:3" for a first OPD function and "10:6:5" for a second OPD function.

"7:4:3" for a first OPD function and "8:5:4" for a second OPD function.

"7:4:3" for a first OPD function and "10:6:5" for a second OPD function.

"8:5:4" for a first OPD function and "10:6:5" for a second OPD function.

If an OPD function providing a proportion in which a diffraction order at which the diffraction efficiency of the first laser beam is maximized is an even number is adopted, relatively high usage efficiencies for the first and third laser beams can be obtained.

If two proportions given by the two OPD functions have an integral multiple relationship (e.g., a proportion given by the first OPD function is "2:1:1:" and a proportion given by the second OPD function is "4:2:2"), these OPD functions are considered not to be different from each other because in this case the effects of the first and second OPD functions are equal to each other. That is, the two different OPD functions are selected so that the OPD functions do not have an integral multiple relationship.

The two wavelength compatibility function of the diffracting structure formed on the objective lens 10A is attained principally by the first OPD function, while the wavelength shift compensation function is attained principally by the second OPD function. It should be noted that one of the first and second OPD functions does not contribute to only one of the above mentioned first and second diffracting functions. That is, an OPD function principally contributing to one of the diffracting functions also contributes to the other of the diffracting functions. For example, the first OPD function contributing principally to the two wavelength compatibility function also contributes to the wavelength shift compensation function.

In the design method, first, the first optical path difference function principally contributing to the two wavelength compatibility function is determined.

An optical path difference function φ(h) is expressed by an equation:

$$\phi(h) = m\lambda \sum_{i=1} P_{2i} h^{2i}$$

where $P_{2i}$ (where i is an integer greater than or equal to 1) is a coefficient of second, fourth and sixth . . . orders, h represents a height from the optical axis, m represents a diffraction order at which the diffraction efficiency of the laser beam being used takes the maximum value, and λ represents a design wavelength.

Figure 3A:
FIG. 3A is a graph illustrating a first OPD (optical path difference) function principally contributing to a two wavelength compatibility function, obtained according to the first embodiment.

FIG. 3A is a graph illustrating the first OPD function principally contributing to the two wavelength compatibility function. In FIG. 3A (and in the following similar graphs), a horizontal axis represents a height from the optical axis, and a vertical axis represents an additional optical path length (unit: λ). When a shape reflecting an OPD function is obtained, an additional optical path length is determined considering the diffraction efficiency of each laser beam. With regard to the first optical path difference function shown in FIG. 3A, the additional optical path length is determined such that the diffraction efficiency of the laser beam having the shortest wavelength is the highest of all of the diffraction efficiencies of the laser beams to be used.

In this embodiment, the second laser beam has the shortest wavelength of all of the laser beams to be used. Therefore, with regard to the first optical path difference function shown in FIG. 3A, the additional optical path length is determined to have an amount corresponding to a diffraction order (a first order in this embodiment) at which the second laser beam takes the maximum diffraction efficiency.

Figure 3B:
FIG. 3B is a graph illustrating a second OPD function principally contributing to a wavelength shift compensation function, obtained according to the first embodiment.

Next, the second OPD function principally contributing to the wavelength shift compensation function is determined. FIG. 3B is a graph illustrating the second OPD function. In the second OPD function shown in FIG. 3B, the additional optical path length is determined to have an amount corresponding to a diffraction order (a sixth order in this embodiment) at which the second laser beam takes the maximum diffraction efficiency.

Figure 3C:
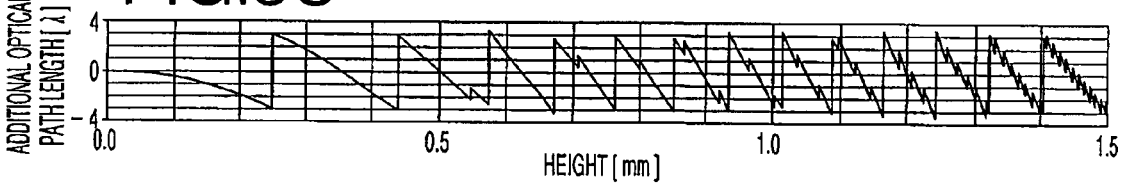
FIG. 3C is a graph illustrating an OPD function directly defining a diffracting structure formed on a first surface of an objective lens according to the first embodiment.

After the first and second OPD functions are thus determined, the first and second OPD functions are combined with each other (summed up), and a diffracting structure defined by the combination of the first and second OPD functions is formed on the first surface 11 of the objective lens 10A. The diffracting structure formed as the combination of the first and second OPD functions has both the two wavelength compatibility function and the wavelength shift compensation function. An OPD function directly defining the diffracting structure formed on the first surface 11 is shown in FIG. 3C. As shown in FIG. 3C, a graph (locus) of the OPD function directly defining the diffracting structure corresponds to the sum of the first and second OPD functions.

It should be noted that since the diffracting structure is formed on the light source side surface of the objective lens 10A, the diffracting structure is prevented from being damaged by a lens cleaner.

The objective lens 10A having the diffracting structure on the first surface 11 is able to support both of the optical discs D2 and D3 as well as correct the spherical aberration which varies depending on the wavelength shift caused when the second laser beam is used.

Second Embodiment

Figure 4:
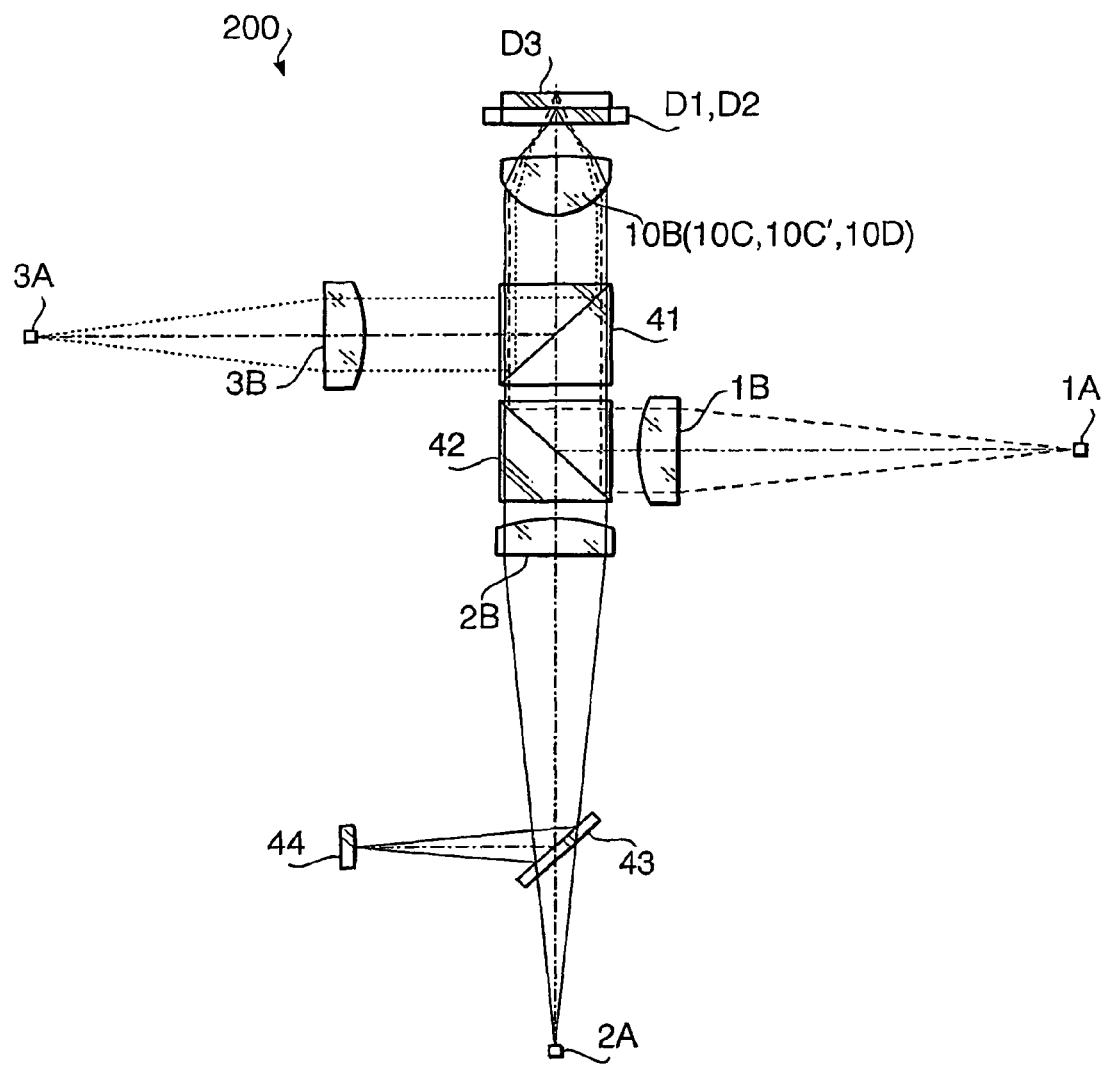
FIG. 4 shows a general configuration of an optical disc drive according to a second embodiment.

Hereafter, a design method according to a second embodiment and an objective lens 10B formed by the design method according to the second embodiment will be described. The objective lens 10B is able to support three types of optical discs (i.e., the objective lens 10B has compatibility for the three types of optical discs). In this embodiment, the objective lens 10B is configured to support the optical discs D1, D2 and D3. In FIG. 4 (and in the following drawings), to elements which are equivalent to those of the first embodiment, the same reference numbers are assigned, and explanations thereof will not be repeated.

FIG. 4 shows a general configuration of an optical disc drive (an optical system) 200 according to the second embodiment. The optical disc drive 200 includes a light source 1A emitting a first laser beam for the optical disc D1, the light source 2A emitting the second laser beam for the optical disc D2, the light source 3A emitting the third laser beam for the optical disc D3, coupling lenses 1B, 2B and 3B, beam splitters 41 and 42, the half mirror 43, the light receiving unit 44 and the objective lens 10B. Since the optical disc drive 200 is required to attain a numerical aperture for the optical disc D3 smaller than numerical apertures for the other optical discs, the optical disc drive 200 may be provided with a aperture stop (not shown) between the light source 3A and the objective lens 10B so that the diameter of the third laser beam can be reduced.

Figure 5A:
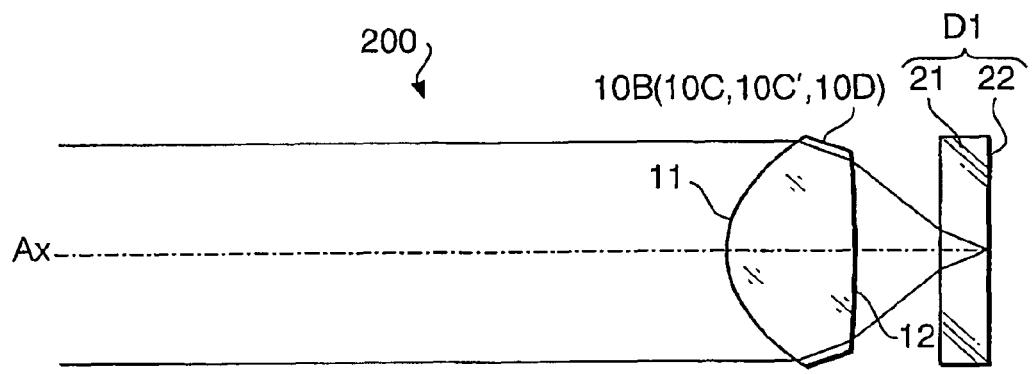
FIG. 5A shows a situation where a first optical disc having the highest recording density is used in the optical disc drive of FIG. 4.
Figure 5B:
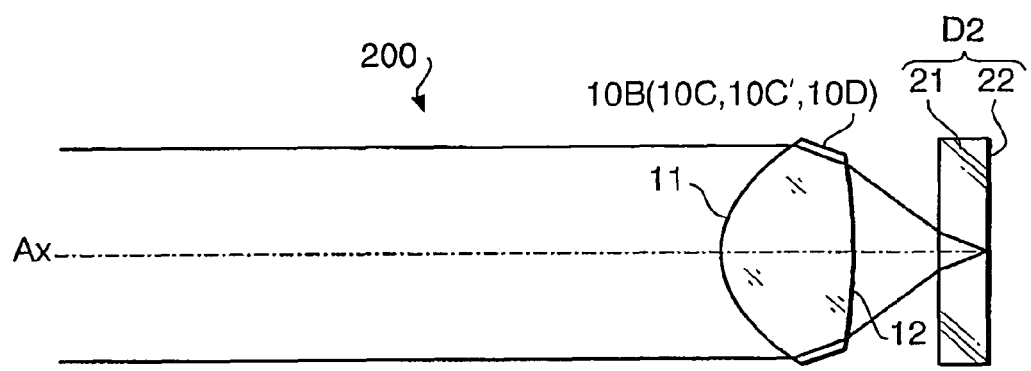
FIG. 5B shows a situation where the second optical disc is used in the optical disc drive of FIG. 4.
Figure 5C:
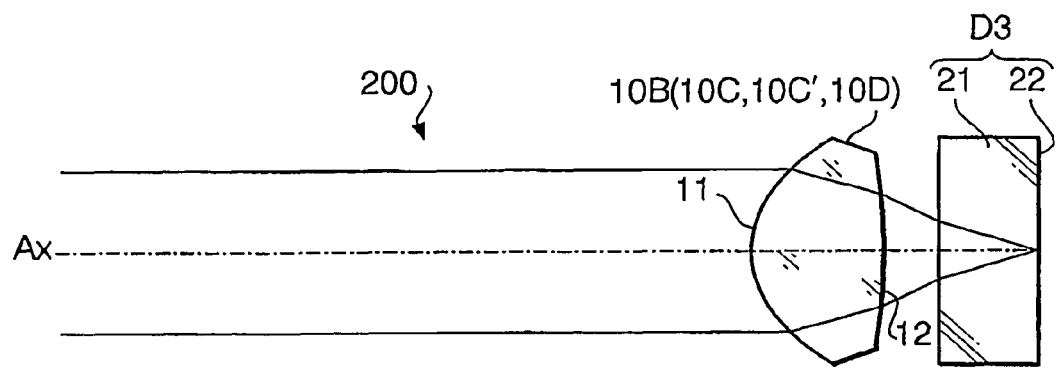
FIG. 5C shows a situation where the third optical disc is used in the optical disc drive of FIG. 4.

FIG. 5A shows a situation where the optical disc D1 is used in the optical disc drive 200. FIG. 5B shows a situation where the optical disc D2 is used in the optical disc drive 200. FIG. 5C shows a situation where the optical disc D3 is used in the optical disc drive 200. In FIGS. 5A, 5B and 5C, a reference axis Ax of the optical disc drive (the optical system) 200 is represented by a chain line. Although each of FIGS. 5A, 5B and 5C shows a situation where the reference axis Ax of the optical disc drive (optical system) 200 coincides with an optical axis of the objective lens 10B, the optical axis may shift from the reference axis Ax when the tracking operation is performed.

As shown in FIG. 4, the first laser beam emitted from the light sources 1A is converted into a collimated beam by the coupling lens 1B. That is, the coupling lens 1B functions as a collimator lens. The first laser beam passed through the coupling lens 1B is directed to the common light path by the beam splitter 42, and is incident on the objective lens 10B. The first laser beam passing through the objective lens 10B is converged onto the recording surface of the optical disc D1. The laser beam reflected by the recording surface of the optical disc is deflected by the half mirror 43 and then is incident on the light receiving unit 44. Since the operations of the optical disc drive 200 for the optical discs D2 and D3 are the same as those of the first embodiment, explanations thereof will not be repeated.

Since wavelengths of the first, second and third laser beams for the optical discs D1, D2 and D3 are different from each other, a refractive index of the objective lens 10B varies depending on the type of the optical disc (the laser beam) being used, causing the spherical aberration to change depending on the type of the laser beam (optical disc) being used. Further, there is a difference between thicknesses of cover layers of the optical discs D1, D2 and D3. Therefore, the spherical aberration on the recording surface changes depending on the type of the optical disc being used.

To support the three type of optical discs D1, D2 and D3, a diffracting structure having an effect on all of the first, second and third laser beams, is formed on the first surface 11 of the objective lens 10B. In this embodiment, the diffracting structure has a first diffracting function (hereafter, frequently referred to as a three wavelength compatibility function) of suppressing the spherical aberration, caused by the wavelength difference between the first, second and third laser beams, to substantially zero. According to the three wavelength compatibility function, the spherical aberration on the recording layer 22 is sufficiently suppressed when each of the first, second and third laser beams is used so that a beam spot suitable for the recordation and/or reproduction for each of the optical discs D1, D2 and D3 can be formed on the recording surface 22 of each optical disc.

Hereafter, the design method of designing the objective lens 10B will be described. In the design method, two different optical path difference (OPD) functions are determined, and the two OPD functions are combined with each other to obtain a diffracting structure to be formed on the objective lens 10B. Since meaning of the term "different optical path difference functions" is explained in the first embodiment, the explanation will not be repeated.

Figure 6A:
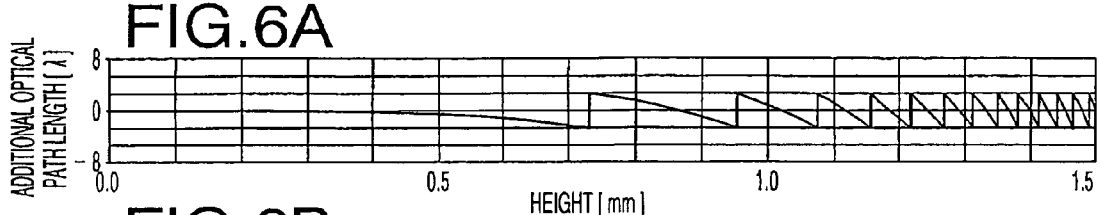
FIG. 6A is a graph illustrating a first OPD function obtained according to the second embodiment.
Figure 6B:
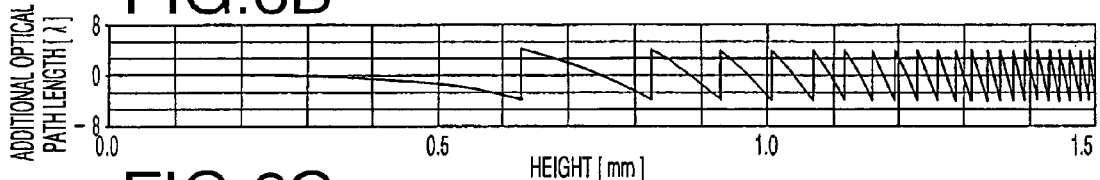
FIG. 6B is a graph illustrating a second OPD function obtained according to the second embodiment.

In this embodiment, first and second OPD functions are determined so that the diffracting structure has the three wavelength compatibility function. FIGS. 6A and 6B are graphs showing the first and second OPD functions, respectively. The first laser beam has the shortest wavelength. Therefore, with regard to the OPD function shown in each of FIGS. 6A and 6B, the additional optical path length is determined to have an amount corresponding to a diffraction order (the second order in FIG. 6A, and the third order in FIG. 6B) at which the first laser beam takes the maximum diffraction efficiency.

Figure 6C:
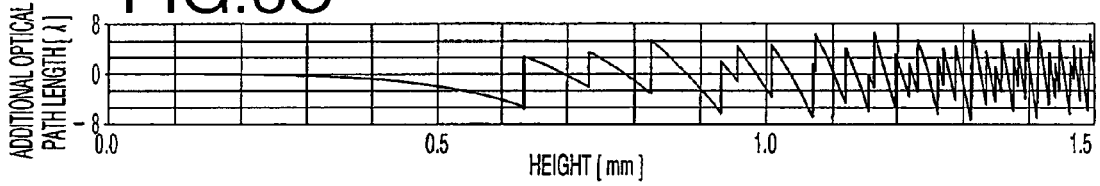
FIG. 6C is a graph illustrating an OPD function directly defining a diffracting structure formed on a first surface of an objective lens according to the second embodiment.

After the first and second OPD functions are thus determined, the first and second OPD functions are combined with each other (summed up), and a diffracting structure defined by the combination of the first and second OPD functions is formed on the first surface 11 of the objective lens 10B. The diffracting structure defined by the combination of the first and second OPD functions has the three wavelength compatibility function. An OPD function directly defining the diffracting structure formed on the first surface 11 is shown in FIG. 6C. As shown in FIG. 6C, a graph (locus) of the OPD function directly defining the diffracting structure corresponds to the sum of the first and second OPD functions.

The degrees of freedom in designing a diffracting structure are limited. Therefore, it was assumed that correcting a spherical aberration varying depending on the wavelength difference between three different laser beams for the three types of optical discs is impossible. However, the design method according to the embodiment makes it possible to increase the degrees of freedom in designing a diffracting structure, thereby enabling the diffracting structure to have the three wavelength compatibility function. Therefore, when the laser beam having a wavelength corresponding to each of the design wavelengths for the optical discs D1, D2 and D3 passes through the objective lens 10B, a beam spot suitable for the recordation and/or reproduction for each of the optical discs D1, D2 and D3 is formed on the recording surface 22, while the spherical aberration on the recording surface is sufficiently suppressed.

Third Embodiment

Hereafter, a design method according to a third embodiment and an objective lens 10C (see FIG. 4) formed by the design method according to the third embodiment will be described. The objective lens 10C is able to support three types of optical discs (i.e., the objective lens 10C has compatibility for the three types of optical discs), and to cancel the spherical aberration which varies depending on the wavelength shift caused when each of the optical discs D1, D2 and D3 is used. That is, a diffracting structure formed on the objective lens 10C has both the three wavelength compatibility function and the wavelength shift compensation function.

Since the configuration of the optical disc drive 200 shown in FIGS. 4, 5A, 5B and 5C is also applied to an optical disc drive according to the third embodiment, the configuration of the optical disc drive according the third embodiment will be explained with reference to FIGS. 4, 5A, 5B and 5C.

Hereafter, the design method of designing the objective lens 10C will be described. In the design method, three different (first to third) optical path difference (OPD) functions are determined, and the three OPD functions are combined with one another to form the diffracting structure to be formed on the objective lens 10C. Since meaning of the term "different optical path difference functions" is explained in the first embodiment, the explanation will not be repeated.

Possible combinations of different proportions to be given by first, second and third OPD functions include:

"2:1:1" for a first OPD function, "3:2:2" for a second OPD function, and "8:5:4" for a third OPD function.
"2:1:1" for a first OPD function, "5:3:2" for a second OPD function, and "8:5:4" for a third OPD function.
"2:1:1" for a first OPD function, "5:3:2" for a second OPD function, and "10:6:5" for a third OPD function.
"2:1:1" for a first OPD function, "5:3:3" for a second OPD function, and "8:5:4" for a third OPD function.
"2:1:1" for a first OPD function, "5:3:3" for a second OPD function, and "10:6:5" for a third OPD function.
"2:1:1" for a first OPD function, "7:4:3" for a second OPD function, and "8:5:4" for a third OPD function.
"2:1:1" for a first OPD function, "7:4:3" for a second OPD function, and "10:6:5" for a third OPD function.
"3:2:2" for a first OPD function, "8:5:4" for a second OPD function, and "10:6:5" for a third OPD function.
"5:3:2" for a first OPD function, "8:5:4" for a second OPD function, and "10:6:5" for a third OPD function.
"5:3:3" for a first OPD function, "8:5:4" for a second OPD function, and "10:6:5" for a third OPD function.
"7:4:3" for a first OPD function, "8:5:4" for a second OPD function, and "10:6:5" for a third OPD function.

Figure 7A:
FIG. 7A is a graph illustrating a first OPD function obtained according to the third embodiment.
Figure 7B:
FIG. 7B is a graph illustrating a second OPD function obtained according to the third embodiment.
Figure 7C:
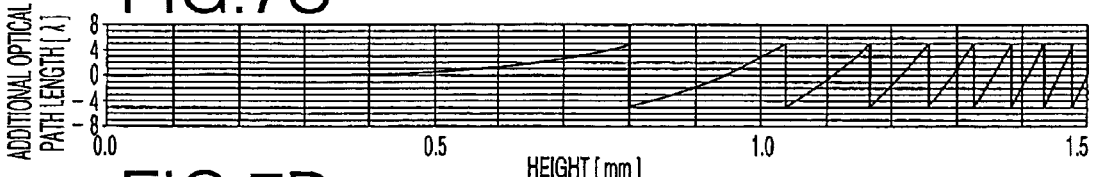
FIG. 7C is a graph illustrating a third OPD function obtained according to the third embodiment.

In this embodiment, the first and second OPD functions principally contribute to the three wavelength compatibility function, and the third OPD function principally contributes to the wavelength shift compensation function. FIGS. 7A and 7B are graphs showing the first and second OPD functions, respectively. FIG. 7C is a graph showing the third OPD function.

The first laser beam has the shortest wavelength. Therefore, with regard to the first OPD shown in FIG. 7A, the additional optical path length is determined to have an amount corresponding to a diffraction order (the second order in this embodiment) at which the first laser beam takes the maximum diffraction efficiency. With regard to the second OPD function shown in FIG. 7B, the additional optical path length is determined to have an amount corresponding to a diffraction order (the third order in this embodiment) at which the first laser beam takes the maximum diffraction efficiency. With regard to the third OPD function shown in FIG. 7C, the additional optical path length is determined to have an amount corresponding to a diffraction order (the tenth order in this embodiment) at which the first laser beam takes the maximum diffraction efficiency.

Figure 7D:
FIG. 7D is a graph illustrating an OPD function directly defining a diffracting structure formed on a first surface of an objective lens according to the third embodiment.

After the first to third OPD functions are thus determined, the first to third OPD functions are combined with one another (summed up), and the diffracting structure defined by the combination of the first to third OPD functions is formed on the first surface 11 of the objective lens 10C. An OPD function directly defining the diffracting structure formed on the first surface 11 is shown in FIG. 7D. As shown in FIG. 7D, a graph (locus) of the OPD function directly defining the diffracting structure corresponds to the sum of the first to third OPD functions.

As described above, according to the first to third embodiments of the present invention, at least two different OPD functions are determined, and the at least two OPD functions are combined with each other. The diffracting structure defined as the combination of the at least two OPD functions is formed on at least one of an optical element in an optical disc drive. Therefore, the degrees of freedom in designing an optical element can be increased responsive to the type or a property of diffracting functions to be given to the optical element.

Since required numerical apertures for the optical discs D1, D2 and D3 are different from each other, the objective lens 10C may be configured such that the first surface 11 is divided into an inner area including the optical axis and an outer area outside the inner area, and separately determined different diffracting structures are respectively formed on the inner and outer areas of the first surface 11 so that a suitable NA can be obtained for each of the optical discs D1, D2 and D3.

According to the above mentioned embodiments, a diffracting structure reflecting a plurality of different OPD functions is obtained. Therefore, an optical element provided with a single diffracting structure having a plurality of types of diffracting functions can be attained. Therefore, an objective lens, capable of forming a beam spot suitable for recording data to and/or reproducing data from each of at least two types of optical discs of the existing optical discs and the new standard optical disc on the recording surface of each of the at least two types of discs, while suppressing the spherical aberration on the recording surface, is obtained. The change of the spherical aberration due to the wavelength shift can also be corrected.

Although the above mentioned embodiments describe the design method of an objective lens, the design method may be applied to design of a plate-like optical element to be located between a light source and an objective lens. Although the above mentioned embodiments describe a single element objective lens, the design method may be applied to one of lenses constituting an objective lens system.

Hereafter, four concrete (first to fourth) examples of the optical disc drive (optical system) 100 employing the objective lens 10A according to the first embodiment, a concrete (fifth) example of the optical disc drive (optical system) 200 employing the objective lens 10B according to the second embodiment, and a concrete (sixth) example of the optical disc drive (optical system) 200 employing the objective lens 10C according to the third embodiment will be described. Further, four concrete (seventh to tenth) examples of an optical disc drive employing an objective lens designed according to a design method in which the designed methods according to the above mentioned embodiments are combined will be described.

In each of the following examples, the optical disc D1 having the highest recording density has the cover layer thickness of 0.6 mm, the optical disc D2 having the second highest recording density has the cover layer thickness of 0.6 mm, and the optical disc D3 having the lowest recording density has the cover layer thickness of 1.2 mm. In each of the optical disc drives in the following examples supporting two types of optical discs, the optical discs D2 and D3 are used.

First Example

Hereafter, a first example of the optical disc drive 100 will be described with reference to FIGS. 1, 2A and 2B. The objective lens 10A according to the first example supports both of the optical discs D2 and D3. In this example, the aperture stop is located at a position between the light source 3A and the objective lens 10A to reduce the beam diameter of the third laser beam when the optical disc D3 is used, so that an NA suitable for the optical disc D3 can be obtained. As can be seen from FIGS. 2A and 2B, the beam diameter of the third laser beam is smaller than that of the second laser beam. Performance specifications of the objective lens 10A according to the first example are shown in Table 1.

TABLE 1

|  | Second laser beam | Third laser beam |
|---|---|---|
| Design wavelength | 660 | 790 |
| focal length | 2.500 | 2.516 |
| NA | 0.600 | 0.496 |
| magnification | ∞ | ∞ |

In Table 1 (and in the following similar Tables), "NA" represents the numerical aperture. In Table 1, the performance specifications are indicated for each of the second laser beam (the optical disc D2) and the third laser beam (the optical disc D3). As shown by the values of the magnification in Table 1, the second and third laser beams are respectively incident on the optical discs D2 and D3 as collimated beams.

Table 2 shows a numerical configuration of the optical disc drive 100 according to the first example when each of the optical disc D2 (the second laser beam) and the optical disc D3 (the third laser beam) is used.

TABLE 2

| Surface Number | r | d Disc D2 (660 nm) | d Disc D3 (790 nm) | n Disc D2 (660 nm) | n Disc D3 (790 nm) |
|---|---|---|---|---|---|
| #0 | ∞ | ∞ | ∞ | 1.00000 | 1.00000 |
| #1 | 1.801 | 1.550 | 1.550 | 1.54044 | 1.53653 |
| #2 | −9.394 | 1.206 | 0.836 | 1.00000 | 1.00000 |
| #3 | ∞ | 0.600 | 1.200 | 1.57961 | 1.57307 |
| #4 | ∞ | 0.000 | 0.000 | 1.00000 | 1.00000 |

In Table 2 (and in the following similar Tables), surface #0 represents the light source, surfaces #1 and #2 represent the first and second surfaces 11 and 12 of the objective lens 10A, respectively, and surfaces #3 and #4 respectively represent the cover layer 21 and the recording surface 22 of each of the optical discs D2 and D3. In Table 2 (and in the following similar Tables), optical components between the light source and the objective lens are omitted for the sake of convenience.

In Table 2 (and in the following similar Tables), "r" represents a radius of curvature (unit: mm) of each lens surface on the optical axis, "d" represents a thickness of a lens or a distance (unit: mm) from a lens surface to a next lens surface, "n" represents a refractive index at a wavelength of the beam being used, and "d" and "n" are indicated for each of the wavelengths of the second and third laser beams (optical discs D2 and D3).

Each of the first and second surfaces #11 and #12 of the objective lens 10A is an aspherical surface. Table 3 shows the conical coefficient and aspherical coefficients of the first and second surfaces 11 and 12 (surfaces #1 and #2) of the objective lens 10A.

TABLE 3

| Surface No. | K | A4 | A6 | A8 | A10 | A12 |
|---|---|---|---|---|---|---|
| 1 | −0.64000 | 3.74587E−03 | 1.61863E−03 | −4.25071E−04 | 2.16370E−04 | −9.97438E−05 |
| 2 | 0.00000 | 2.23972E−02 | −4.55207E−03 | −2.05483E−03 | 6.24279E−04 | 0.00000E+00 |

In Table 3 (and in the following similar Tables), a notation symbol E indicates that 10 is used as a radix and a right side value of E is used as an exponent.

In this example, a diffracting structure is formed on the first surface 11 of the objective lens 10A according to the design method of the first embodiment. Table 4 shows coefficients $P_{2i}$ for first and second OPD functions which define the diffracting structure to be formed on the first surface 11 of the objective lens 10A. Table 5 shows diffraction orders m for the first and second OPD functions.

TABLE 4

| Surface No. | | P2 | P4 | P6 | P8 |
|---|---|---|---|---|---|
| 1 | 1st OPD Function | 0.00000E+00 | −5.60464E+00 | −5.83319E−01 | −1.70940E−01 |
| | 2nd OPD Function | −8.00000E+00 | 5.06892E−01 | 1.73236E−01 | 0.00000E+00 |

TABLE 5

| | wavelength [nm] | |
|---|---|---|
| | 660 | 790 |
| 1st OPD Function | 1 | 1 |
| 2nd OPD Function | 6 | 5 |

Graphs shown in FIGS. 3A and 3B respectively represent the first and second OPD functions determined with regard to the second laser beam having the shortest wavelength. The graph shown in FIG. 3C represents the OPD function directly defining the diffracting structure of the objective lens 10A.

FIG. 8A is a graph illustrating the spherical aberration caused in the optical disc drive 100 when the second laser beam (i.e., the optical disc D2) is used. FIG. 8B is a graph illustrating the spherical aberration caused in the optical disc drive 100 when the third laser beam (i.e., the optical disc D3) is used. In FIGS. 8A and 8B (and in the following similar drawings), the spherical aberration at the design wavelength is represented by a solid line, the spherical aberration at a wavelength shifted by −10 nm from the design wavelength is represented by a dotted line, the spherical aberration at a wavelength shifted by −5 nm from the design wavelength is represented by a chain line, the spherical aberration at a wavelength shifted by +5 nm from the design wavelength is represented by a chain double-dashed line, and the spherical aberration at a wavelength shifted by +10 nm from the design wavelength is represented by a dashed line.

As can be seen from FIGS. 8A and 8B, the objective lens 10A according to the first example is able to suitably converge the second and third laser beams on the recording surfaces of the optical discs D2 and D3, respectively, without causing the spherical aberration. The amount of spherical aberration caused by the wavelength shift is also suppressed sufficiently. It should be noted that the shift of a converging point of each laser beam in an optical axis (AX) direction can be corrected by moving the objective lens 10A in the optical axis direction by use of an actuator (not shown). Such a configuration for correcting the converging point by use of the actuator can also be applied to the following examples.

Second Example

Hereafter, a second example of the optical disc drive 100 will be described with reference to FIGS. 1, 2A and 2B. The objective lens 10A according to the second example supports both of the optical discs D2 and D3. In this example, the aperture stop is located at a position between the light source 3A and the objective lens 10A to reduce the beam diameter of the third laser beam when the optical disc D3 is used, so that an NA suitable for the optical disc D3 can be obtained. Performance specifications of the objective lens 10A according to the second example are shown in Table 6. As shown by the values of the magnification in Table 6, the second and third laser beams are respectively incident on the optical discs D2 and D3 as collimated beams.

TABLE 6

|  | Second laser beam | Third laser beam |
|---|---|---|
| Design wavelength | 660 | 790 |
| focal length | 2.500 | 2.517 |
| NA | 0.600 | 0.469 |
| magnification | ∞ | ∞ |

Table 7 shows a numerical configuration of the optical disc drive 100 according to the second example when the optical disc D2 (the second laser beam) and the optical disc D3 (the third laser beam) are used.

TABLE 7

| Surface Number | r | d Disc D2 (660 nm) | d Disc D3 (790 nm) | n Disc D2 (660 nm) | n Disc D3 (790 nm) |
|---|---|---|---|---|---|
| #0 | ∞ | ∞ | ∞ | 1.00000 | 1.00000 |
| #1 | 1.587 | 1.550 | 1.550 | 1.54044 | 1.53653 |
| #2 | −5.975 | 1.264 | 0.896 | 1.00000 | 1.00000 |
| #3 | ∞ | 0.600 | 1.200 | 1.57961 | 1.57307 |
| #4 | ∞ | 0.000 | 0.000 | 1.00000 | 1.00000 |

Each of the first and second surfaces #11 and #12 of the objective lens 10A is an aspherical surface. Table 8 shows the conical coefficient and aspherical coefficients of the first and second surfaces 11 and 12 (surfaces #1 and #2) of the objective lens 10A.

TABLE 8

| Surface No. | K | A4 | A6 | A8 | A10 | A12 |
|---|---|---|---|---|---|---|
| 1 | −0.64000 | 2.55048E−03 | 2.16740E−03 | −6.48007E−04 | 4.15821E−04 | −1.66252E−04 |
| 2 | 0.00000 | 2.85747E−02 | −5.54844E−03 | −1.57893E−03 | 4.73835E−04 | 0.00000E+00 |

In this example, a diffracting structure is formed on the first surface 11 of the objective lens 10A according to the design method of the first embodiment. Table 9 shows coefficients $P_{2i}$ for first and second OPD functions which define the diffracting structure to be formed on the first surface 11 of the objective lens 10A. Table 10 shows diffraction orders m for the first and second OPD functions.

TABLE 9

| | Surface No. | P2 | P4 | P6 | P8 |
|---|---|---|---|---|---|
| 1 | 1st OPD Function | 0.00000E+00 | −5.62940E+00 | −6.21288E−01 | −1.66181E−01 |
| | 2nd OPD Function | 0.00000E+00 | 7.93858E−01 | 2.48095E−01 | 0.00000E+00 |

TABLE 10

|  | wavelength [nm] | |
|---|---|---|
|  | 660 | 790 |
| 1st OPD Function | 1 | 1 |
| 2nd OPD Function | 6 | 5 |

Figure 9A:
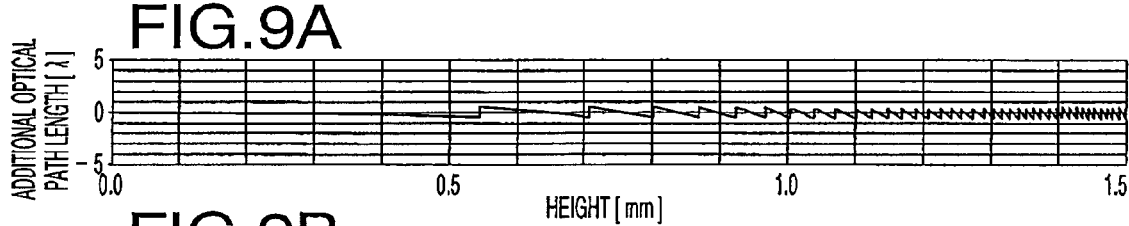
FIG. 9A is a graph illustrating a first OPD function determined according to a second example.
Figure 9B:
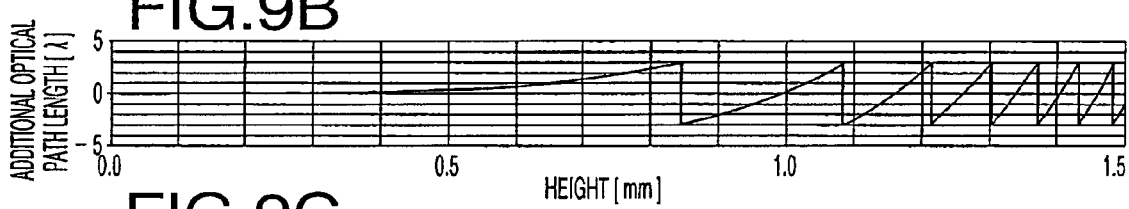
FIG. 9B is a graph illustrating a second OPD function determined according to the second example.
Figure 9C:
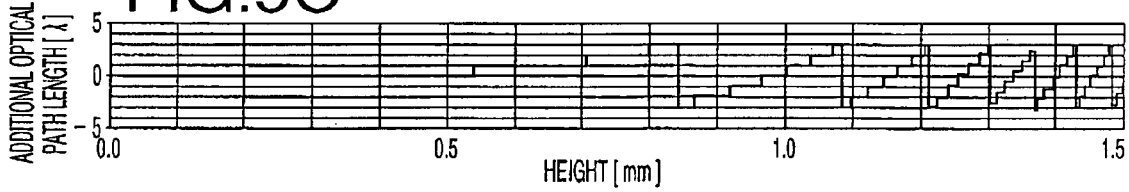
FIG. 9C is a graph illustrating an OPD function directly defining a diffracting structure according to the second example.

Graphs shown in FIGS. 9A and 9B respectively represent the first and second OPD functions determined with regard to the second laser beam having the shortest wavelength. The graph shown in FIG. 9C represents an OPD function directly defining the diffracting structure of the objective lens 10A.

Figure 10A:
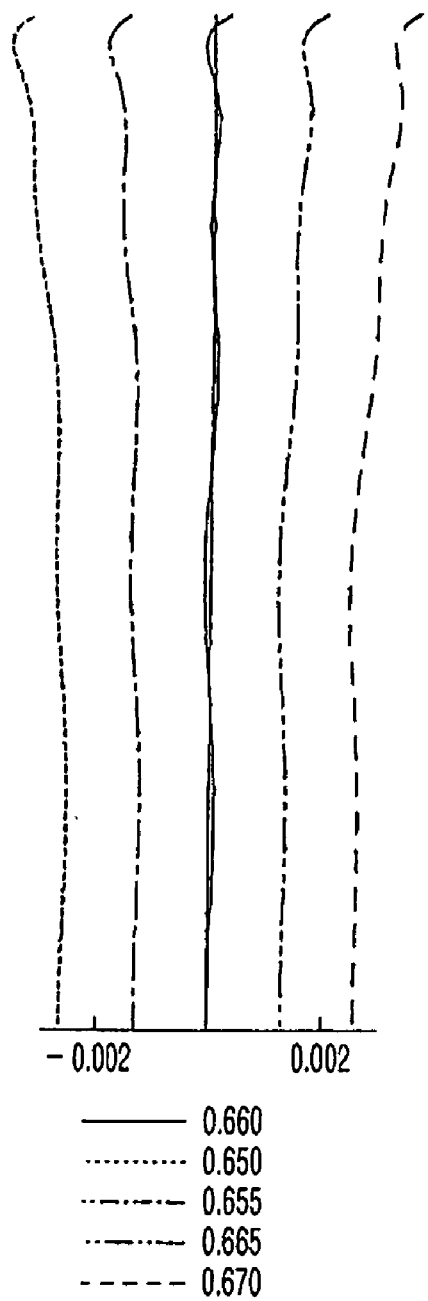
FIG. 10A is a graph illustrating a spherical aberration caused in an optical disc drive according to the second example when the second laser beam is used.
Figure 10B:
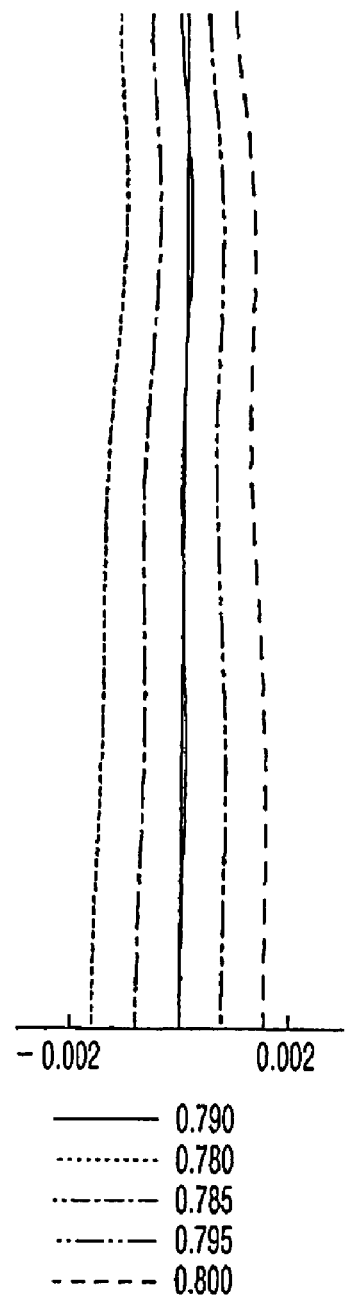
FIG. 10B is a graph illustrating the spherical aberration caused in the optical disc drive according to the second example when the third laser beam is used.

FIG. 10A is a graph illustrating the spherical aberration caused in the optical disc drive 100 when the second laser beam (i.e., the optical disc D2) is used. FIG. 10B is a graph illustrating the spherical aberration caused in the optical disc drive 100 when the third laser beam (i.e., the optical disc D3) is used.

As can be seen from FIGS. 10A and 10B, the objective lens 10A according to the second example is able to suitably converge the second and third laser beams on the recording surfaces of the optical discs D2 and D3, respectively, without causing the spherical aberration. The amount of spherical aberration caused by the wavelength shift is also corrected sufficiently.

In the first and second examples, the objective lens 10A having the compatibility for the optical discs D2 and D3 are explained. However, an optical disc drive having compatibility for all of the optical discs D1, D2 and D3 may be configured by using the objective lens 10A according to the first or second example. In this case, the degree of divergence of one of the first to third laser beams is changed for a particular optical disc. Such an optical disc drive will be explained in the following third and fourth examples.

Third Example

Figure 11:
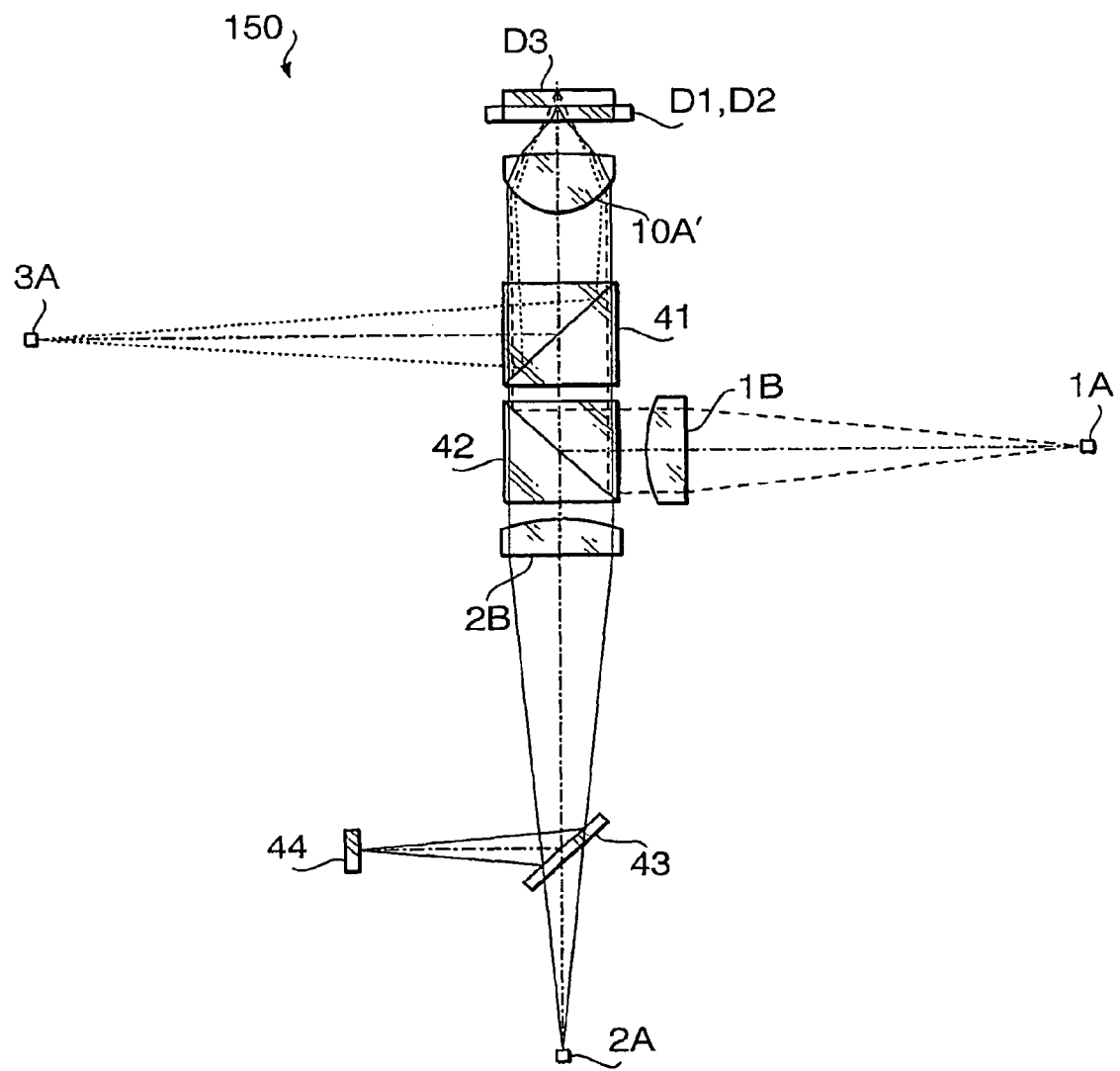
FIG. 11 shows a configuration of an optical disc drive according to a third example.
Figure 12A:
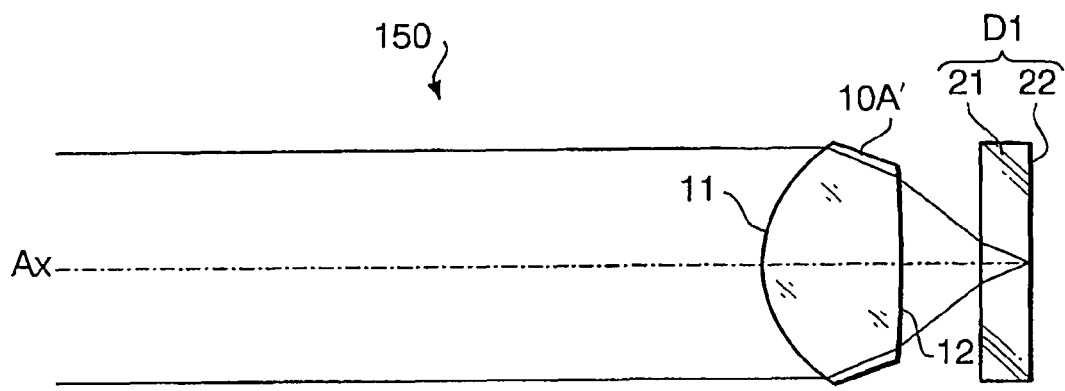
FIG. 12A shows a situation where the first optical disc is used in the optical disc drive of FIG. 11.
Figure 12B:
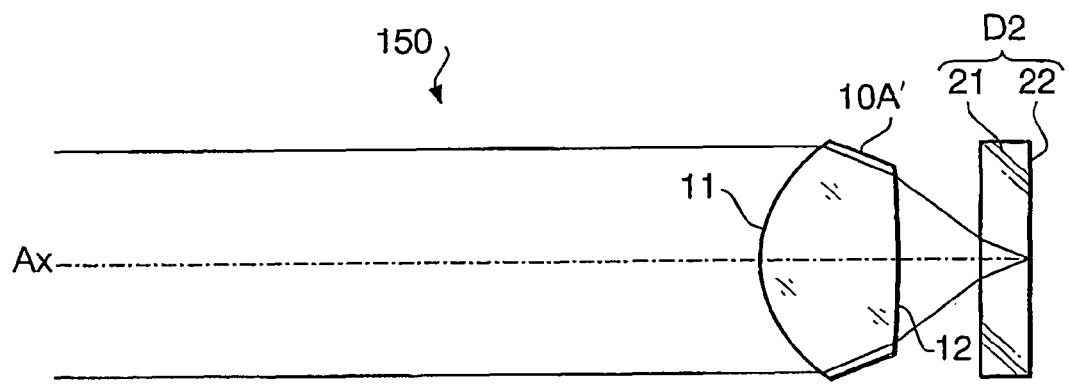
FIG. 12B shows a situation where the second optical disc is used in the optical disc drive of FIG. 11.
Figure 12C:
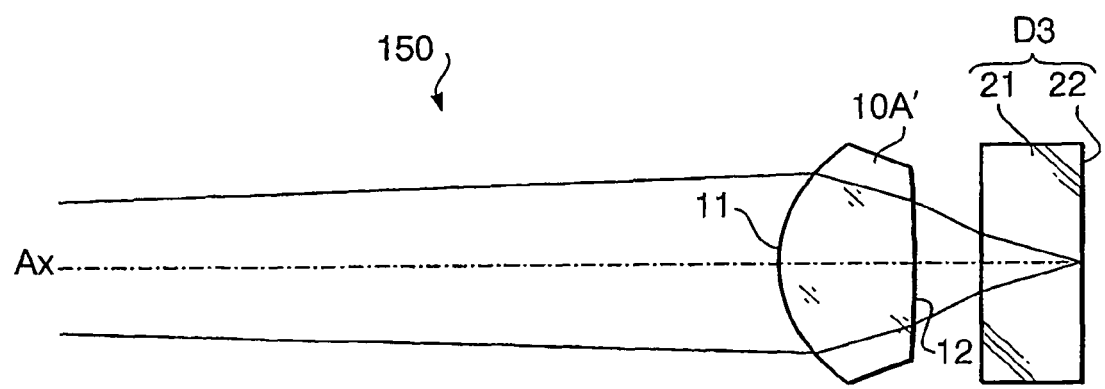
FIG. 12C shows a situation where the third optical disc is used in the optical disc drive of FIG. 11.

Hereafter, a third example of the optical disc drive 100 will be described. FIG. 11 shows a configuration of an optical disc drive 150 according to the third example. The optical disc drive 150 includes an objective lens 10A'. FIG. 12A shows a situation where the optical disc D1 is used in the optical disc drive 150. FIG. 12B shows a situation where the optical disc D2 is used in the optical disc drive 150. FIG. 12C shows a situation where the optical disc D3 is used in the optical disc drive 150.

Performance specifications of the objective lens 10A' according to the third example are shown in Table 11.

TABLE 11

|  | First laser beam | Second laser beam | Third laser beam |
|---|---|---|---|
| Design wavelength | 408 | 660 | 790 |
| focal length | 2.250 | 2.324 | 2.336 |
| NA | 0.667 | 0.645 | 0.462 |
| magnification | ∞ | ∞ | −0.082 |

As shown by the values of the magnification in Table 11, the first and second laser beams are respectively incident on the optical discs D1 and D2 as collimated beams, so that the objective lens 10A' has the compatibility for the optical discs D1 and D2. As shown in Table 11 and FIG. 12C, the third laser beam is incident on the objective lens 10A' as a diverging beam so that the optical disc drive 150 can also support the optical disc D3.

Table 12 shows a numerical configuration of the optical disc drive 150 when each of the optical discs D1, D2 and D3 is used.

TABLE 12

| Surface Number | r | d Disc D1 (408 nm) | d Disc D2 (660 nm) | d Disc D3 (790 nm) | n Disc D1 (408 nm) | n Disc D2 (660 nm) | n Disc D3 (790 nm) |
|---|---|---|---|---|---|---|---|
| #0 | ∞ | ∞ | ∞ | ∞ | −34.300 | 1.00000 | 1.00000 | 1.00000 |
| #1 | 1.760 | 1.600 | 1.600 | 1.600 | 1.52424 | 1.50635 | 1.50313 |
| #2 | −9.185 | 0.907 | 0.960 | 0.778 | 1.00000 | 1.00000 | 1.00000 |
| #3 | ∞ | 0.600 | 0.600 | 1.200 | 1.62110 | 1.57961 | 1.57307 |
| #4 | ∞ | 0.000 | 0.000 | 0.000 | 1.00000 | 1.00000 | 1.00000 |

Each of the first and second surfaces #11 and #12 of the objective lens 10A' is an aspherical surface. Table 13 shows the conical coefficient and aspherical coefficients of the first and second surfaces 11 and 12 (surfaces #1 and #2) of the objective lens 10A'.

TABLE 13

| Surface No. | K | A4 | A6 | A8 | A10 | A12 |
|---|---|---|---|---|---|---|
| 1 | −0.64000 | 5.78073E−03 | 2.17189E−03 | −1.22622E−03 | 6.14588E−04 | −1.87882E−04 |
| 2 | 0.00000 | 3.79205E−02 | −5.63518E−03 | −1.35269E−02 | 7.68517E−03 | −1.33936E−03 |

In this example, a diffracting structure is formed on the first surface 11 of the objective lens 10A' according to the design method of the first embodiment. Table 14 shows coefficients $P_{2i}$ for first and second OPD functions which define the diffracting structure to be formed on the first surface 11 of the objective lens 10A'. Table 15 shows diffraction orders m for the first and second OPD functions.

TABLE 14

| Surface No. | | P2 | P4 | P6 | P8 | P10 |
|---|---|---|---|---|---|---|
| 1 | 1st OPD Function | 0.00000E+00 | 4.13451E−01 | 9.31428E−01 | −5.32720E−01 | 1.14832E−01 |
|   | 2nd OPD Function | −1.40000E+01 | −8.42040E−01 | −1.89462E−01 | 5.37631E−03 | 0.00000E+00 |

TABLE 15

| | wavelength [nm] | | |
|---|---|---|---|
| | 408 | 660 | 790 |
| 1st OPD Function | 2 | 1 | 1 |
| 2nd OPD Function | 10 | 6 | 5 |

Figure 13A:
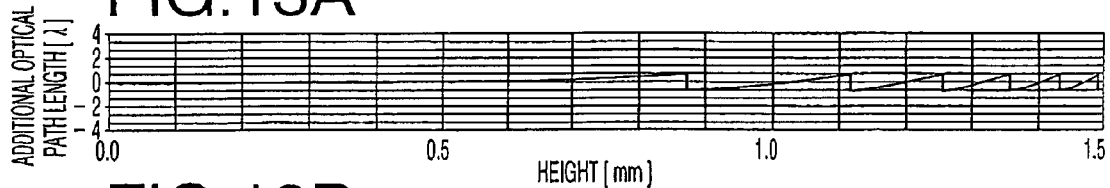
FIG. 13A is a graph illustrating a first OPD function determined according to the third example.
Figure 13B:
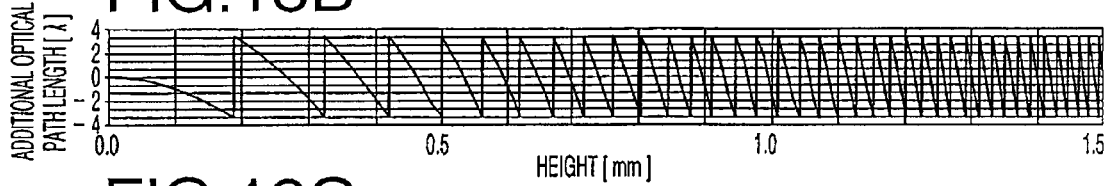
FIG. 13B is a graph illustrating a second OPD function determined according to the third example.
Figure 13C:
FIG. 13C is a graph illustrating an OPD function directly defining a diffracting structure according to the third example.

Graphs shown in FIGS. 13A and 13B respectively represent the first and second OPD functions determined with regard to the first laser beam having the shortest wavelength. The graph shown in FIG. 13C represents an OPD function directly defining the diffracting structure of the objective lens 10A'.

Figure 14A:
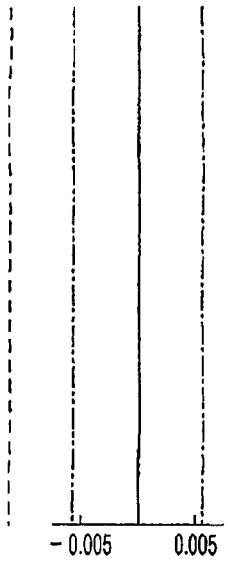
FIG. 14A is a graph illustrating a spherical aberration caused in the optical disc drive according to the third example when a first laser beam for the first optical disc is used.
Figure 14B:
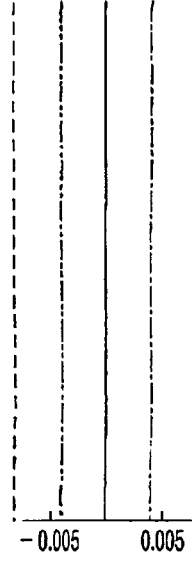
FIG. 14B is a graph illustrating the spherical aberration caused in the optical disc drive according to the third example when the second laser beam is used.
Figure 14C:
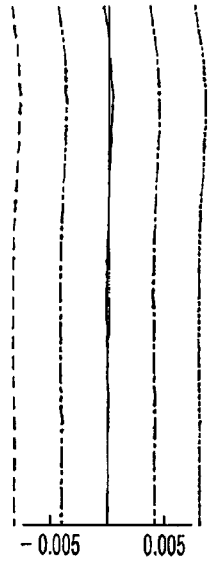
FIG. 14C is a graph illustrating the spherical aberration caused in the optical disc drive according to the third example when the third laser beam is used.

FIG. 14A is a graph illustrating the spherical aberration caused in the optical disc drive 150 when the first laser beam (i.e., the optical disc D1) is used. FIG. 14B is a graph illustrating the spherical aberration caused in the optical disc drive 150 when the second laser beam (i.e., the optical disc D2) is used. FIG. 14C is a graph illustrating the spherical aberration caused in the optical disc drive 150 when the third laser beam (i.e., the optical disc D3) is used.

As can be seen from FIGS. 14A, 14B and 14C, the objective lens 10A' according to the third example is able to suitably converge the first, second and third laser beams on the recording surfaces of the optical discs D1, D2 and D3, respectively, without causing the spherical aberration. With regard to the spherical aberration caused by the wavelength shift, the objective lens 10A' has optical performance that the spherical aberration is corrected most suitably for the optical disc D1 having the highest recording density because the optical disc D1 has the lowest tolerance to aberrations. Therefore, even if the wavelength of the first laser beam for the optical disc D1 shifts from the design wavelength, the spherical aberration is kept at a low level as shown in FIG. 14A. As shown in FIGS. 14B and 14C, the amount of spherical aberration caused when each of the optical discs D2 and D3 is used is also corrected sufficiently.

Fourth Example

Hereafter, a fourth example of the optical disc drive 100 will be described with reference to FIGS. 11, and 12A to 12C.

Performance specifications of the objective lens 10A' according to the fourth example are shown in Table 16.

TABLE 16

| | First laser beam | Second laser beam | Third laser beam |
|---|---|---|---|
| Design wavelength | 408 | 660 | 790 |
| focal length | 2.250 | 2.324 | 2.338 |
| NA | 0.667 | 0.645 | 0.466 |
| magnification | ∞ | ∞ | −0.090 |

As shown by the values of the magnification in Table 16, the first and second laser beams are respectively incident on the optical discs D1 and D2 as collimated beams, so that the objective lens 10A' has the compatibility for the optical discs D1 and D2. As shown in Table 16 and FIG. 12C, the third laser beam is incident on the objective lens 10A' as a diverging beam so that the optical disc drive 150 can also support the optical disc D3.

Table 17 shows a numerical configuration of the optical disc drive 150 according to the fourth example when each of the optical discs D1, D2 and D3 is used.

TABLE 17

| Surface Number | r | d Disc D1 (408 nm) | d Disc D2 (660 nm) | d Disc D3 (790 nm) | n Disc D1 (408 nm) | n Disc D2 (660 nm) | n Disc D3 (790 nm) |
|---|---|---|---|---|---|---|---|
| #0 | ∞ | ∞ | ∞ | −27.900 | 1.00000 | 1.00000 | 1.00000 |
| #1 | 1.417 | 1.600 | 1.600 | 1.600 | 1.52424 | 1.50635 | 1.50313 |
| #2 | −4.311 | 1.006 | 1.062 | 0.902 | 1.00000 | 1.00000 | 1.00000 |
| #3 | ∞ | 0.600 | 0.600 | 1.200 | 1.62110 | 1.57961 | 1.57307 |
| #4 | ∞ | 0.000 | 0.000 | 0.000 | 1.00000 | 1.00000 | 1.00000 |

Each of the first and second surfaces #11 and #12 of the objective lens 10A' is an aspherical surface. Table 18 shows the conical coefficient and aspherical coefficients of the first and second surfaces 11 and 12 (surfaces #1 and #2) of the objective lens 10A'.

TABLE 18

| Surface No. | K | A4 | A6 | A8 | A10 | A12 | A14 |
|---|---|---|---|---|---|---|---|
| 1 | −0.64000 | 5.59605E−03 | −1.99109E−04 | 2.60559E−03 | −2.05847E−03 | 9.35604E−04 | −2.06217E−04 |
| 2 | 0.00000 | 6.27845E−02 | −3.54064E−02 | 2.51528E−02 | −1.60903E−02 | 5.51115E−03 | −7.57275E−04 |

In this example, a diffracting structure is formed on the first surface 11 of the objective lens 10A' according to the design method of the first embodiment. Table 19 shows coefficients $P_{2i}$ for first and second OPD functions which define the diffracting structure to be formed on the first surface 11 of the objective lens 10A'. Table 20 shows diffraction orders m for the first and second optical path difference OPD functions.

TABLE 19

| Surface No. | | P2 | P4 | P6 | P8 | P10 | P12 |
|---|---|---|---|---|---|---|---|
| 1 | 1$^{st}$ OPD Function | 0.00000E+00 | 1.59981E+00 | −4.01808E−01 | 1.00538E+00 | −5.38840E−01 | 1.03854E−01 |
|  | 2$^{nd}$ OPD Function | 0.00000E+00 | −4.16477E−01 | −2.19935E−02 | −3.42242E−02 | 0.00000E+00 | 0.00000E+00 |

TABLE 20

| | wavelength [nm] | | |
|---|---|---|---|
| | 408 | 660 | 790 |
| 1$^{st}$ OPD Function | 2 | 1 | 1 |
| 2$^{nd}$ OPD Function | 10 | 6 | 5 |

Figure 15A:
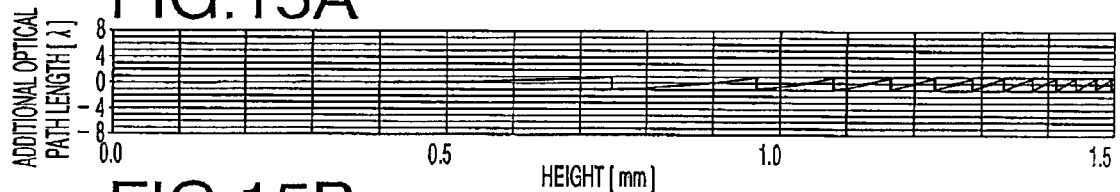
FIG. 15A is a graph illustrating a first OPD function determined according to a fourth example.
Figure 15B:
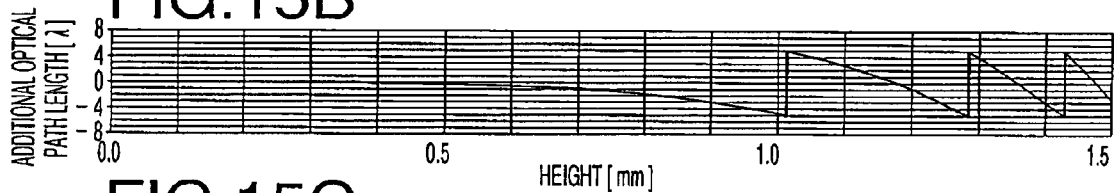
FIG. 15B is a graph illustrating a second OPD function determined according to the fourth example.
Figure 15C:
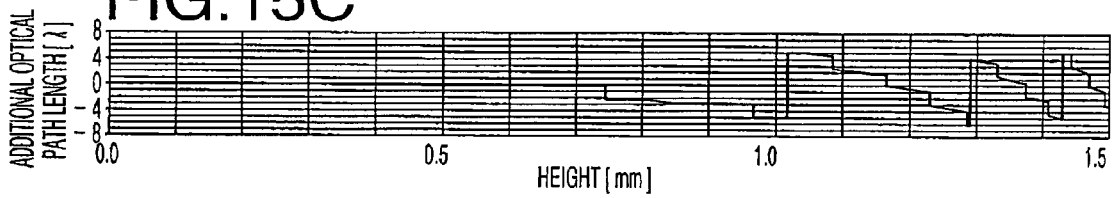
FIG. 15C is a graph illustrating an OPD function directly defining a diffracting structure according to the fourth example.

Graphs shown in FIGS. 15A and 15B respectively represent the first and second OPD functions determined with regard to the first laser beam having the shortest wavelength. The graph shown in FIG. 15C represents an OPD function directly defining the diffracting structure of the objective lens 10A'.

Figure 16A:
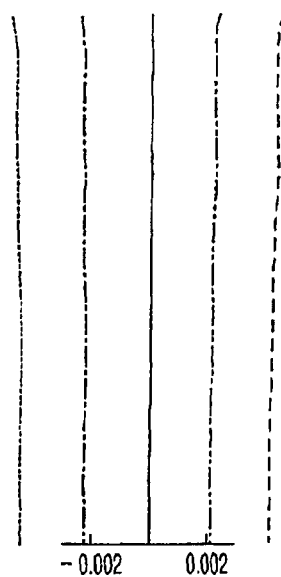
FIG. 16A is a graph illustrating a spherical aberration caused in the optical disc drive according to the fourth example when the first laser beam is used.
Figure 16B:
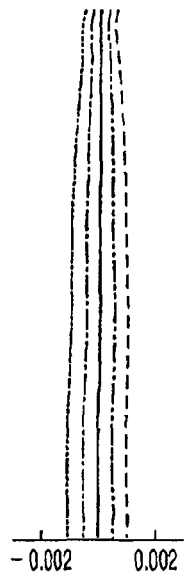
FIG. 16B is a graph illustrating the spherical aberration caused in the optical disc drive according to the fourth example when the second laser beam is used.
Figure 16C:
FIG. 16C is a graph illustrating the spherical aberration caused in the optical disc drive according to the fourth example when the third laser beam is used.

FIG. 16A is a graph illustrating the spherical aberration caused in the optical disc drive 150 when the first laser beam (i.e., the optical disc D1) is used. FIG. 16B is a graph illustrating the spherical aberration caused in the optical disc drive 150 when the second laser beam (i.e., the optical disc D2) is used. FIG. 16C is a graph illustrating the spherical aberration caused in the optical disc drive 150 when the third laser beam (i.e., the optical disc D3) is used.

As can be seen from FIGS. 16A, 166B and 16C, the objective lens 10A' according to the fourth example is able to suitably converge the first, second and third laser beams on the recording surfaces of the optical discs D1, D2 and D3, respectively, without causing the spherical aberration. With regard to the spherical aberration caused by the wavelength shift, the objective lens 10A' has optical performance that the spherical aberration is corrected most suitably for the optical disc D1 having the highest recording density. Therefore, even if the wavelength of the first laser beam shifts from the design wavelength, the spherical aberration is kept at a low level as shown in FIG. 16A. As shown in FIGS. 16B and 16C, the amount of spherical aberration caused when each of the optical discs D2 and D3 is used is also corrected sufficiently.

Fifth Example

Hereafter, a fifth example of the optical disc drive 200 will be described with reference to FIGS. 4 and 5A to 5C. Performance specifications of the objective lens 10B according to the fifth example are shown in Table 21.

TABLE 21

| | First laser beam | Second laser beam | Third laser beam |
|---|---|---|---|
| Design wavelength | 408 | 660 | 790 |
| focal length | 2.250 | 2.324 | 2.338 |
| NA | 0.667 | 0.645 | 0.470 |
| magnification | ∞ | ∞ | ∞ |

As shown by the values of the magnification in Table 21, according to the three wavelength compatibility function provided by the diffracting structure formed on the objective lens 10B, the first, second and third laser beams are allowed to be incident on the objective lens 10B as collimated beams, respectively.

Table 22 shows a numerical configuration of the optical disc drive 200 according to the fifth example when each of the optical discs D1, D2 and D3 is used.

TABLE 22

| Surface Number | r | d Disc D1 (408 nm) | d Disc D2 (660 nm) | d Disc D3 (790 nm) | n Disc D1 (408 nm) | n Disc D2 (660 nm) | n Disc D3 (790 nm) |
|---|---|---|---|---|---|---|---|
| #0 | ∞ | ∞ | ∞ | ∞ | 1.00000 | 1.00000 | 1.00000 |
| #1 | 1.392 | 1.600 | 1.600 | 1.600 | 1.52424 | 1.50635 | 1.50313 |
| #2 | −4.675 | 0.990 | 1.046 | 0.676 | 1.00000 | 1.00000 | 1.00000 |
| #3 | ∞ | 0.600 | 0.600 | 1.200 | 1.62110 | 1.57961 | 1.57307 |
| #4 | ∞ | 0.000 | 0.000 | 0.000 | 1.00000 | 1.00000 | 1.00000 |

Each of the first and second surfaces #11 and #12 of the objective lens 10B is an aspherical surface. Table 23 shows the conical coefficient and aspherical coefficients of the first and second surfaces 11 and 12 (surfaces #1 and #2) of the objective lens 10B.

TABLE 23

| Surface No. | K | A4 | A6 | A8 | A10 | A12 | A14 |
|---|---|---|---|---|---|---|---|
| 1 | −0.64000 | 1.27937E−04 | −1.76290E−03 | 1.70447E−03 | −2.49261E−03 | 1.52369E−03 | −3.80496E−04 |
| 2 | 0.00000 | 7.75911E−02 | −6.96224E−02 | 6.85768E−02 | −4.63783E−02 | 1.59165E−02 | −2.19585E−03 |

In this example, a diffracting structure is formed on the first surface 11 of the objective lens 10B according to the design method of the second embodiment. Table 24 shows coefficients $P_{2i}$ for first and second OPD functions which define the diffracting structure to be formed on the first surface 11 of the objective lens 10B. Table 25 shows diffraction orders m for the first and second OPD functions.

TABLE 24

| Surface No. | | P2 | P4 | P6 | P8 | P10 |
|---|---|---|---|---|---|---|
| 1 | 1$^{st}$ OPD Function | 0.00000E+00 | −1.62222E+00 | −6.93841E−02 | −1.55072E−01 | 0.00000E+00 |
| | 2$^{nd}$ OPD Function | 0.00000E+00 | −2.89986E+00 | −4.31520E−01 | −4.15845E−02 | −2.51915E−02 |

TABLE 25

| | wavelength [nm] | | |
|---|---|---|---|
| | 408 | 660 | 790 |
| 1$^{st}$ OPD Function | 2 | 1 | 1 |
| 2$^{nd}$ OPD Function | 3 | 2 | 2 |

Graphs shown in FIGS. 6A and 6B respectively represent the first and second OPD functions determined with regard to the first laser beam having the shortest wavelength. The graph shown in FIG. 6C represents an OPD function directly defining the diffracting structure of the objective lens 10B.

Figure 17A:
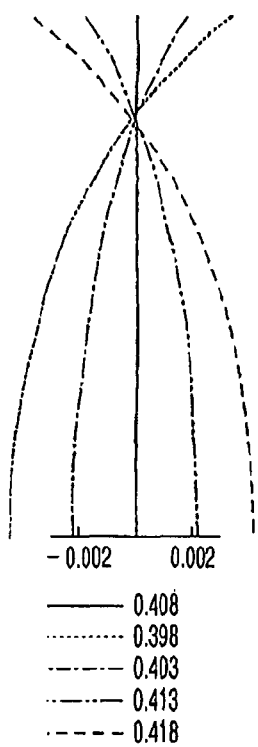
FIG. 17A is a graph illustrating a spherical aberration caused in an optical disc drive according to a fifth example when the first laser beam is used.
Figure 17B:
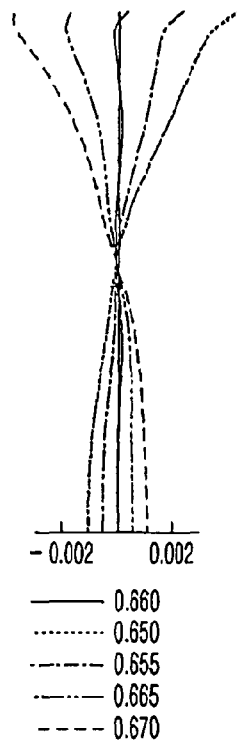
FIG. 17B is a graph illustrating the spherical aberration caused in the optical disc drive according to the fifth example when the second laser beam is used.
Figure 17C:
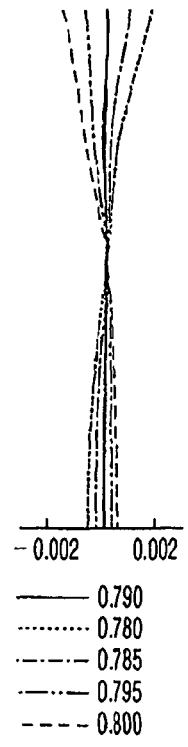
FIG. 17C is a graph illustrating the spherical aberration caused in the optical disc drive according to the fifth example when the third laser beam is used.

FIG. 17A is a graph illustrating the spherical aberration caused in the optical disc drive 200 when the first laser beam (i.e., the optical disc D1) is used. FIG. 17B is a graph illustrating the spherical aberration caused in the optical disc drive 200 when the second laser beam (i.e., the optical disc D2) is used. FIG. 17C is a graph illustrating the spherical aberration caused in the optical disc drive 200 when the third laser beam (i.e., the optical disc D3) is used.

As can be seen from FIGS. 17A, 17B and 17C, the objective lens 10B according to the fifth example is able to suitably converge the first, second and third laser beams on the recording surfaces of the optical discs D1, D2 and D3, respectively, without causing the spherical aberration.

Since the objective lens 10B is configured to have the compatibility for all of the optical discs D1, D2 and D3, the effect of correcting spherical aberration, attained by the diffracting structure formed on the objective lens 10B when the wavelength shift of each of the first to third laser beams occurs, is relatively small. By contrast, objective lenses 10C (10C') described in the following (sixth to tenth) examples are configured to suppress the change of the spherical aberration due to the wavelength shift more suitably while keeping the compatibility for all of the optical discs D1, D2 and D3.

Sixth Example

Hereafter, a sixth example of the optical disc drive 200 will be described with reference to FIGS. 4 and 5A to 5C. With regard to the objective lens 10C according to the sixth example, the three wavelength compatibility function is principally attained by first and second OPD functions while the wavelength shift compensation function is principally attained by a third OPD function. Performance specifications of the objective lens 10C according to the sixth example are shown in Table 26.

TABLE 26

| | First laser beam | Second laser beam | Third laser beam |
|---|---|---|---|
| Design wavelength | 408 | 660 | 790 |
| focal length | 2.250 | 2.324 | 2.337 |
| NA | 0.667 | 0.645 | 0.500 |
| magnification | ∞ | ∞ | ∞ |

As shown by the values of the magnification in Table 26, according to the three wavelength compatibility function provided by the diffracting structure formed on the objective lens 10C, the first, second and third laser beams are allowed to be incident on the objective lens 10C as collimated beams, respectively.

Table 27 shows a numerical configuration of the optical disc drive 200 according to the sixth example when each of the optical discs D1, D2 and D3 is used.

TABLE 27

| Surface Number | r | d Disc D1 (408 nm) | d Disc D2 (660 nm) | d Disc D3 (790 nm) | n Disc D1 (408 nm) | n Disc D2 (660 nm) | n Disc D3 (790 nm) |
|---|---|---|---|---|---|---|---|
| #0 | ∞ | ∞ | ∞ | ∞ | 1.00000 | 1.00000 | 1.00000 |
| #1 | 1.418 | 1.600 | 1.600 | 1.600 | 1.52424 | 1.50635 | 1.50313 |
| #2 | −4.292 | 1.007 | 1.063 | 0.692 | 1.00000 | 1.00000 | 1.00000 |
| #3 | ∞ | 0.600 | 0.600 | 1.200 | 1.62110 | 1.57961 | 1.57307 |
| #4 | ∞ | 0.000 | 0.000 | 0.000 | 1.00000 | 1.00000 | 1.00000 |

Each of the first and second surfaces #11 and #12 of the objective lens 10C is an aspherical surface. Table 28 shows the conical coefficient and aspherical coefficients of the first and second surfaces 11 and 12 (surfaces #1 and #2) of the objective lens 10C.

TABLE 28

| Surface No. | K | A4 | A6 | A8 | A10 | A12 | A14 |
|---|---|---|---|---|---|---|---|
| 1 | −0.64000 | 5.62818E−03 | 2.06710E−03 | −1.68454E−03 | 1.55055E−03 | −4.79979E−04 | 0.00000E+00 |
| 2 | 0.00000 | 6.39459E−02 | −3.35166E−02 | 2.27788E−02 | −1.68427E−02 | 6.84085E−03 | −1.08289E−03 |

In this example, the diffracting structure is formed on the first surface 11 of the objective lens 10C according to the design method of the third embodiment. Table 29 shows coefficients $P_{2i}$ for first to third OPD functions which define the diffracting structure to be formed on the first surface 11 of the objective lens 10C. Table 30 shows diffraction orders m for the first to third OPD functions.

TABLE 29

| Surface No. | | P2 | P4 | P6 | P8 | P10 |
|---|---|---|---|---|---|---|
| 1 | $1^{st}$ OPD Function | 0.00000E+00 | −1.39776E+00 | −1.38210E−01 | −2.33152E−01 | 6.78901E−02 |
|   | $2^{nd}$ OPD Function | 0.00000E+00 | −2.86536E+00 | −7.35321E−01 | 8.87374E−02 | −3.19712E−02 |
|   | $3^{rd}$ OPD Function | 0.00000E+00 | 1.06527E+00 | 2.28335E−01 | 0.00000E+00 | 0.00000E+00 |

TABLE 30

| | wavelength [nm] | | |
|---|---|---|---|
| | 408 | 660 | 790 |
| $1^{st}$ OPD Function | 2 | 1 | 1 |
| $2^{nd}$ OPD Function | 3 | 2 | 2 |
| $3^{rd}$ OPD Function | 10 | 6 | 5 |

Graphs shown in FIGS. 7A, 7B and 7C respectively represent the first, second and third OPD functions determined with regard to the first laser beam having the shortest wavelength. The graph shown in FIG. 7D represents an OPD function directly defining the diffracting structure of the objective lens 10C.

Figure 18A:
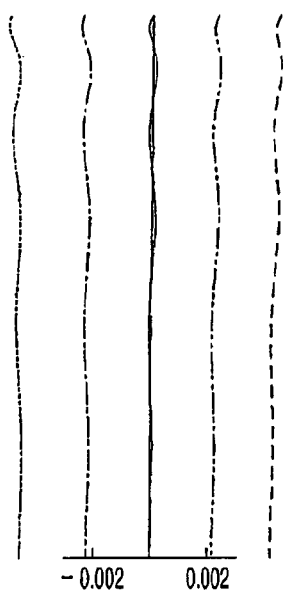
FIG. 18A is a graph illustrating a spherical aberration caused in an optical disc drive according to a sixth example when the first laser beam is used.
Figure 18B:
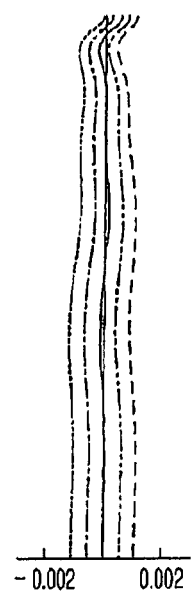
FIG. 18B is a graph illustrating the spherical aberration caused in the optical disc drive according to the sixth example when the second laser beam is used.
Figure 18C:
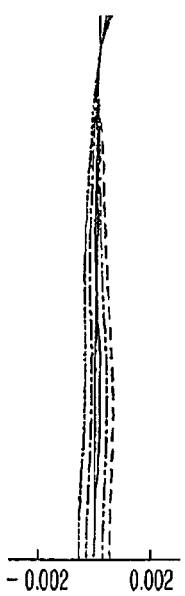
FIG. 18C is a graph illustrating the spherical aberration caused in the optical disc drive according to the sixth example when the third laser beam is used.

FIG. 18A is a graph illustrating the spherical aberration caused in the optical disc drive 200 when the first laser beam (i.e., the optical disc D1) is used. FIG. 18B is a graph illustrating the spherical aberration caused in the optical disc drive 200 when the second laser beam (i.e., the optical disc D2) is used. FIG. 18C is a graph illustrating the spherical aberration caused in the optical disc drive 200 when the third laser beam (i.e., the optical disc D3) is used.

As can be seen from FIGS. 18A, 18B and 18C, the objective lens 10C according to the sixth example is able to suitably converge the first, second and third laser beams on the recording surfaces of the optical discs D1, D2 and D3, respectively, without causing the spherical aberration.

In this example, the wavelength shift compensation function principally attained by the third OPD function enables the diffracting structure to have the function of suppressing the change of the spherical aberration for each of the optical discs D1, D2 and D3. In particular, the diffracting structure suitably suppresses the change of the spherical aberration caused by the wavelength shift when the optical disc D1 is used because the optical disc D1 has the lowest tolerance to aberrations. As shown in FIG. 18A, the change of the spherical aberration caused by the wavelength shift when the optical disc D1 is used is suppressed to an extremely low level. As shown in FIGS. 18B and 18C, the change of the spherical aberration caused when each of the optical disc D2 and D3 is used is also suppressed to a low level.

Seventh Example

Hereafter, a seventh example will be described. The objective lens 10C' according to the seventh example is provided with a diffracting structure on the first surface 11. The diffracting structure on the first surface 11 is divided into an inner area including the optical axis and an outer area situated outside the inner area. That is, diffracting structures having different diffracting functions are formed in the inner and outer areas, respectively.

More specifically, the diffracting structure formed in the inner area has the three wavelength compatibility function which is given by first and second OPD functions, and is designed according to the design method of the second embodiment. The diffracting structure formed in the outer area has the two wavelength compatibility function, which is given by a third OPD function, and the wavelength shift compensation function which is given by a fourth OPD function. Performance specifications of the objective lens 10C' according to the seventh example are shown in Table 31.

TABLE 31

| | First laser beam | Second laser beam | Third laser beam |
|---|---|---|---|
| Design wavelength | 408 | 660 | 790 |
| focal length | 2.250 | 2.323 | 2.337 |
| NA | 0.667 | 0.646 | 0.501 |
| magnification | ∞ | ∞ | ∞ |

As shown by the values of the magnification in Table 31, according to the three wavelength compatibility function provided by the diffracting structure, the first, second and third laser beams are allowed to be incident on the objective lens 10C' as collimated beams, respectively.

Table 32 shows a numerical configuration of the optical disc drive according to the seventh example when each of the optical discs D1, D2 and D3 is used.

TABLE 32

| Surface No. | r | d Disc D1 (408 nm) | d Disc D2 (660 nm) | d Disc D3 (790 nm) | n Disc D1 (408 nm) | n Disc D2 (660 nm) | n Disc D3 (790 nm) |
|---|---|---|---|---|---|---|---|
| #0 | ∞ | ∞ | ∞ | ∞ | 1.00000 | 1.00000 | 1.00000 |
| #1 inner area | 1.411 | 1.700 | 1.700 | 1.700 | 1.52424 | 1.50635 | 1.50313 |
| outer area | 1.464 | | | | | | |
| #2 | −4.197 | −4.197 | 1.003 | 0.632 | 1.00000 | 1.00000 | 1.00000 |
| #3 | ∞ | 0.600 | 0.600 | 1.200 | 1.62110 | 1.57961 | 1.57307 |
| #4 | ∞ | 0.000 | 0.000 | 0.000 | 1.00000 | 1.00000 | 1.00000 |

The inner area shown in Table 32 is formed within a range of height (from the optical axis) from 0 mm to 1.17 mm (0 mm≦inner area<1.17 mm), and the outer area is formed within a range of height (from the optical axis) from 1.17 mm to 1.5 mm (1.17 mm≦outer area≦1.5 mm). These values defining the range of height of each of the inner and outer area are also applied to the following (eight to tenth) examples.

Each of the first and second surfaces #11 and #12 of the objective lens 10C' is an aspherical surface. Table 33 shows the conical coefficient and aspherical coefficients of the first and second surfaces 11 and 12 (surfaces #1 and #2) of the objective lens 10C'.

TABLE 33

| Surface No. | | K | A4 | A6 | A8 | A10 | A12 |
|---|---|---|---|---|---|---|---|
| 1 | inner area | −0.64000 | −2.94873E−03 | −9.22976E−04 | 4.23865E−04 | −5.70433E−04 | 0.00000E+00 |
| | outer area | −0.64000 | 5.12529E−03 | 2.81131E−03 | −2.16927E−03 | 1.20638E−03 | −3.39100E−04 |
| 2 | | 0.00000 | 6.72074E−02 | −2.88576E−02 | 4.34080E−03 | 0.00000E+00 | 0.00000E+00 |

In this example, the diffracting structure is formed in each of the inner and outer areas on the first surface 11. Table 34 shows coefficients $P_{2i}$ for the first to fourth OPD functions which define the diffracting structure to be formed on the first surface 11 of the objective lens 10C'. Table 35 shows diffraction orders m for the first to fourth OPD functions.

TABLE 34

| Surface No. | | | P2 | P4 | P6 | P8 | P10 |
|---|---|---|---|---|---|---|---|
| 1 | inner area | 1st OPD Function | 2.39824E−01 | −1.74248E+00 | −2.38989E−02 | −1.33841E−01 | 0.00000E+00 |
| | | 2nd OPD Function | 0.00000E+00 | −2.81053E+00 | −4.91293E−01 | −6.32301E−02 | 0.00000E+00 |
| | outer area | 3rd OPD Function | 0.00000E+00 | 1.02876E+00 | 1.17824E+00 | −7.24036E−01 | 1.82621E−01 |
| | | 4th OPD Function | −3.20000E+00 | −7.85935E−01 | −3.36754E−01 | 2.54342E−02 | 0.00000E+00 |

TABLE 35

| | | | wavelength [nm] | | |
|---|---|---|---|---|---|
| Surface No. | | | 408 | 660 | 790 |
| 1 | inner area | 1st OPD Function | 2 | 1 | 1 |
| | | 2nd OPD Function | 3 | 2 | 2 |
| | outer area | 3rd OPD Function | 2 | 1 | — |
| | | 4th OPD Function | 5 | 3 | — |

Figure 19A:
FIGS. 19A and 19B are graphs respectively illustrating first and second OPD functions for an inner area determined according to a seventh example.
Figure 19B:
Figure 19C:
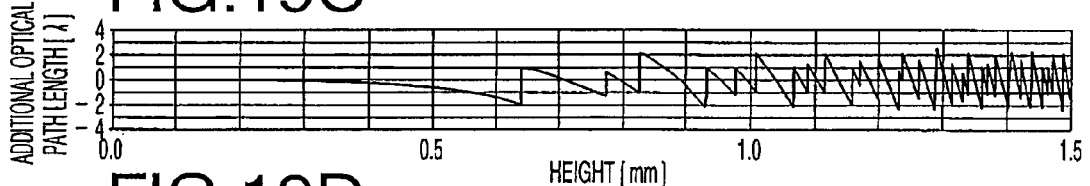
FIG. 19C is a graph illustrating an OPD function directly defining a diffracting structure in the inner area according to the seventh example.
Figure 19D:
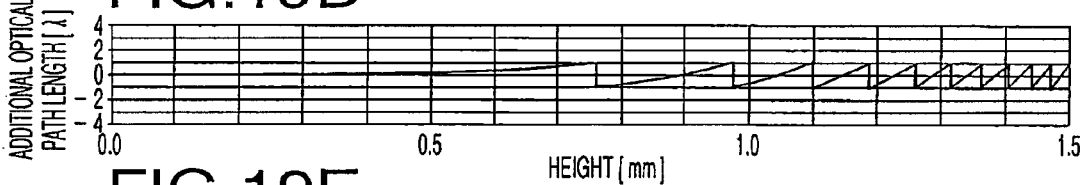
FIGS. 19D and 19E are graphs respectively illustrating third and fourth OPD functions for an outer area determined according to the seventh example.
Figure 19E:
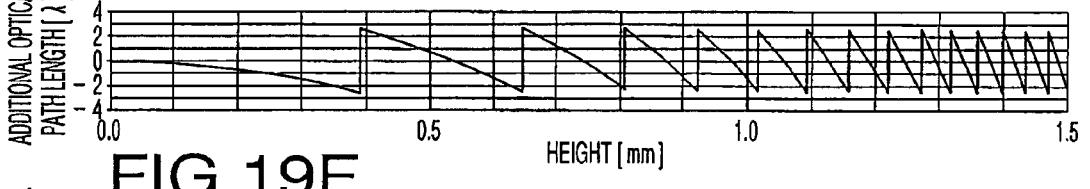
Figure 19F:
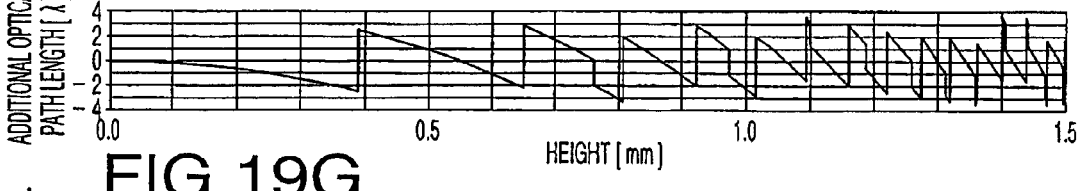
FIG. 19F is a graph illustrating an OPD function directly defining a diffracting structure in the outer area according to the seventh example.

Graphs shown in FIGS. 19A and 19B respectively represent the first and second OPD functions for the inner area determined with regard to the first laser beam having the shortest wavelength. Graphs shown in FIGS. 19D and 19E respectively represent the third and fourth OPD functions for the outer area determined with regard to the first laser beam having the shortest wavelength. A graph shown in FIG. 19C represents an OPD function directly defining the diffracting structure for the inner area of the first surface 11. A graph shown in FIG. 19F represents an OPD function directly defining the diffracting structure for the outer area of the first surface 11.

Figure 19G:
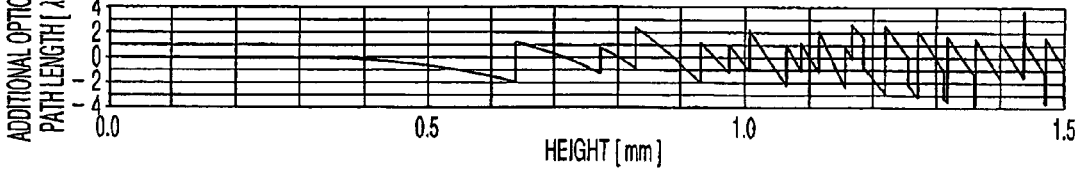
FIG. 19G is a graph illustrating an OPD function defining a diffracting structure formed on a first surface of an objective lens according to the seventh example.

A graph shown in FIG. 19G represents an OPD function defining a diffracting structure formed on the first surface 11 (in both of the inner and outer areas). That is, the graph of FIG. 19G represents an OPD function defined if the diffracting structures formed on the inner and outer areas are regarded as a single diffracting structure. As shown in FIG. 19G, the OPD function shown in FIG. 19C is applied to an area (the inner area) ranging from a height 0 mm to a height 1.17 mm (0 mm≦area<1.17 mm) while the OPD function shown in FIG. 19F is applied to an area (the outer area) ranging from a height 1.17 mm to a height 1.5 mm (1.17 mm≦area<1.5 mm).

Figure 20A:
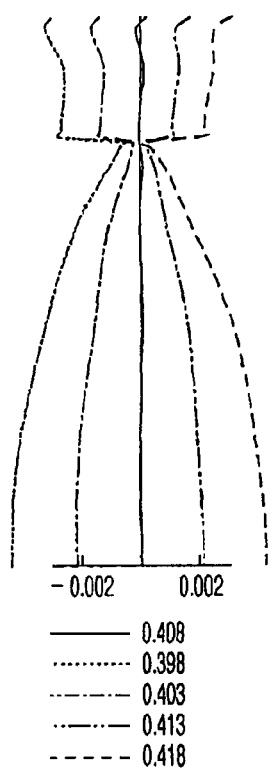
FIG. 20A is a graph illustrating a spherical aberration caused in an optical disc drive according to the seventh example when the first laser beam is used.
Figure 20B:
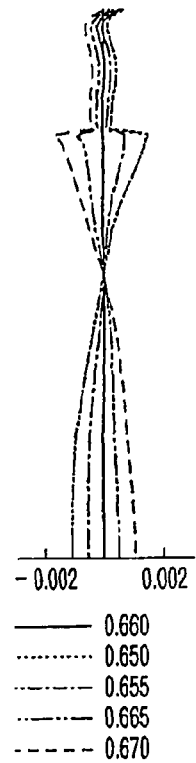
FIG. 20B is a graph illustrating the spherical aberration caused in the optical disc drive according to the seventh example when the second laser beam is used.
Figure 20C:
FIG. 20C is a graph illustrating the spherical aberration caused in the optical disc drive according to the seventh example when the third laser beam is used.

FIG. 20A is a graph illustrating the spherical aberration caused in the optical disc drive 200 when the first laser beam (i.e., the optical disc D1) is used. FIG. 20B is a graph illustrating the spherical aberration caused in the optical disc drive 200 when the second laser beam (i.e., the optical disc D2) is used. FIG. 20C is a graph illustrating the spherical aberration caused in the optical disc drive 200 when the third laser beam (i.e., the optical disc D3) is used.

As can be seen from FIGS. 20A, 20B and 20C, the objective lens 10C' according to the seventh example is able to suitably converge the first, second and third laser beams on the recording surfaces of the optical discs D1, D2 and D3, respectively, without causing the spherical aberration.

In this example, the wavelength shift compensation function is given to the diffracting structure formed in the outer area. In other words, the wavelength shift compensation function is primarily targeted for suppressing the change of the spherical aberration caused by the wavelength shift when the optical disc having the low tolerance to aberrations (particularly when the optical disc D1 having the lowest tolerance to aberrations) is used. Therefore, as shown in FIGS. 20A and 20B, the change of the spherical aberration due to the wavelength shift caused when each of the optical discs D1 and D2 is used is suppressed to a low level.

Eighth Example

Hereafter, an eighth example will be described. The objective lens 10C' according to the eighth example is provided with a diffracting structure on the first surface 11. The diffracting structure on the first surface 11 is divided into an inner area including the optical axis and an outer area situated outside the inner area. That is, diffracting structures having different diffracting functions are formed in the inner and outer areas, respectively.

More specifically, the diffracting structure formed in the inner area has the three wavelength compatibility function which is given by first and second OPD functions, and is designed according to the design method of the second embodiment. The diffracting structure formed in the outer area has the two wavelength compatibility function, which is given by a third OPD function, and the wavelength shift compensation function which is given by a fourth OPD function, and is designed according to the design method of the first embodiment. Performance specifications of the objective lens 10C' according to the eighth example are shown in Table 36.

TABLE 36

|  | First laser beam | Second laser beam | Third laser beam |
|---|---|---|---|
| Design wavelength | 408 | 660 | 790 |
| focal length | 2.250 | 2.323 | 2.337 |
| NA | 0.667 | 0.646 | 0.501 |
| magnification | ∞ | ∞ | ∞ |

As shown by the values of the magnification in Table 36, according to the three wavelength compatibility function provided by the diffracting structure, the first, second and third laser beams are allowed to be incident on the objective lens 10C' as collimated beams, respectively.

Table 37 shows a numerical configuration of the optical disc drive according to the eighth example when each of the optical discs D1, D2 and D3 is used.

TABLE 37

| Surface No. | | r | d Disc D1 (408 nm) | d Disc D2 (660 nm) | d Disc D3 (790 nm) | n Disc D1 (408 nm) | n Disc D2 (660 nm) | n Disc D3 (790 nm) |
|---|---|---|---|---|---|---|---|---|
| | #0 | ∞ | ∞ | ∞ | ∞ | 1.00000 | 1.00000 | 1.00000 |
| #1 | inner area | 1.412 | 1.700 | 1.700 | 1.700 | 1.52424 | 1.50635 | 1.50313 |
| | outer area | 1.462 | | | | | | |
| | #2 | −4.180 | 0.949 | 1.004 | 0.633 | 1.00000 | 1.00000 | 1.00000 |
| | #3 | ∞ | 0.600 | 0.600 | 1.200 | 1.62110 | 1.57961 | 1.57307 |
| | #4 | ∞ | 0.000 | 0.000 | 0.000 | 1.00000 | 1.00000 | 1.00000 |

Each of the first and second surfaces #11 and #12 of the objective lens 10C' is an aspherical surface. Table 38 shows the conical coefficient and aspherical coefficients of the first and second surfaces 11 and 12 (surfaces #1 and #2) of the objective lens 10C'.

TABLE 38

| Surface No. | | K | A4 | A6 | A8 | A10 | A12 |
|---|---|---|---|---|---|---|---|
| 1 | inner area | −0.64000 | −2.43572E−03 | −7.84959E−04 | 1.90837E−04 | −5.60031E−04 | 0.00000E+00 |
| | outer area | −0.64000 | 7.57496E−03 | −1.50754E−03 | 6.26212E−04 | 5.62749E−04 | −3.22166E−04 |
| 2 | | 0.00000 | 7.19870E−02 | −3.71373E−02 | 9.33161E−03 | −1.00325E−03 | 0.00000E+00 |

In this example, the diffracting structure is formed in each of the inner and outer areas on the first surface 11. Table 39 shows coefficients $P_{2i}$ for the first to fourth OPD functions which define the diffracting structure to be formed on the first surface 11 of the objective lens 10C'. Table 40 shows diffraction orders m for the first to fourth OPD functions.

TABLE 39

| Surface No. | | P2 | P4 | P6 | P8 | P10 |
|---|---|---|---|---|---|---|
| 1 inner area | 1$^{st}$ OPD Function | 2.24835E−01 | −1.63385E+00 | −1.22923E−01 | −1.16021E−01 | 0.00000E+00 |
| | 2$^{nd}$ OPD Function | 0.00000E+00 | −2.87491E+00 | −4.05734E−01 | 9.17328E−02 | 0.00000E+00 |
| outer area | 3$^{rd}$ OPD Function | 0.00000E+00 | −1.32764E+00 | −7.10354E−01 | 4.92859E−01 | −1.46893E−01 |
| | 4$^{th}$ OPD Function | −3.00000E+00 | 9.19463E−01 | −5.50633E−01 | 2.00000E−01 | 0.00000E+00 |

TABLE 40

| Surface No. | | | wavelength [nm] | | |
|---|---|---|---|---|---|
| | | | 408 | 660 | 790 |
| 1 | inner area | 1st OPD Function | 2 | 1 | 1 |
| | | 2nd OPD Function | 3 | 2 | 2 |
| | outer area | 3rd OPD Function | 3 | 2 | — |
| | | 4th OPD Function | 5 | 3 | — |

Figure 21A:
FIGS. 21A and 21B are graphs respectively illustrating first and second OPD functions for an inner area determined according to an eighth example.
Figure 21B:
Figure 21C:
FIG. 21C is a graph illustrating an OPD function directly defining a diffracting structure in the inner area according to the eighth example.
Figure 21D:
FIGS. 21D and 21E are graphs respectively illustrating third and fourth OPD functions for an outer area determined according to the eighth example.
Figure 21E:
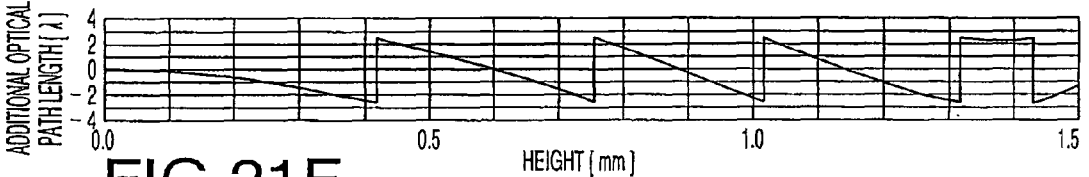
Figure 21F:
FIG. 21F is a graph illustrating an OPD function directly defining a diffracting structure in the outer area according to the eighth example.

Graphs shown in FIGS. 21A and 21B respectively represent the first and second OPD functions for the inner area determined with regard to the first laser beam having the shortest wavelength. Graphs shown in FIGS. 21D and 21E respectively represent the third and fourth OPD functions for the outer area determined with regard to the first laser beam having the shortest wavelength. A graph shown in FIG. 21C represents an OPD function directly defining the diffracting structure for the inner area of the first surface 11. A graph shown in FIG. 21F represents an OPD function directly defining the diffracting structure for the outer area of the first surface 11.

Figure 21G:
FIG. 21G is a graph illustrating an OPD function defining a diffracting structure formed on a first surface of an objective lens according to the eighth example.

A graph shown in FIG. 21G represents an OPD function defining a diffracting structure formed on the first surface 11 (in both of the inner and outer areas). That is, the graph of FIG. 21G represents an OPD function defined if the diffracting structures formed in the inner and outer areas are regarded as a single diffracting structure. As shown in FIG. 21G, the OPD function shown in FIG. 21C is applied to an area (the inner area) ranging from a height 0 mm to a height 1.17 mm (0 mm≦area<1.17 mm) while the OPD function shown in FIG. 21F is applied to an area (the outer area) ranging from a height 1.17 mm to a height 1.5 mm (1.17 mm≦area<1.5 mm).

FIG. 22A is a graph illustrating the spherical aberration caused in the optical disc drive 200 when the first laser beam (i.e., the optical disc D1) is used. FIG. 22B is a graph illustrating the spherical aberration caused in the optical disc drive 200 when the second laser beam (i.e., the optical disc D2) is used. FIG. 22C is a graph illustrating the spherical aberration caused in the optical disc drive 200 when the third laser beam (i.e., the optical disc D3) is used.

As can be seen from FIGS. 22A, 22B and 22C, the objective lens 10C' according to the eighth example is able to suitably converge the first, second and third laser beams on the recording surfaces of the optical discs D1, D2 and D3, respectively, without causing the spherical aberration.

Similarly to the seventh example, the wavelength shift compensation function is given to the diffracting structure formed on the outer area. Therefore, as shown in FIGS. 22A and 22B, the change of the spherical aberration due to the wavelength shift caused when each of the optical disc D1 and D2 is used is suppressed to a low level.

As can be seen from Tables 35 and 40, the third OPD functions of the seventh and eighth examples are different from each other in regard to the proportions of the diffraction orders. However, both of the seventh and eighth examples can attain excellent optical performance.

Ninth Example

Hereafter, a ninth example will be described. The objective lens 10C' according to the ninth example is provided with a diffracting structure on the first surface 11. The diffracting structure on the first surface 11 is divided into an inner area including the optical axis and an outer area situated outside the inner area. That is, diffracting structures having different diffracting functions are formed in the inner and outer areas, respectively.

More specifically, the diffracting structure formed in the inner area has the three wavelength compatibility function principally given by first and second OPD functions, and the wavelength shift compensation function principally given by a third OPD function. The diffracting structure in the inner area is designed according to the design method of the third embodiment. The diffracting structure formed in the outer area has the two wavelength compatibility function (for the first and second laser beams) given by a fourth OPD function and the wavelength shift compensation function given by a fifth OPD function, and is designed according to the design method of the first embodiment. Performance specifications of the objective lens 10C' according to the ninth example are shown in Table 41.

TABLE 41

| | First laser beam | Second laser beam | Third laser beam |
|---|---|---|---|
| Design wavelength | 408 | 660 | 790 |
| focal length | 2.250 | 2.323 | 2.337 |
| NA | 0.667 | 0.646 | 0.501 |
| magnification | ∞ | ∞ | ∞ |

As shown by the values of the magnification in Table 41, according to the three wavelength compatibility function provided by the diffracting structure, the first, second and third laser beams are allowed to be incident on the objective lens 10C' as collimated beams, respectively.

Table 42 shows a numerical configuration of the optical disc drive according to the ninth example when each of the optical discs D1, D2 and D3 is used.

TABLE 42

| Surface No. | | r | d Disc D1 (408 nm) | d Disc D2 (660 nm) | d Disc D3 (790 nm) | n Disc D1 (408 nm) | n Disc D2 (660 nm) | n Disc D3 (790 nm) |
|---|---|---|---|---|---|---|---|---|
| | #0 | ∞ | ∞ | ∞ | ∞ | 1.00000 | 1.00000 | 1.00000 |
| #1 | inner area | 1.425 | 1.700 | 1.700 | 1.700 | 1.52424 | 1.50635 | 1.50313 |
| | outer area | 1.425 | | | | | | |
| | #2 | −4.015 | 0.957 | 1.012 | 0.641 | 1.00000 | 1.00000 | 1.00000 |
| | #3 | ∞ | 0.600 | 0.600 | 1.200 | 1.62110 | 1.57961 | 1.57307 |
| | #4 | ∞ | 0.000 | 0.000 | 0.000 | 1.00000 | 1.00000 | 1.00000 |

Each of the first and second surfaces #11 and #12 of the objective lens 10C' is an aspherical surface. Table 43 shows the conical coefficient and aspherical coefficients of the first and second surfaces 11 and 12 (surfaces #1 and #2) of the objective lens 10C'.

TABLE 43

| Surface No. | | K | A4 | A6 | A8 | A10 | A12 |
|---|---|---|---|---|---|---|---|
| 1 | inner area | −0.64000 | 3.66788E−03 | 1.99220E−03 | 8.03513E−04 | −5.36252E−04 | 0.00000E+00 |
|   | outer area | −0.64000 | 4.88932E−03 | −2.48799E−04 | 1.01322E−03 | 5.01673E−04 | −3.42935E−04 |
| 2 |   | 0.00000 | 6.28321E−02 | −1.39804E−02 | −9.12617E−03 | 6.19330E−03 | −1.12914E−03 |

In this example, the diffracting structure is formed in each of the inner and outer areas on the first surface 11. Table 44 shows coefficients $P_{2i}$ for the first to fifth OPD functions which define the diffracting structure to be formed on the first surface 11 of the objective lens 10C'. Table 45 shows diffraction orders m for the first to fifth OPD functions.

TABLE 44

| Surface No. | | | P2 | P4 | P6 | P8 | P10 |
|---|---|---|---|---|---|---|---|
| 1 | inner area | 1st OPD Function | 0.00000E+00 | −1.75577E+00 | 2.00051E−01 | −2.22804E−01 | 0.00000E+00 |
|   |   | 2nd OPD Function | 0.00000E+00 | −2.91144E+00 | −5.13678E−01 | −7.88233E−02 | 0.00000E+00 |
|   |   | 3rd OPD Function | 0.00000E+00 | 1.01454E+00 | 2.42086E−01 | 0.00000E+00 | 0.00000E+00 |
|   | outer area | 4th OPD Function | 0.00000E+00 | −9.14474E−01 | −1.40602E+00 | 7.67075E−01 | −1.79266E−01 |
|   |   | 5th OPD Function | 0.00000E+00 | 4.97656E−01 | 2.15356E−01 | 0.00000E+00 | 0.00000E+00 |

TABLE 45

| | | | wavelength [nm] | | |
|---|---|---|---|---|---|
| Surface No. | | | 408 | 660 | 790 |
| 1 | inner area | 1st OPD Function | 2 | 1 | 1 |
|   |   | 2nd OPD Function | 3 | 2 | 2 |
|   |   | 3rd OPD Function | 10 | 6 | 5 |
|   | outer area | 4th OPD Function | 3 | 2 | — |
|   |   | 5th OPD Function | 5 | 3 | — |

Figure 23A:
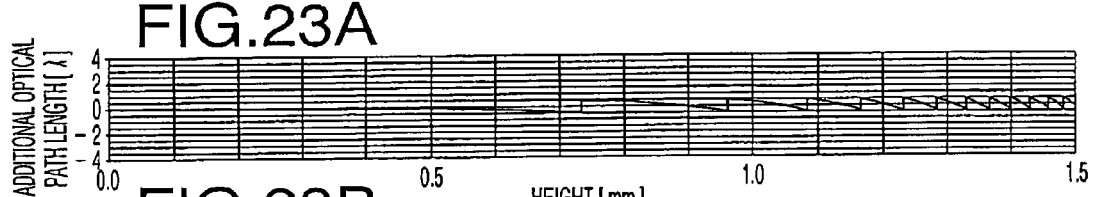
FIGS. 23A, 23B and 23C are graphs respectively illustrating first, second and third OPD functions for an inner area determined according to a ninth example.
Figure 23B:
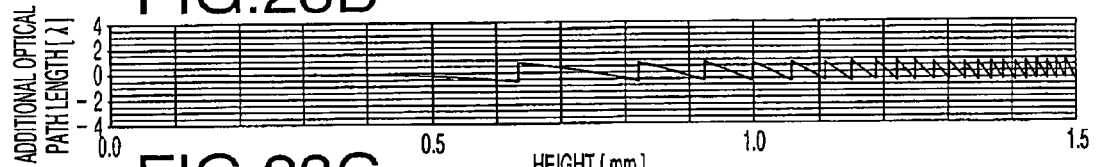
Figure 23C:
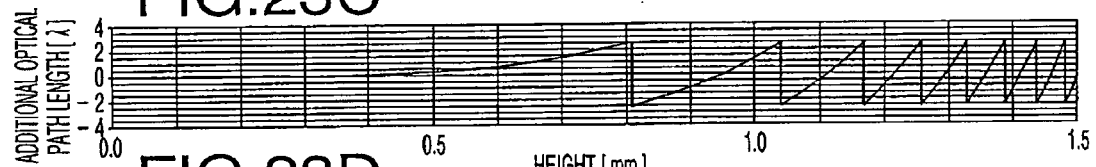
Figure 23D:
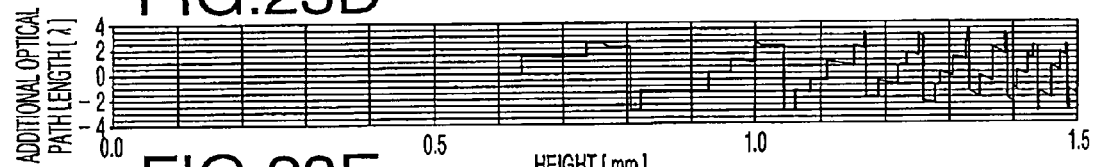
FIG. 23D is a graph illustrating an OPD function directly defining a diffracting structure in the inner area according to the ninth example.
Figure 23E:
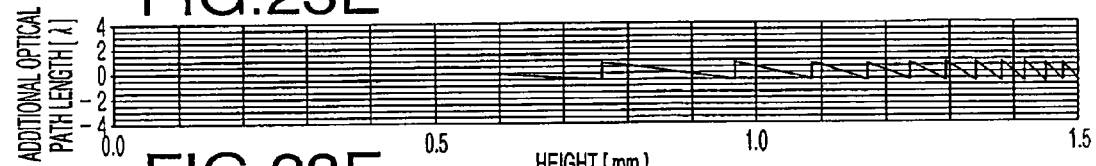
FIGS. 23E and 23F are graphs respectively illustrating fourth and fifth OPD functions for an outer area determined according to the ninth example.
Figure 23F:
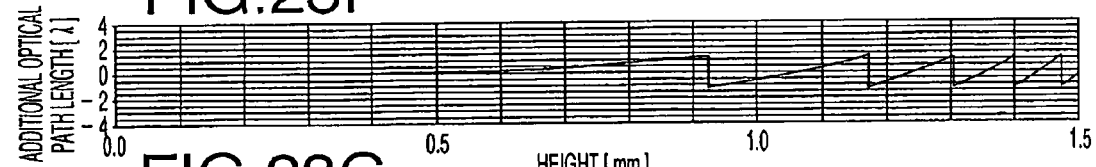
Figure 23G:
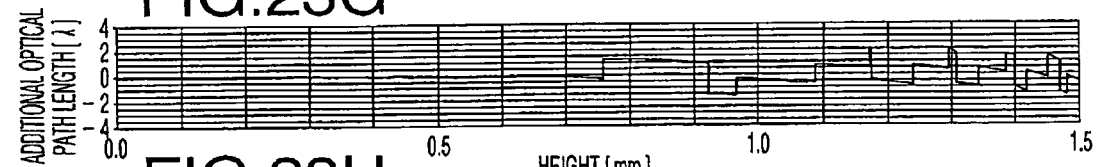
FIG. 23G is a graph illustrating an OPD function directly defining a diffracting structure in the outer area according to the ninth example.

Graphs shown in FIGS. 23A, 23B and 23C respectively represent the first, second and third OPD functions for the inner area determined with regard to the first laser beam having the shortest wavelength. Graphs shown in FIGS. 23E and 23F respectively represent the fourth and fifth OPD functions for the outer area determined with regard to the first laser beam having the shortest wavelength. A graph shown in FIG. 23D represents an OPD function directly defining the diffracting structure for the inner area of the first surface 11. A graph shown in FIG. 23G represents an OPD function directly defining the diffracting structure for the outer area of the first surface 11.

Figure 23H:
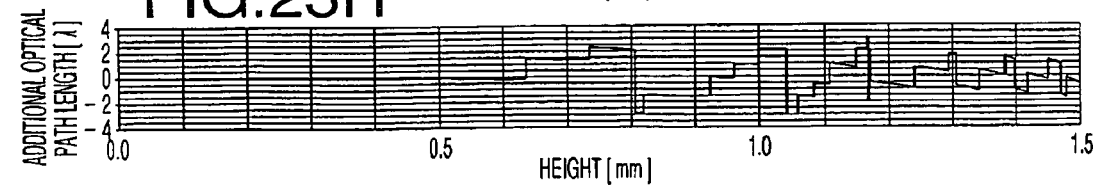
FIG. 23H is a graph illustrating an OPD function defining a diffracting structure formed on a first surface of an objective lens according to the ninth example.

A graph shown in FIG. 23H represents an OPD function defining a diffracting structure formed on the first surface 11 (in both of the inner and outer areas). That is, the graph of FIG. 23H represents an OPD function defined if the diffracting structures formed on the inner and outer areas are regarded as a single diffracting structure. As shown in FIG. 23H, the OPD function shown in FIG. 23D is applied to an area (the inner area) ranging from a height 0 mm to a height 1.17 mm (0 mm≦area<1.17 mm) while the OPD function shown in FIG. 23G is applied to an area (the outer area) ranging from a height 1.17 mm to a height 1.5 mm (1.17 mm≦area<1.5 mm).

Figure 24A:
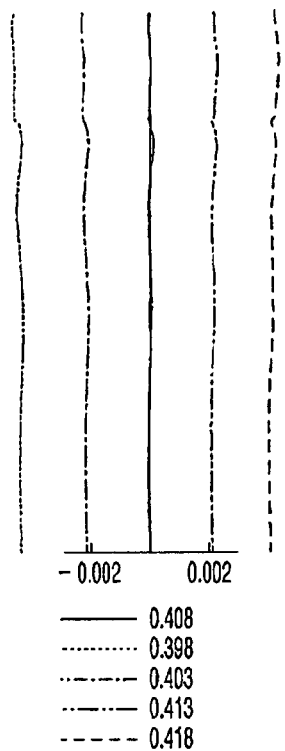
FIG. 24A is a graph illustrating a spherical aberration caused in an optical disc drive according to the ninth example when the first laser beam is used.
Figure 24B:
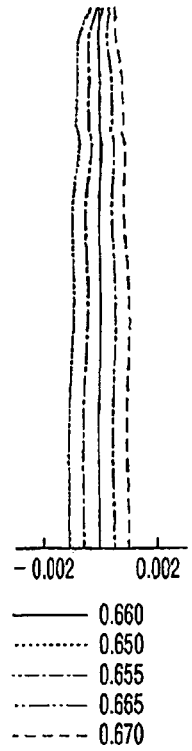
FIG. 24B is a graph illustrating the spherical aberration caused in the optical disc drive according to the ninth example when the second laser beam is used.
Figure 24C:
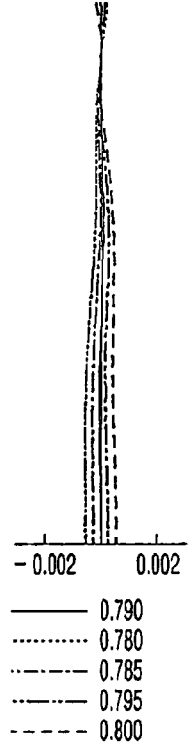
FIG. 24C is a graph illustrating the spherical aberration caused in the optical disc drive according to the ninth example when the third laser beam is used.

FIG. 24A is a graph illustrating the spherical aberration caused in the optical disc drive 200 when the first laser beam (i.e., the optical disc D1) is used. FIG. 24B is a graph illustrating the spherical aberration caused in the optical disc drive 200 when the second laser beam (i.e., the optical disc D2) is used. FIG. 24C is a graph illustrating the spherical aberration caused in the optical disc drive 200 when the third laser beam (i.e., the optical disc D3) is used.

As can be seen from FIGS. 24A, 24B and 24C, the objective lens 10C' according to the ninth example is able to suitably converge the first, second and third laser beams on the recording surfaces of the optical discs D1, D2 and D3, respectively, without causing the spherical aberration.

In this example, the wavelength shift compensation function is given to the diffracting structure formed in each of the inner and outer areas. Therefore, as shown in FIGS. 24A to 24C, the change of the spherical aberration due to the wavelength shift caused when each of the optical disc D1, D2 and D3 is used is suppressed to a low level.

Tenth Example

Hereafter, a tenth example will be described. The objective lens 10C' according to the tenth example is provided with a diffracting structure on the first surface 11. The diffracting structure on the first surface 11 is divided into an inner area including the optical axis and an outer area situated outside the inner area. That is, diffracting structures having different diffracting functions are formed in the inner and outer areas, respectively.

More specifically, the diffracting structure formed in the inner area has the three wavelength compatibility function principally given by first and second OPD functions, and the wavelength shift compensation function principally given by a third OPD function. The diffracting structure in the inner area is designed according to the design method of the third embodiment. The diffracting structure formed in the outer area has the two wavelength compatibility function (for the first and second laser beams) given by a fourth OPD function and the wavelength shift compensation function given by a fifth OPD function, and is designed according to the design method of the first embodiment. Performance specifications of the objective lens 10C' according to the ninth example are shown in Table 46.

TABLE 46

|  | First laser beam | Second laser beam | Third laser beam |
|---|---|---|---|
| Design wavelength | 408 | 660 | 790 |
| focal length | 2.250 | 2.323 | 2.337 |
| NA | 0.667 | 0.646 | 0.501 |
| magnification | ∞ | ∞ | ∞ |

As shown by the values of the magnification in Table 46, according to the three wavelength compatibility function provided by the diffracting structure, the first, second and third laser beams are allowed to be incident on the objective lens 10C' as collimated beams, respectively.

Table 47 shows a numerical configuration of the optical disc drive according to the tenth example when each of the optical discs D1, D2 and D3 is used.

TABLE 47

| Surface No. | | r | d Disc D1 (408 nm) | d Disc D2 (660 nm) | d Disc D3 (790 nm) | n Disc D1 (408 nm) | n Disc D2 (660 nm) | n Disc D3 (790 nm) |
|---|---|---|---|---|---|---|---|---|
| #0 | | ∞ | ∞ | ∞ | ∞ | 1.00000 | 1.00000 | 1.00000 |
| #1 | inner area | 1.427 | 1.700 | 1.700 | 1.700 | 1.52424 | 1.50635 | 1.50313 |
|  | outer area | 1.427 | | | | | | |
| #2 | | −4.015 | 0.958 | 1.013 | 0.642 | 1.00000 | 1.00000 | 1.00000 |
| #3 | | ∞ | 0.600 | 0.600 | 1.200 | 1.62110 | 1.57961 | 1.57307 |
| #4 | | ∞ | 0.000 | 0.000 | 0.000 | 1.00000 | 1.00000 | 1.00000 |

Each of the first and second surfaces #11 and #12 of the objective lens 10C' is an aspherical surface. Table 48 shows the conical coefficient and aspherical coefficients of the first and second surfaces 11 and 12 (surfaces #1 and #2) of the objective lens 10C'.

TABLE 48

| Surface No. | | K | A4 | A6 | A8 | A10 | A12 |
|---|---|---|---|---|---|---|---|
| 1 | inner area | −0.64000 | 3.54150E−03 | 1.89487E−03 | 9.42350E−04 | −6.38420E−04 | 0.00000E+00 |
|  | outer area | −0.64000 | 3.44140E−03 | 3.71320E−03 | −1.95715E−03 | 1.03010E−03 | −3.19718E−04 |
| 2 | | 0.00000 | 6.23724E−02 | −1.31091E−02 | −1.07046E−02 | 6.82915E−03 | −1.21955E−03 |

In this example, the diffracting structure is formed in each of the inner and outer areas on the first surface 11. Table 49 shows coefficients $P_{2i}$ for the first to fifth OPD functions which define the diffracting structure to be formed on the first surface 11 of the objective lens 10C'. Table 50 shows diffraction orders m for the first to OPD functions.

TABLE 49

| Surface No. | | | P2 | P4 | P6 | P8 | P10 |
|---|---|---|---|---|---|---|---|
| 1 | inner area | $1^{st}$ OPD Function | 0.00000E+00 | 1.75789E+00 | 2.17471E−01 | −2.34497E−01 | 0.00000E+00 |
|  | | $2^{nd}$ OPD Function | 0.00000E+00 | −2.91319E+00 | −5.13902E−01 | −7.70783E−02 | 0.00000E+00 |
|  | | $3^{rd}$ OPD Function | 0.00000E+00 | 1.01387E+00 | 2.42808E−01 | 0.00000E+00 | 0.00000E+00 |
|  | outer area | $4^{th}$ OPD Function | 0.00000E+00 | 8.21960E−01 | 1.66436E+00 | −9.69416E−01 | 2.25681E−01 |
|  | | $5^{th}$ OPD Function | 0.00000E+00 | −7.18039E−01 | −2.38266E−01 | 0.00000E+00 | 0.00000E+00 |

TABLE 50

| Surface No. | | wavelength [nm] | | |
|---|---|---|---|---|
| | | 408 | 660 | 790 |
| 1 inner area | 1st OPD Function | 2 | 1 | 1 |
| | 2nd OPD Function | 3 | 2 | 2 |
| | 3rd OPD Function | 10 | 6 | 5 |
| outer area | 4th OPD Function | 2 | 1 | — |
| | 5th OPD Function | 5 | 3 | — |

Figure 25A:
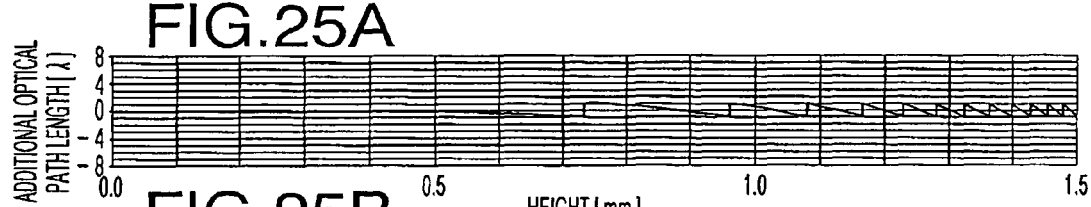
FIGS. 25A, 25B and 25C are graphs respectively illustrating first, second and third OPD functions for an inner area determined according to a tenth example.
Figure 25B:
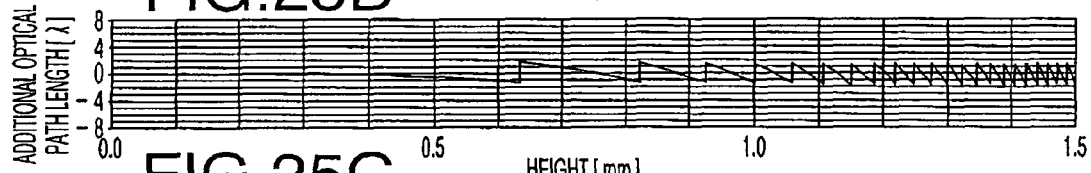
Figure 25C:
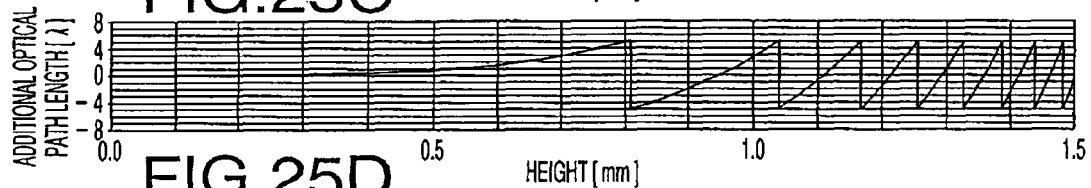
Figure 25D:
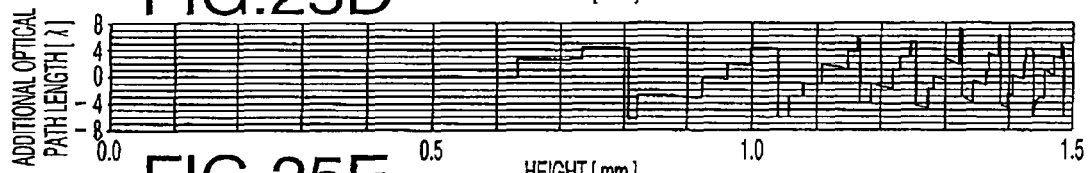
FIG. 25D is a graph illustrating an OPD function directly defining a diffracting structure in the inner area according to the tenth example.
Figure 25E:
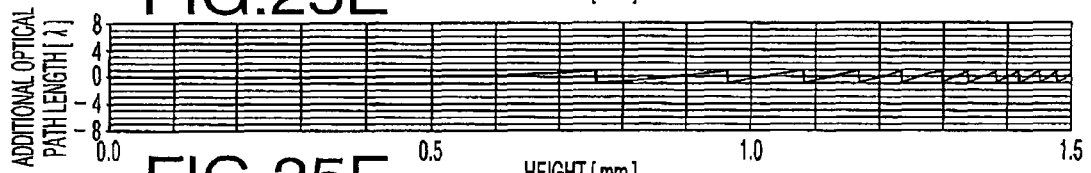
FIGS. 25E and 25F are graphs respectively illustrating fourth and fifth OPD functions for an outer area determined according to the tenth example.
Figure 25F:
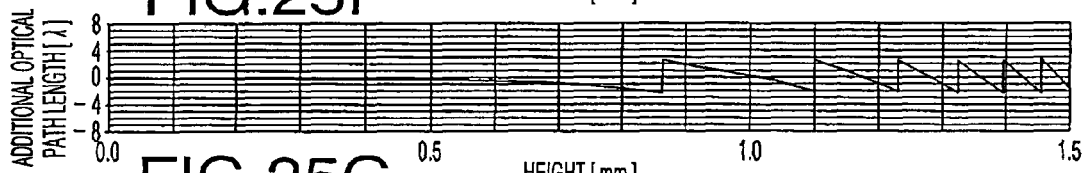
Figure 25G:
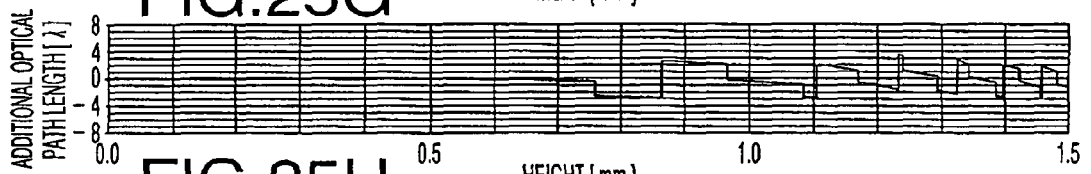
FIG. 25G is a graph illustrating an OPD function directly defining a diffracting structure in the outer area according to the tenth example.

Graphs shown in FIGS. 25A, 25B and 25C respectively represent the first, second and third OPD functions for the inner area determined with regard to the first laser beam having the shortest wavelength. Graphs shown in FIGS. 25E and 25F respectively represent the fourth and fifth OPD functions for the outer area determined with regard to the first laser beam having the shortest wavelength. A graph shown in FIG. 25D represents an OPD function directly defining the diffracting structure for the inner area of the first surface 11. A graph shown in FIG. 25G represents an OPD function directly defining the diffracting structure for the outer area of the first surface 11.

Figure 25H:
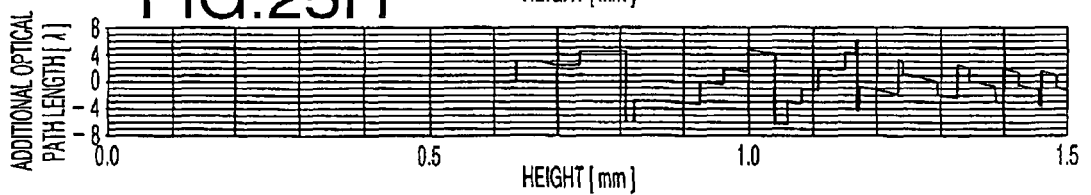
FIG. 25H is a graph illustrating an OPD function defining a diffracting structure formed on a first surface of an objective lens according to the tenth example.

A graph shown in FIG. 25H represents an OPD function defining a diffracting structure formed on the first surface 11 (in both of the inner and outer areas). That is, the graph of FIG. 25H represents an OPD function defined if the diffracting structures formed in the inner and outer areas are regarded as a single diffracting structure. As shown in FIG. 25H, the OPD function shown in FIG. 25D is applied to an area (the inner area) ranging from a height 0 mm to a height 1.17 mm (0 mm≦area<1.17 mm) while the optical path difference function shown in FIG. 25G is applied to an area (the outer area) ranging from a height 1.17 mm to a height 1.5 mm (1.17 mm≦area<1.5 mm).

Figure 26A:
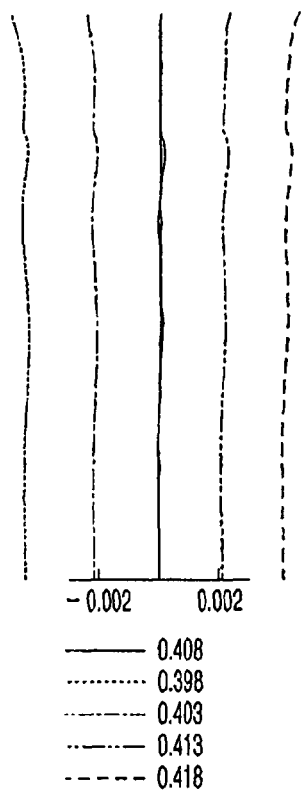
FIG. 26A is a graph illustrating a spherical aberration caused in an optical disc drive according to the tenth example when the first laser beam is used.
Figure 26B:
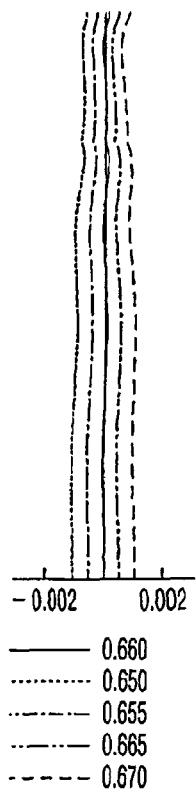
FIG. 26B is a graph illustrating the spherical aberration caused in the optical disc drive according to the tenth example when the second laser beam is used.
Figure 26C:
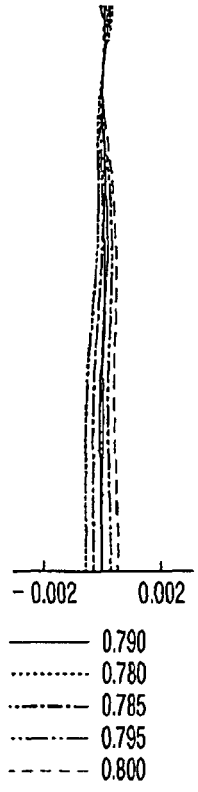
FIG. 26C is a graph illustrating the spherical aberration caused in the optical disc drive according to the tenth example when the third laser beam is used.

FIG. 26A is a graph illustrating the spherical aberration caused in the optical disc drive 200 when the first laser beam (i.e., the optical disc D1) is used. FIG. 26B is a graph illustrating the spherical aberration caused in the optical disc drive 200 when the second laser beam (i.e., the optical disc D2) is used. FIG. 26C is a graph illustrating the spherical aberration caused in the optical disc drive 200 when the third laser beam (i.e., the optical disc D3) is used.

As can be seen from FIGS. 26A, 26B and 26C, the objective lens 10C' according to the tenth example is able to suitably converge the first, second and third laser beams on the recording surfaces of the optical discs D1, D2 and D3, respectively, without causing the spherical aberration.

In this example, the wavelength shift compensation function is given to the diffracting structure formed in each of the inner and outer areas. Therefore, as shown in FIGS. 26A to 26C, the change of the spherical aberration due to the wavelength shift caused when each of the optical disc D1, D2 and D3 is used is suppressed to a low level.

As can be seen from Tables 45 and 50, the fourth OPD functions of the ninth and tenth examples are different from each other in regard to the proportions of diffraction orders. However, both of the ninth and tenth examples can attain excellent optical performance.

In the above mentioned seventh to tenth examples, the diffracting structure having the two wavelength compatibility function for the optical discs D1 and D2 is formed in the outer area of the first surface 11 of the objective lens 10C'. In this configuration, the outer area does not contribute to converging the third laser beam for the optical disc D3. In other words, the objective lens 10C' has the function as an aperture stop for the third laser beam which is used for the optical disc D3 requiring a low numerical aperture. However, in the optical disc drive 200 employing the objective lens 10C', an aperture stop member may be used to reduce the diameter the third laser beam.

Fourth Embodiment

Hereafter, an objective lens according to a fourth embodiment of the invention will be described. Since a configuration of an optical disc drive (an optical system) employing an objective lens 10D (see FIG. 4) and a design method of the objective lens 10D according to the fourth embodiment is substantially the same as those shown in the second embodiment and in FIGS. 4 and 5A to 5C, explanations of the fourth embodiment will be given referring to FIGS. 4 and 5A to 5C. In the followings, explanations about the optical components already described in the above mentioned embodiments will not be repeated.

As described above, the collimated beam is incident on the objective lens 10D for each of the optical discs D1, D2 and D3. Therefore, for each of the optical discs D1, D2 and D3, an off-axis aberration such as a coma can be effectively suppressed when the objective lens 10 is moved in a radial direction of the optical disc by a tracking operation. Although there is a possibility that the beam emerging from each coupling lens (1B, 2B, 3B) is not an exactly collimated light beam because of individual differences of light source devices or environmental conditions, the degree of divergence (or convergence) of the beam due to such reasons is extremely small and can be neglected.

Similarly to the objective lens according to the second embodiment, the objective lens 10D is designed by defining two different OPD functions so that a phase shifting structure having a diffracting function having an effect on three types of light beams (i.e., the first to third laser beams) can be obtained. In this embodiment, the phase shifting structure is formed on the first surface 11 of the objective lens 10D.

The phase shifting structure is configured to have a plurality of minute steps formed between adjacent annular refractive surface zones formed concentrically about the optical axis of the objective lens 10D.

In this embodiment, the phase shifting structure has a diffracting function of suppressing the spherical aberration, caused by the wavelength differences between the first to third laser beams, to substantially zero. That is, the phase shifting structure provides the three wavelength compatibility function which enables the objective lens 10D to form a suitable beam spot on the recording surface of each of the optical disc D1, D2 and D3 without causing the spherical aberration.

Each step formed in the phase shifting structure defined by the first and second OPD functions causes two different changing amounts in an optical path length having different absolute values in the first laser beam. That is, the changing amounts in an optical path length having different absolute values are brought about by each step. In this case, if a direction in which an optical path length changes from the objective lens 10D toward the optical disc is defined as a plus direction and an opposite direction is defined as a minus direction, inconsistency in signs of the direction is not regarded as a different amount in regard to a changing amount in optical path length change.

The two different changing amounts in an optical path length brought by each step are defined as values (unit: λ) obtained by multiplying an wavelength of the first laser beam by $(i_A+\Delta_A)$ and $(i_B+\Delta_B)$, where $i_A$ and $i_B$ are integers. At least one of the two different changing amounts in an optical path length satisfies the following condition (1) when $i_A$ is represented by 2k+1 (k: a natural number) and the diffraction order at which the diffraction efficiency for the third laser beam is maximized is the (k+1)-th order.

$$0.000 \leq \Delta_A \leq 0.384 \quad (1)$$

At least one of the two different changing amounts in an optical path length may satisfy the following condition (5) when $i_A$ is represented by 2k+1 (k: a natural number) and the diffraction order at which the diffraction efficiency for the third laser beam is maximized is the k-th order.

$$-0.384 \leq \Delta_A \leq -0.070 \quad (5)$$

If $\Delta_A$ gets larger than the upper limit of the condition (1) or gets smaller than the lower limit of the condition (5), the usage efficiency of light for the first laser beam decreases to an unsuitable level although in this case the usage efficiency of light for the third laser beam can be further enhanced. If $\Delta_A$ gets smaller than the lower limit of the condition (1) or gets larger than the upper limit of the condition (5), the usage efficiency of light for the third laser beam decreases to an unsuitable level.

Figure 27:
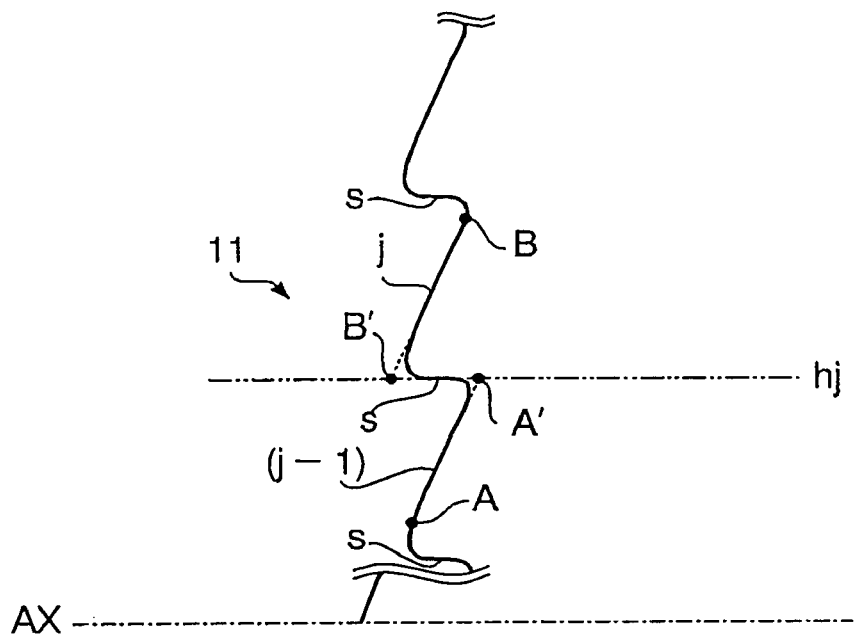
FIG. 27 is an enlarged cross-sectional view of a first surface of an objective lens according to the fourth embodiment.

FIG. 27 is an enlarged cross-sectional view of the first surface 11 of the objective lens 10D, illustrating the phase shifting structure. In FIG. 27, j represents a j-th refractive surface zone with respect to the optical axis AX. A chain double-dashed line hj represents a position of a step formed between the (j−1)-th refractive surface zone and the j-th refractive surface zone. That is, the line hj represents a boundary between the (j−1)-th refractive surface zone and the j-th refractive surface zone. The changing amount in an optical path length brought by a step "s" is defined as a difference between an optical path length obtained by evaluating light refracted by an extended surface B-B' of the j-th refractive surface zone at a point B' (which is an intersection of the line hj and a virtual refractive surface obtained by extending the j-th refractive surface zone in a direction facing the optical axis AX) and an optical path length obtained by evaluating light refracted by an extended surface A-A' of the (j−1)-th refractive surface zone at a point A' (which is an intersection of the line hj and a virtual refractive surface obtained by extending the (j−1)-th refractive surface zone in a direction departing from the optical axis AX).

As shown in FIG. 27, there is a case where an edge of each step is formed in a round shape (i.e., the shape of an edge of each step is slightly corrupted). However, in practice, such a corruption in an edge shape of each step may have no effect on the diffracting function of the phase shifting structure.

Figure 28:
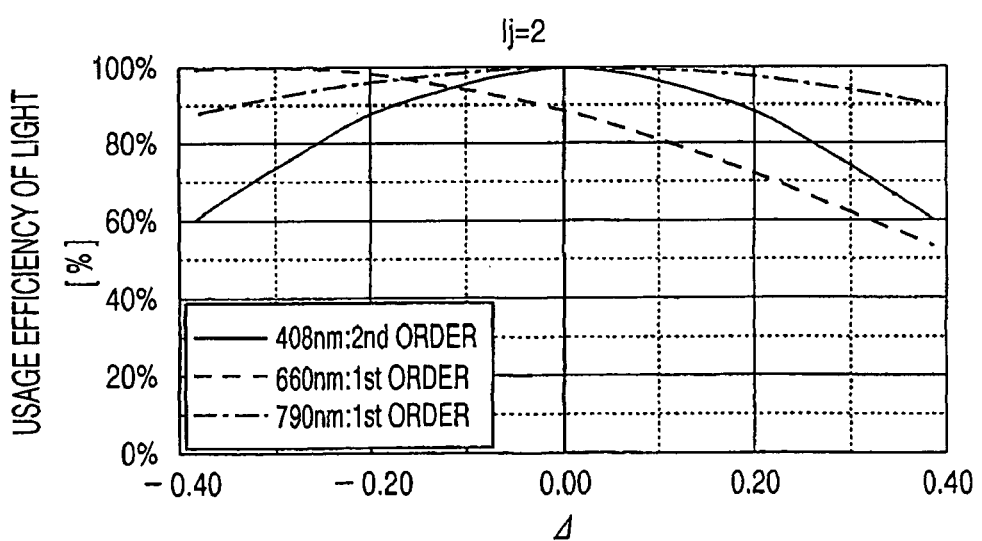
FIG. 28 is a graph illustrating the usage efficiency of light with respect to $\Delta_A$, for each of the first to third laser beams, in the case of i=2.
Figure 29:
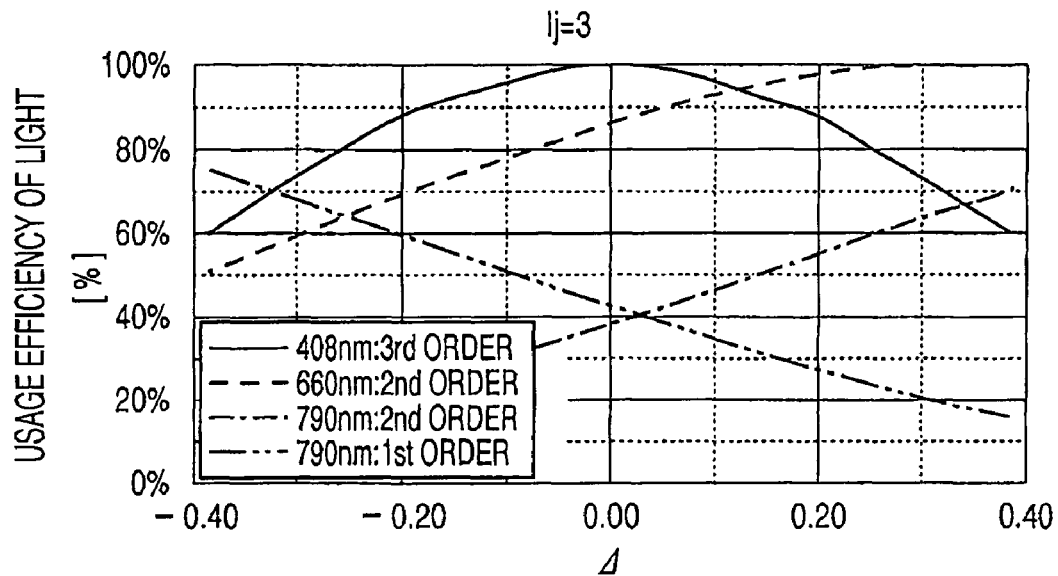
FIG. 29 is a graph illustrating the usage efficiency of light with respect to $\Delta_A$, for each of the first to third laser beams, in the case of i=3.

FIGS. 28 to 31 are graphs representing usage efficiency of the first to third laser beams obtained in regard to various values of "i" (where, i include $i_A$, $i_B$ and $i_C$) and "Δ" (where, Δ include $\Delta_A$, $\Delta_B$ and $\Delta_C$). FIG. 28 is a graph illustrating the usage efficiency of light with respect to Δ, for each of the first to third laser beams, in the case of i=2. That is, the usage efficiency for the second order diffracted light of the first laser beam, the usage efficiency for the first order diffracted light of the second laser beam, and the usage efficiency for the first order diffracted light of the third laser beam are illustrated in FIG. 28. FIG. 29 is a graph illustrating the usage efficiency of light with respect to Δ, for each of the first to third laser beams, in the case of i=3. That is, the usage efficiency for the third order diffracted light of the first laser beam, the usage efficiency for the second order diffracted light of the second laser beam, and the usage efficiencies for the first and second order diffracted light of the third laser beam are illustrated in FIG. 29.

Figure 30:
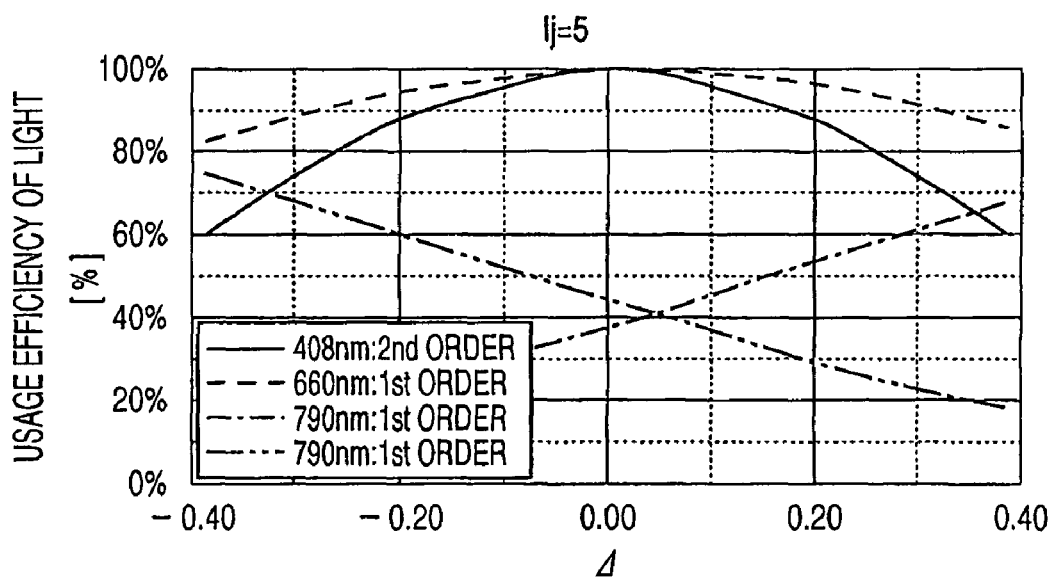
FIG. 30 is a graph illustrating the usage efficiency of light with respect to $\Delta_A$, for each of the first to third laser beams, in the case of i=5.
Figure 31:
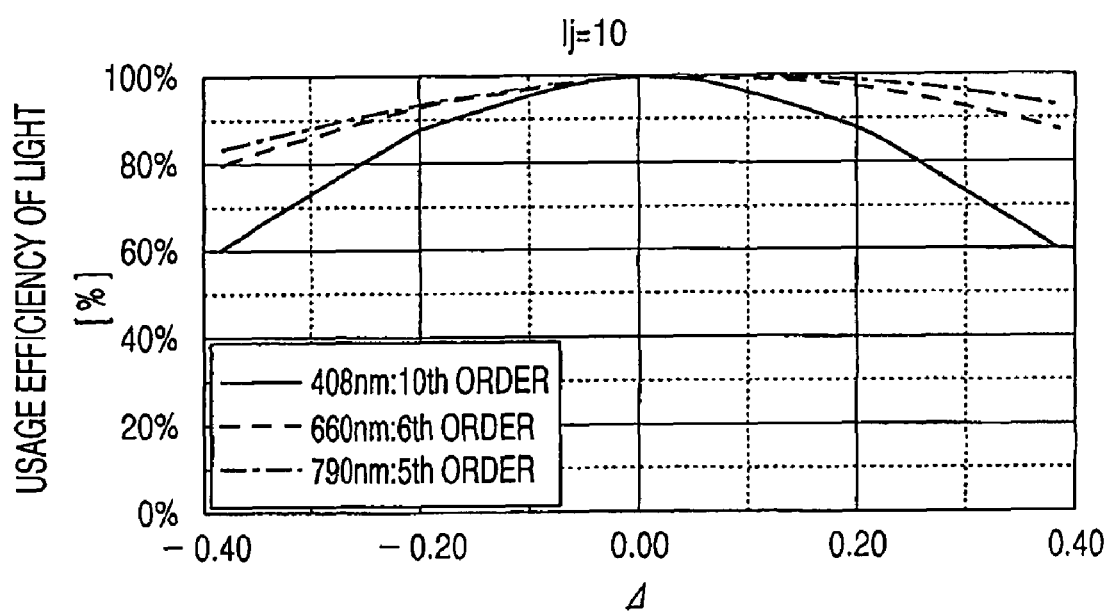
FIG. 31 is a graph illustrating the usage efficiency of light with respect to $\Delta_A$, for each of the first to third laser beams, in the case of i=10.

FIG. 30 is a graph illustrating the usage efficiency of light with respect to $\Delta_A$, for each of the first to third laser beams, in the case of i=5. That is, the usage efficiency for the fifth order diffracted light of the first laser beam, the usage efficiency for the third order diffracted light of the second laser beam, and the usage efficiencies for the second and third order diffracted light of the third laser beam are illustrated in FIG. 30. FIG. 31 is a graph illustrating the usage efficiency of light with respect to $\Delta_A$, for each of the first to third laser beams, in the case of i=10. That is, the usage efficiency for the tenth order diffracted light of the first laser beam, the usage efficiency for the sixth order diffracted light of the second laser beam, and the usage efficiency for the fifth order diffracted light of the third laser beam are illustrated in FIG. 31.

In each of FIGS. 28 to 31, a horizontal axis represents A, a vertical axis represents the usage efficiency of light, a solid line represents the usage efficiency for the first laser beam having he design wavelength of 408 nm, a dashed-line represents the usage efficiency for the second laser beam having he design wavelength of 660 nm, and a chain line (or a chain double-dashed line) represents the usage efficiency for the third laser beam having he design wavelength of 790 nm.

As shown in FIGS. 28 to 31, the usage efficiency for the first laser beams increases as a value of Δ gets closer to zero. At a point i=0, the usage efficiency of the first laser beam takes a value substantially equal to 100%. By contrast, the usage efficiency for the second or third laser beam does not necessarily increase as a value of Δ gets closer to zero. In general, the optical disc D1 requires a greater amount of light than the optical discs D2 and D3. Therefore, it is preferable that the usage efficiency for the second and third laser beam takes as high a value as possible while maintaining a high usage efficiency for the first laser beam.

For this reason, Δ is determined as follows. When the diffraction order at which the diffraction efficiency for the third laser beam is maximized is set at a (k+1)-th order, Δ may be set to satisfy at least one of the following conditions (2) to (4), in addition to satisfying the condition (1).

$$0.020 \leq \Delta_A \leq 0.324 \quad (2)$$

$$0.020 \leq \Delta_A \leq 0.258 \quad (3)$$

$$0.020 \leq \Delta_A \leq 0.178 \quad (4)$$

When the diffraction order at which the diffraction efficiency for the third laser beam is maximized is set at a k-th order, Δ may be set to satisfy at least one of the following conditions (6) to (8), in addition to satisfying the condition (5).

$$-0.324 \leq \Delta_A \leq -0.070 \quad (6)$$

$$-0.258 \leq \Delta_A \leq -0.070 \quad (7)$$

$$-0.178 \leq \Delta_A \leq -0.070 \quad (8)$$

As shown in FIGS. 28 to 31, by satisfying the condition (1), the usage efficiency for the first laser beam can be kept more than approximately 60% regardless of the values of "i". In particular, if i is an odd number (i.e., i=2k+1), two types of diffracted light beams having the usage efficiency of light of approximately 40% are generated for the third laser beam (see FIGS. 29 and 30). In this case, by setting the diffraction order, at which the diffraction efficiency for the third laser beam is maximized, to the (k+1)-th order, and setting Δi to satisfy the condition (1), the usage efficiency of light of more than approximately 50% can be obtained for the third laser beam. If i=3, the usage efficiency of light of approximately 100% can be obtained for the second laser beam.

As shown in FIGS. 28 to 31, if the condition (2) is satisfied, the usage efficiency of light of more than approximately 70% can be obtained for the first laser beam regardless of a value of "i". As shown in FIGS. 28 to 31, if the condition (3) is satisfied, the usage efficiency of light of more than approximately 80% can be obtained for the first laser beam regardless of a value of "i". As shown in FIGS. 28 to 31, if the condition (4) is satisfied, the usage efficiency of light of more than approximately 90% can be obtained for the first laser beam regardless of a value of "i".

If i is an odd number (i.e., i=2k+1), the diffraction order, at which the diffraction efficiency for the third laser beam is maximized, is set to a k-th order, and $\Delta$ is set to satisfy the condition (5), then the usage efficiency of light of more than approximately 50% can be obtained for the third laser beam.

As shown in FIGS. 28 to 31, if the condition (6) is satisfied, the usage efficiency of light of more than approximately 70% can be obtained for the first laser beam regardless of a value of "i". As shown in FIGS. 28 to 31, if the condition (7) is satisfied, the usage efficiency of light of more than approximately 80% can be obtained for the first laser beam regardless of a value of "i". As shown in FIGS. 28 to 31, if the condition (8) is satisfied, the usage efficiency of light of more than approximately 90% can be obtained for the first laser beam regardless of a value of "i".

In this embodiment, an odd number is assigned to "$i_A$" for one of the two different changing amounts in an optical path length, so that the spherical aberration caused when the optical disc D3 is used can be suitably corrected while keeping the usage efficiency for the first laser beam at a high level. By assigning an even value to "$i_B$" for the other of the two different changing mounts in an optical path length, it becomes possible to keep the usage efficiency for each of the first and third laser beams at a high level. The phase shifting structure is thus provided with the three wavelength compatibility function. More specifically, the objective lens 10D is able to form a beam spot suitable for recordation and/or reproduction for each of the optical discs D1, D2 and D3 while suppressing the spherical aberration sufficiently.

It should be noted that the three wavelength compatibility function is obtained as a total function as a combination of the first and second OPD functions. Therefore, the first and second OPD functions are not determined in such a manner that one of the two OPD functions has compatibility for a particular pair of wavelengths.

There is a case where a step (hereafter, frequently referred to as a special step) of the phase shifting structure is configured such that a changing amount in an optical path length for the first laser beam appears as a sum or a difference of the two different changing amounts.

In this embodiment, the wavelength shift compensation function (i.e., a function of correcting a spherical aberration due to a small amount of wavelength shift of each laser beam) is also given to the phase shifting structure. If the wavelength shift compensation function is to be given to the phase shifting structure of the objective lens 10D, the degrees of freedom of a design for the phase shifting structure need to be further increased. For this reason, a third OPD function is determined in addition to the first and second OPD functions so that the three wavelength compatibility function and the wavelength shift compensation function are given to the phase shifting structure by combining the three different OPD functions. If three different ODP functions are applied to a phase shifting structure, the three different changing amounts in an optical path length are given to the first laser beam by steps in the phase shifting structure.

It should be noted that the three wavelength compatibility function is obtained as a total function as a combination of the first to third second OPD functions. Therefore, the phase shifting structure is not designed in such a manner that a certain OPD function has a particular effect definitely distinguishable from effects attained by the other OPD functions.

The phase shifting structure is not necessarily required to be formed on the entire region of the first surface 11 of the objective lens 10D, but may be formed in an inner area (hereafter, referred to as a first area) contributing to converging the third laser beam (i.e., contributing to the formation of a beam spot for all of the first to third laser beams).

In this embodiment, a second area is further provided on the first surface 11 to surround the first area, and a third area is further provided on the first surface 11 to surround the second area because of differences in beam diameters for attaining numerical apertures for the optical discs D1, D2 and D3. That is, the different phase shifting structures are formed in the first, second and third areas, respectively.

The phase shifting structure formed in the second area is configured to have the two wavelength compatibility function having such an effect that the first and second laser beams, of which beam diameters are larger than that of the third laser beam, are suitably converged on the recording surfaces of the optical discs D1 and D2, respectively. The phase shifting structure formed in the second area may be additionally provided with the wavelength shift compensation function for each of the first and second laser beams. If the wavelength shift compensation function is to be given to the phase shifting structure in the second area, two different OPD functions are designed and are combined together so as to determine the phase shifting structure.

The phase shifting structure in the second area has steps that do not contribute to converging the third laser beam. Therefore, at least one of the two different changing amounts in an optical path length given by steps in the second area is different from a changing amount in an optical path length given by steps in the first area.

It should noted that if the phase shifting structure in the second area is designed by two different OPD functions, there is a case where the special step is formed in the second area.

The third area is formed if effective diameters of the first and second laser beams on the first surface 11 of the objective lens 10D are different from each other. Assume that a focal length is represented by f1 when the optical disc D1 is used and a focal length is represented by f2 when the optical disc D2 is used. If the following condition (9) holds (i.e., the effective diameter of the second laser beam on an incident surface of the objective lens 10D is larger than that of the first laser beam), the phase shifting structure is formed on the third area in such a manner that the second laser beam is suitably converged on the recording surface of the optical disc D2 without causing the spherical aberration.

$$f1 \times NA1 < f2 \times NA2 \tag{9}$$

In contrast to the second area, the third area, which is formed when the condition (9) holds, does not contribute to converging the first laser beam. That is, the third area functions as an aperture stop for the first laser beam. More specifically, the phase shifting structure in the third area is designed such that a changing amount in an optical path length given, by a boundary between adjacent refractive surface zones in the third area, to the second laser beam is different from a changing amount in an optical path length given, by a boundary between adjacent refractive surface zones in the second area, to the second laser beam. Further, the phase shifting structure is blazed so that the diffraction efficiency for the second laser beam is maximized.

If the following condition (10) holds (i.e., the effective diameter of the first laser beam on an incident surface of the objective lens 10D is larger than that of the second laser beam), the phase shifting structure is formed on the third area in such a manner that the first laser beam is suitably converged on the recording surface of the optical disc D1 without causing the spherical aberration.

$$f1 \times NA1 > f2 \times NA2 \quad (10)$$

In contrast to the second area, the third area, which is formed when the condition (10) holds, does not contribute to converging the second laser beam. That is, the third area functions as an aperture stop for the second laser beam. More specifically, the phase shifting structure in the third area is designed such that a changing amount in an optical path length given, by a boundary between adjacent refractive surface zones in the third area, to the first laser beam is different from a changing amount in an optical path length given, by a boundary between adjacent refractive surface zones in the second area, to the first laser beam. Further, the phase shifting structure is blazed so that the diffraction efficiency for the first laser beam is maximized.

Hereafter, six (eleventh to sixteenth) numerical examples of the objective lens 10D designed according to the fourth embodiment will be described. In the eleventh to fifteenth examples, the diffraction order at which the diffraction efficiency for the third laser beam is maximized is set at a (k+1)-th order. In a sixteen example, the diffraction order at which the diffraction efficiency for the third laser beam is maximized is set at a k-th order.

In the eleventh, twelfth, fourteenth and sixteenth examples, an aperture stop (not shown in FIG. 4) is used so as to attain a suitable numerical aperture for the optical disc D3 by reducing the beam diameter of the third laser beam as shown in FIGS. 5A to 5C. In each of the following examples, the optical disc D1 having the highest recording density has the cover layer thickness of 0.6 mm, the optical disc D2 having the second highest recording density has the cover layer thickness of 0.6 mm, and the optical disc D3 having the lowest recording density has the cover layer thickness of 1.2 mm.

Eleventh Example

Hereafter, an eleventh example will be described. The objective lens 10D according to the eleventh example is provided with a phase shifting structure producing two different changing amounts in an optical path length. Performance specifications of the objective lens 10D according to the eleventh example are shown in Table 51.

TABLE 51

|  | First laser beam | Second laser beam | Third laser beam |
|---|---|---|---|
| Design wavelength (nm) | 408 | 660 | 790 |
| focal length (mm) | 2.250 | 2.324 | 2.338 |
| NA | 0.667 | 0.645 | 0.470 |
| magnification | 0.000 | 0.000 | 0.000 |

As shown by the values of the magnification in Table 51, the first, second and third laser beams are incident on the objective lens 10D as collimated beams, respectively.

Table 52 shows a numerical configuration of the optical disc drive according to the eleventh example when the optical disc D1 is used. Table 53 shows a numerical configuration of the optical disc drive according to the eleventh example when the optical disc D2 is used. Table 54 shows a numerical configuration of the optical disc drive according to the eleventh example when the optical disc D3 is used.

TABLE 52

| surface No. | r | d | n(408 nm) |
|---|---|---|---|
| 0 |  | ∞ |  |
| 1 | 1.392 | 1.60 | 1.52424 |
| 2 | −4.675 | 0.99 |  |
| 3 | ∞ | 0.60 | 1.62110 |
| 4 | ∞ | — |  |

TABLE 53

| surface No. | r | d | n(660 nm) |
|---|---|---|---|
| 0 |  | ∞ |  |
| 1 | 1.392 | 1.60 | 1.50635 |
| 2 | −4.675 | 1.05 |  |
| 3 | ∞ | 0.60 | 1.57961 |
| 4 | ∞ | — |  |

TABLE 54

| surface No. | r | d | n(790 nm) |
|---|---|---|---|
| 0 |  | ∞ |  |
| 1 | 1.392 | 1.60 | 1.50313 |
| 2 | −4.675 | 0.68 |  |
| 3 | ∞ | 1.20 | 1.57307 |
| 4 | ∞ | — |  |

In Tables 52 to 54 (and in the following similar Tables), surface #0 represents the corresponding light source, surfaces #1 and #2 represent the first and second surfaces 11 and 12 of the objective lens 10D, respectively, and surfaces #3 and #4 respectively represent the cover layer 21 and the recording surface 22 of the corresponding optical disc.

Each of the first and second surfaces #11 and #12 of the objective lens 10D is an aspherical surface. Table 55 shows the conical coefficient and aspherical coefficients of the first and second surfaces 11 and 12 (surfaces #1 and #2) of the objective lens 10D.

TABLE 55

| Surface No. | K | A4 | A6 | A8 |
|---|---|---|---|---|
| 1 | −0.6500 | 1.27937E−04 | −1.76290E−03 | 1.70447E−03 |
| 2 | 0.0000 | 7.75911E−02 | −6.96224E−02 | 6.85768E−02 |

| Surface No. | A10 | A12 | A14 |
|---|---|---|---|
| 1 | −2.49261E−03 | 1.52369E−03 | −3.80496E−04 |
| 2 | −4.63783E−02 | 1.59165E−02 | −2.19585E−03 |

In this example, a phase shifting structure is formed on the first surface 11 of the objective lens 10D. Table 56 shows coefficients $P_{2i}$ for first and second OPD functions which define the phase shifting structure to be formed on the first surface 11 of the objective lens 10D. Table 57 shows diffraction orders m (at which the laser beams take the respective maximum diffraction efficiencies) for each the first and second OPD functions. As shown in Table 57 and FIGS. 27 to 31, the diffraction order (i.e., "i") at which the diffraction efficiency for the first laser beam is maximized is different from those of the other laser beams. In this example (and in the twelfth to fifteenth examples), the diffraction order m at which the diffraction efficiency for the third laser beam is maximized is represented by (k+1).

TABLE 56

| Surface No. | | P2 | P4 | P6 | P8 | P10 | P12 |
|---|---|---|---|---|---|---|---|
| 1 | 1st OPD Function | 0.00000E+00 | −1.62222E+00 | −6.93841E−02 | −1.55072E−01 | 0.00000E+00 | 0.00000E+00 |
|   | 2nd OPD Function | 0.00000E+00 | −2.89986E+00 | −4.31520E−01 | −4.15845E−02 | −2.51915E−02 | 0.00000E+00 |

TABLE 57

| | wavelength [nm] | | |
|---|---|---|---|
| | 408 | 660 | 790 |
| 1st OPD Function | 2 | 1 | 1 |
| 2nd OPD Function | 3 | 2 | 2 |

Table 58 shows the phase shifting structure formed on the first surface 11 of the objective lens 10D. The phase shifting structure has a plurality of annular zones (refractive surface zones) concentrically formed about the optical axis AX of the objective lens 10D. In Table 58, "No." represents the number of each annular zone counted with respect to the optical axis. Each annular zone is formed in a region between "hmin" and "hmax" which are heights from the optical axis AX. In table 58 the changing amounts in an optical path length are also shown.

TABLE 58

| No. | hmin | hmax | changing amount in an optical path length |
|---|---|---|---|
| 0 | 0.000 | 0.635 | |
| 1 | 0.635 | 0.736 | −3.00 |
| 2 | 0.736 | 0.826 | −2.00 |
| 3 | 0.826 | 0.931 | −3.00 |
| 4 | 0.931 | 0.954 | −3.00 |
| 5 | 0.954 | 1.007 | −2.00 |
| 6 | 1.007 | 1.066 | −3.00 |
| 7 | 1.066 | 1.070 | −3.00 |
| 8 | 1.070 | 1.116 | −2.00 |
| 9 | 1.116 | 1.152 | −3.00 |
| 10 | 1.152 | 1.158 | −2.00 |
| 11 | 1.158 | 1.195 | −3.00 |
| 12 | 1.195 | 1.215 | −3.00 |
| 13 | 1.215 | 1.228 | −2.00 |
| 14 | 1.228 | 1.258 | −3.00 |
| 15 | 1.258 | 1.267 | −3.00 |
| 16 | 1.267 | 1.286 | −2.00 |
| 17 | 1.286 | 1.311 | −3.00 |
| 18 | 1.311 | 1.334 | −5.00 |
| 19 | 1.334 | 1.349 | −3.00 |
| 20 | 1.349 | 1.356 | −2.00 |
| 21 | 1.356 | 1.377 | −3.00 |
| 22 | 1.377 | 1.383 | −3.00 |
| 23 | 1.383 | 1.396 | −2.00 |
| 24 | 1.396 | 1.414 | −3.00 |
| 25 | 1.414 | 1.431 | −5.00 |
| 26 | 1.431 | 1.441 | −3.00 |
| 27 | 1.441 | 1.447 | −2.00 |
| 28 | 1.447 | 1.463 | −3.00 |
| 29 | 1.463 | 1.466 | −3.00 |
| 30 | 1.466 | 1.477 | −2.00 |
| 31 | 1.477 | 1.490 | −3.00 |
| 32 | 1.490 | 1.492 | −2.00 |
| 33 | 1.492 | 1.500 | −3.00 |

As shown in Table 58, the changing amount in an optical path length given to the first laser beam by each step between adjacent annular zones is −3λ (λ: a wavelength) or −2λ. That is, in this example, "$i_A$"=3, "$i_B$"=2 and $\Delta_A = \Delta_B = 0$. In this example, steps formed at a boundary between the annular zones #17 and #18 and a boundary between the annular zones #24 and #25 are special steps, and produce the changing mount in an optical path length of −5λ.

Figure 32A:
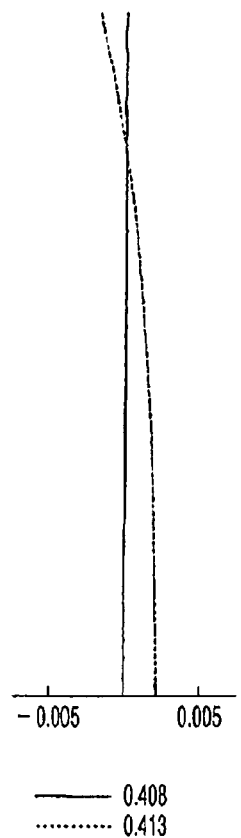
FIG. 32A is a graph illustrating a spherical aberration caused in an optical disc drive according to an eleventh example when the first laser beam is used.
Figure 32B:
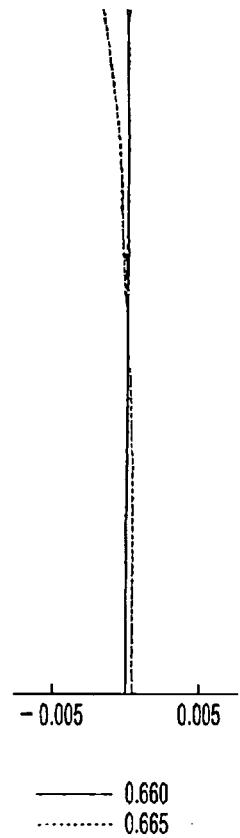
FIG. 32B is a graph illustrating the spherical aberration caused in the optical disc drive according to the eleventh example when the second laser beam is used.
Figure 32C:
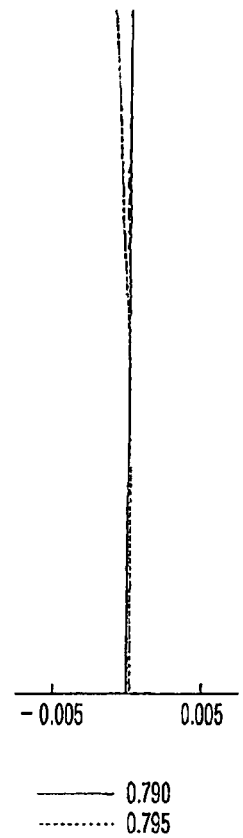
FIG. 32C is a graph illustrating the spherical aberration caused in the optical disc drive according to the eleventh example when the third laser beam is used.

FIG. 32A is a graph illustrating the spherical aberration caused in the optical disc drive when the first laser beam (i.e., the optical disc D1) is used. FIG. 32B is a graph illustrating the spherical aberration caused in the optical disc drive when the second laser beam (i.e., the optical disc D2) is used. FIG. 32C is a graph illustrating the spherical aberration caused in the optical disc drive when the third laser beam (i.e., the optical disc D3) is used. In FIGS. 32A to 32C (and in the following similar graphs), a solid line represents a spherical aberration when the wavelength of the laser beam being used is at the design wavelength, and a dashed line represents a spherical aberration when the wavelength of the laser beam being used shifts from the design wavelength by 5 nm.

As can be seen from FIGS. 32A to 32C, the objective lens 10D according to the eleventh example is able to suitably converge the first, second and third laser beams on the recording surfaces 22 of the optical discs D1, D2 and D3, respectively, without causing the spherical aberration. Further, the spherical aberration caused by the wavelength shift is sufficiently suppressed.

Twelfth Example

Hereafter, a twelfth example will be described. The objective lens 10D according to the twelfth example is provided with a phase shifting structure producing three different changing amounts in an optical path length. Performance specifications of the objective lens 10D according to the twelfth example are shown in Table 59.

TABLE 59

| | First laser beam | Second laser beam | Third laser beam |
|---|---|---|---|
| Design wavelength (nm) | 408 | 660 | 790 |
| focal length (mm) | 2.250 | 2.324 | 2.338 |
| NA | 0.667 | 0.645 | 0.500 |
| magnification | 0.000 | 0.000 | 0.000 |

As shown by the values of the magnification in Table 59, the first, second and third laser beams are incident on the optical discs D1, D2 and D3 as collimated beams, respectively.

Table 60 shows a numerical configuration of the optical disc drive according to the twelfth example when the optical disc D1 is used. Table 61 shows a numerical configuration of the optical disc drive according to the twelfth example when the optical disc D2 is used. Table 62 shows a numerical configuration of the optical disc drive according to the twelfth example when the optical disc D3 is used.

TABLE 60

| surface No. | r | d | n(408 nm) |
|---|---|---|---|
| 0 | ∞ | | |
| 1 | 1.418 | 1.60 | 1.52424 |
| 2 | −4.292 | 1.01 | |
| 3 | ∞ | 0.60 | 1.62110 |
| 4 | ∞ | — | |

TABLE 61

| surface No. | r | d | n(660 nm) |
|---|---|---|---|
| 0 | ∞ | | |
| 1 | 1.418 | 1.60 | 1.50635 |
| 2 | −4.292 | 1.06 | |
| 3 | ∞ | 0.60 | 1.57961 |
| 4 | ∞ | — | |

TABLE 62

| surface No. | r | d | n(790 nm) |
|---|---|---|---|
| 0 | ∞ | | |
| 1 | 1.418 | 1.60 | 1.50313 |
| 2 | −4.292 | 0.69 | |
| 3 | ∞ | 1.20 | 1.57307 |
| 4 | ∞ | — | |

Each of the first and second surfaces #11 and #12 of the objective lens 10D is an aspherical surface. Table 63 shows the conical coefficient and aspherical coefficients of the first and second surfaces 11 and 12 (surfaces #1 and #2) of the objective lens 10D.

TABLE 63

| Surface No. | K | A4 | A6 | A8 | A10 | A12 | A14 |
|---|---|---|---|---|---|---|---|
| 1 | −0.6500 | 5.62818E−03 | 2.06710E−03 | −1.68454E−03 | 1.55055E−03 | −4.79979E−04 | 0.00000E+00 |
| 2 | 0.0000 | 6.39459E−02 | −3.35166E−02 | 2.27788E−02 | −1.68427E−02 | 6.84085E−03 | −1.08289E−03 |

In this example, a phase shifting structure is formed on the first surface 11 of the objective lens 10D. Table 64 shows coefficients $P_{2i}$ for first to third optical path difference (OPD) functions which define the phase shifting structure to be formed on the first surface 11 of the objective lens 10D. Table 65 shows diffraction orders m (at which the laser beams take the respective maximum diffraction efficiencies) for each the first to third optical path difference (OPD) functions.

TABLE 64

| Surface No. | | P2 | P4 | P6 | P8 | P10 | P12 |
|---|---|---|---|---|---|---|---|
| 1 | 1st OPD Function | 0.00000E+00 | −1.39776E+00 | −1.38210E−01 | −2.33152E−01 | 6.78901E−02 | 0.00000E+00 |
| | 2nd OPD Function | 0.00000E+00 | −2.86536E+00 | −7.35321E−01 | 8.87374E−02 | 3.19712E−02 | 0.00000E+00 |
| | 3rd OPD Function | 0.00000E+00 | 1.06527E+00 | 2.28335E−01 | 0.00000E+00 | 0.00000E+00 | 0.00000E+00 |

TABLE 65

| wavelength [nm] | 1st laser beam | 2nd laser beam | 3rd laser beam |
|---|---|---|---|
| 1st OPD Function | 2 | 1 | 1 |
| 2nd OPD Function | 3 | 2 | 2 |
| 3rd OPD Function | 10 | 6 | 5 |

Table 66 shows the phase shifting structure formed on the first surface 11 of the objective lens 10D.

TABLE 66

| No. | hmin | hmax | changing amount in an optical path length |
|---|---|---|---|
| 0 | 0.000 | 0.631 | |
| 1 | 0.631 | 0.755 | −3.00 |
| 2 | 0.755 | 0.801 | −2.00 |
| 3 | 0.801 | 0.819 | 10.00 |
| 4 | 0.819 | 0.923 | −3.00 |
| 5 | 0.923 | 0.972 | −3.00 |
| 6 | 0.972 | 0.997 | −2.00 |
| 7 | 0.997 | 1.035 | −3.00 |
| 8 | 1.035 | 1.056 | 10.00 |
| 9 | 1.056 | 1.089 | −3.00 |
| 10 | 1.089 | 1.105 | −2.00 |
| 11 | 1.105 | 1.147 | −3.00 |
| 12 | 1.147 | 1.162 | −3.00 |
| 13 | 1.162 | 1.172 | 10.00 |
| 14 | 1.172 | 1.184 | −2.00 |
| 15 | 1.184 | 1.218 | −3.00 |
| 16 | 1.218 | 1.238 | −3.00 |
| 17 | 1.238 | 1.248 | −2.00 |
| 18 | 1.248 | 1.252 | −3.00 |
| 19 | 1.252 | 1.276 | 10.00 |
| 20 | 1.276 | 1.294 | −3.00 |
| 21 | 1.294 | 1.301 | −2.00 |

TABLE 66-continued

| No. | hmin | hmax | changing amount in an optical path length |
|---|---|---|---|
| 22 | 1.301 | 1.325 | −3.00 |
| 23 | 1.325 | 1.342 | 7.00 |
| 24 | 1.342 | 1.347 | −2.00 |

TABLE 66-continued

| No. | hmin | hmax | changing amount in an optical path length |
|---|---|---|---|
| 25 | 1.347 | 1.368 | −3.00 |
| 26 | 1.368 | 1.388 | −3.00 |
| 27 | 1.388 | 1.406 | 5.00 |
| 28 | 1.406 | 1.423 | −3.00 |
| 29 | 1.423 | 1.434 | −5.00 |
| 30 | 1.434 | 1.441 | 10.00 |
| 31 | 1.441 | 1.459 | −3.00 |
| 32 | 1.459 | 1.472 | −5.00 |
| 33 | 1.472 | 1.480 | −3.00 |
| 34 | 1.480 | 1.487 | 10.00 |
| 35 | 1.487 | 1.493 | −3.00 |
| 36 | 1.493 | 1.500 | −2.00 |

As shown in Table 66, the changing amount in an optical path length given to the first laser beam by each step between adjacent annular zones is −3λ, −2λ or 10λ. That is, in this example, "$i_A$"=, 3, "$i_B$"=2 "$i_C$"=10 and $\Delta_A = \Delta_B = \Delta_C = 0$. In the example, steps formed at a boundary between the annular zones #22 and #23, a boundary between the annular zones #26 and #27, a boundary between the annular zones #28 and #29 and a boundary between the annular zones #31 and #32 are special steps, and produce the changing mount as a sum of the three different changing amounts in an optical path length.

Figure 33A:
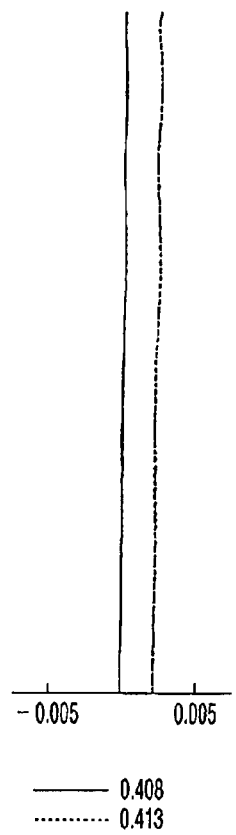
FIG. 33A is a graph illustrating a spherical aberration caused in an optical disc drive according to a twelfth example when the first laser beam is used.
Figure 33B:
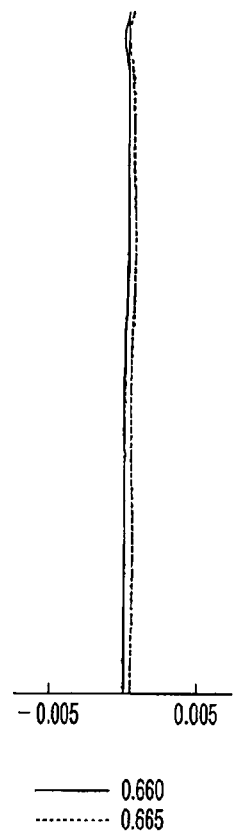
FIG. 33B is a graph illustrating the spherical aberration caused in the optical disc drive according to the twelfth example when the second laser beam is used.
Figure 33C:
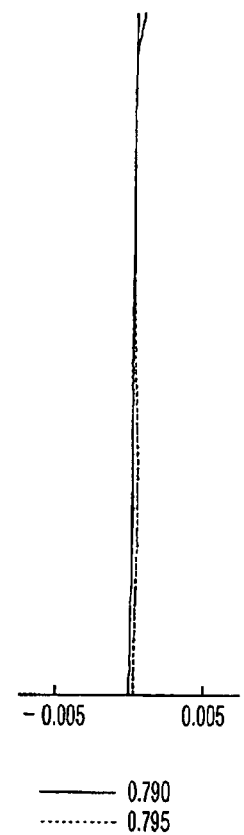
FIG. 33C is a graph illustrating the spherical aberration caused in the optical disc drive according to the twelfth example when the third laser beam is used.

FIG. 33A is a graph illustrating the spherical aberration caused in the optical disc drive when the first laser beam (i.e., the optical disc D1) is used. FIG. 33B is a graph illustrating the spherical aberration caused in the optical disc drive when the second laser beam (i.e., the optical disc D2) is used. FIG. 33C is a graph illustrating the spherical aberration caused in the optical disc drive when the third laser beam (i.e., the optical disc D3) is used.

As can be seen from FIGS. 33A to 33C, the objective lens 10D according to the twelfth example is able to suitably converge the first, second and third laser beams on the recording surfaces 22 of the optical discs D1, D2 and D3, respectively, without causing the spherical aberration. The phase shifting structure has steps producing three different changing amounts in an optical path length. That is, the objective lens 10D according to the twelfth example, has the three wavelength compatibility function and the wavelength shift compensation function. As shown in FIGS. 33A to 33C, the spherical aberration caused by the wavelength shift is also sufficiently suppressed.

Thirteenth Example

Hereafter, a thirteenth example will be described. Performance specifications of the objective lens 10D according to the thirteenth example are shown in Table 67.

TABLE 67

|  | First laser beam | Second laser beam | Third laser beam |
|---|---|---|---|
| Design wavelength (nm) | 407 | 657 | 788 |
| focal length (mm) | 3.100 | 3.204 | 3.224 |
| NA | 0.650 | 0.649 | 0.509 |
| magnification | 0.000 | 0.000 | 0.000 |

As shown by the values of the magnification in Table 67, the first, second and third laser beams are incident on the objective lens 10D as collimated beams, respectively.

Table 68 shows a numerical configuration of the optical disc drive according to the thirteenth example when the optical disc D1 is used. Table 69 shows a numerical configuration of the optical disc drive according to the thirteenth example when the optical disc D2 is used. Table 70 shows a numerical configuration of the optical disc drive according to the thirteenth example when the optical disc D3 is used.

TABLE 68

| surface No. | r | d | n(407 nm) |
|---|---|---|---|
| 0 |  | ∞ |  |
| 1(first area) | 1.900 | 2.00 | 1.52439 |
| 1(second area) | 1.900 |  |  |
| 1(third area) | 1.900 |  |  |
| 2 | −7.180 | 1.61 |  |
| 3 | ∞ | 0.60 | 1.62150 |
| 4 | ∞ | — |  |

TABLE 69

| surface No. | r | d | n(657 nm) |
|---|---|---|---|
| 0 |  | ∞ |  |
| 1(first area) | 1.900 | 2.00 | 1.50645 |
| 1(second area) | 1.900 |  |  |
| 1(third area) | 1.900 |  |  |
| 2 | −7.180 | 1.69 |  |
| 3 | ∞ | 0.60 | 1.57982 |
| 4 | ∞ | — |  |

TABLE 70

| surface No. | r | d | n(788 nm) |
|---|---|---|---|
| 0 |  | ∞ |  |
| 1(first area) | 1.900 | 2.00 | 1.50316 |
| 1(second area) | 1.900 |  |  |
| 1(third area) | 1.900 |  |  |
| 2 | −7.180 | 1.33 |  |
| 3 | ∞ | 1.20 | 1.57315 |
| 4 | ∞ | — |  |

As can be seen from Table 67, f1×N1=2.015 and f2×N2=2.079. That is, the optical disc drive according to the thirteenth example satisfies the condition (9). Therefore, the first to third areas are formed on the first surface 11 of the objective lens 10D. The phase shifting structure formed in the first area produces two different changing amounts in an optical path length, the phase shifting structure formed in the second area functions as an aperture stop for the third laser beam, and the phase shifting structure formed in the third area functions as an aperture stop for the first laser beam.

The first to third areas are formed in the following ranges of height h indicated with respect to the optical axis.

First area: h≦1.640
Second area: 1.640<h≦2.015
Third area: 2.015<h≦2.080

As described above, the third area contributes to converging only the second laser beam, and does not contribute to converging the first laser beam. Therefore, the changing amount in an optical path length in the third area is represented by a value which is $(i_A + \Delta_A)$ times the wavelength of the second laser beam.

Each of the first and second surfaces #11 and #12 of the objective lens 10D is an aspherical surface. Table 71 shows the conical coefficient and aspherical coefficients of the first and second surfaces 11 and 12 (surfaces #1 and #2) of the objective lens 10D.

TABLE 71

| Surface No. | K | A4 | A6 | A8 | A10 | A12 | A14 |
|---|---|---|---|---|---|---|---|
| 1 (first area) | −0.6000 | −5.32257E−04 | −1.26670E−05 | −8.48524E−05 | 6.23784E−06 | −5.69187E−06 | 0.00000E+00 |
| 1 (second area) | −0.6000 | 1.01561E−03 | −8.85389E−04 | 1.53177E−04 | −2.04839E−05 | −3.32062E−06 | 0.00000E+00 |
| 1 (third area) | −0.6000 | −2.53137E−04 | −1.85486E−04 | 2.14607E−04 | −7.65108E−05 | 2.09281E−06 | 0.00000E+00 |
| 2 | 0.0000 | 2.14831E−02 | −5.92723E−03 | 9.29398E−04 | −9.14182E−05 | 4.52130E−06 | 0.00000E+00 |

In this example, a phase shifting structure is formed on the first surface 11 of the objective lens 10D. Table 72 shows coefficients $P_{2i}$ for OPD functions which define the phase shifting structure to be formed on the first surface 11 of the objective lens 10D. Table 73 shows diffraction orders m (at which the laser beams take the respective maximum diffraction efficiencies) for each the OPD functions.

TABLE 72

| Surface No. | | P2 | P4 | P6 | P8 | P10 | P12 |
|---|---|---|---|---|---|---|---|
| 1 first area | 1st OPD Function | 0.00000E+00 | 6.34458E−01 | 2.25176E−02 | 6.69301E−03 | 0.00000E+00 | 0.00000E+00 |
| | 2nd OPD Function | 0.00000E+00 | −9.02683E−01 | −5.03480E−02 | −1.11255E−02 | 0.00000E+00 | 0.00000E+00 |
| 1 second area | 1st OPD Function | 0.00000E+00 | −8.72732E−01 | 1.51270E−01 | −3.86269E−02 | 0.00000E+00 | 0.00000E+00 |
| | 2nd OPD Function | 0.00000E+00 | 2.06730E−01 | −2.87760E−01 | 4.27367E−02 | 0.00000E+00 | 0.00000E+00 |
| 1 third area | | 0.00000E+00 | −1.43494E+00 | −2.31763E−01 | 0.00000E+00 | 0.00000E+00 | 0.00000E+00 |

TABLE 73

| surface No. | | 1st laser beam | 2nd laser beam | 3rd laser beam |
|---|---|---|---|---|
| 1 (first area) | 1st OPD Function | 2 | 1 | 1 |
| | 2nd OPD Function | 5 | 3 | 3 |
| 1 (second area) | 1st OPD Function | 3 | 2 | — |
| | 2nd OPD Function | 5 | 3 | — |
| 1 (third area) | | — | 1 | — |

As shown in Table 73, the phase shifting structure is configured such that the different diffracting orders m are used in regard to the type of the laser beam being used or the area in which the phase shifting structure is formed. More specifically, the phase shifting structure in the first area is configured to contribute to converging the first to third laser beams although the diffraction orders at which the diffraction efficiencies for the first to third laser beams are maximized are not equal to one another. The phase shifting structure formed in the second area is configured to contribute to converging the first and second laser beams. The phase shifting structure formed in the third area is configured to contribute only to converging the second laser beam.

Table 74 shows the phase shifting structure formed on the first surface 11 of the objective lens 10D.

TABLE 74

| No. | area | hmin | hmax | changing amount in an optical path length |
|---|---|---|---|---|
| 0 | 1st area | 0.000 | 0.853 | |
| 1 | | 0.853 | 0.933 | −5.00 |
| 2 | | 0.933 | 1.112 | 2.00 |
| 3 | | 1.112 | 1.218 | −5.00 |
| 4 | | 1.218 | 1.254 | 2.00 |
| 5 | | 1.254 | 1.357 | −5.00 |
| 6 | | 1.357 | 1.374 | −5.00 |
| 7 | | 1.374 | 1.437 | 2.00 |
| 8 | | 1.437 | 1.486 | −5.00 |
| 9 | | 1.486 | 1.504 | 2.00 |
| 10 | | 1.504 | 1.562 | −5.00 |
| 11 | | 1.562 | 1.575 | −5.00 |
| 12 | | 1.575 | 1.613 | 2.00 |
| 13 | | 1.613 | 1.640 | −5.00 |
| 14 | 2nd area | 1.640 | 1.647 | 5.00 |
| 15 | | 1.647 | 1.710 | −3.00 |
| 16 | | 1.710 | 1.740 | −3.00 |
| 17 | | 1.740 | 1.763 | −5.00 |
| 18 | | 1.763 | 1.810 | −3.00 |
| 19 | | 1.810 | 1.852 | −3.00 |
| 20 | | 1.852 | 1.887 | −3.00 |
| 21 | | 1.887 | 1.923 | −8.00 |
| 22 | | 1.923 | 1.954 | −3.00 |
| 23 | | 1.954 | 1.982 | −3.00 |
| 24 | | 1.982 | 2.008 | −3.00 |
| 25 | | 2.008 | 2.015 | −3.00 |
| 26 | 3rd area | 2.015 | 2.029 | −1.11 |
| 27 | | 2.029 | 2.039 | −1.00 |
| 28 | | 2.039 | 2.050 | −1.00 |
| 29 | | 2.050 | 2.059 | −1.00 |
| 30 | | 2.059 | 2.069 | −1.00 |
| 31 | | 2.069 | 2.080 | −1.00 |

As described above, the different phase shifting structures are respectively formed in the areas on the surfaces 11. Therefore, the changing amounts in an optical path length given to the first laser beam are different between the areas, as shown in Table 74.

As shown in Table 74, in the first area, the changing amount in an optical path length given to the first laser beam by each step between adjacent annular zones is $-5\lambda$ ($\lambda$: a wavelength of the first laser beam) or $2\lambda$. That is, in this example, "$i_A$"=5, "$i_B$"=2 and $\Delta_A = \Delta_B = 0$.

In the second area, the changing amount in an optical path length given to the first laser beam by each step between adjacent annular zones is $\pm 5\lambda$ or $-3\lambda$. That is, in this example, "$i_A$"=5, "$i_B$"=3 and $\Delta_A = \Delta_B = 0$.

In the third area, the changing amount in an optical path length given to the second laser beam by each step between adjacent annular zones is $-1\lambda$ ($\lambda$: a wavelength of the second laser beam). In this example, a step formed at a boundary between the annular zones #20 and #21 is a special step.

Figure 34A:
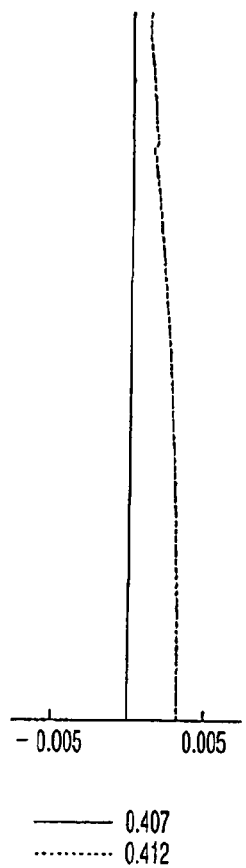
FIG. 34A is a graph illustrating a spherical aberration caused in an optical disc drive according to a thirteenth example when the first laser beam is used.
Figure 34B:
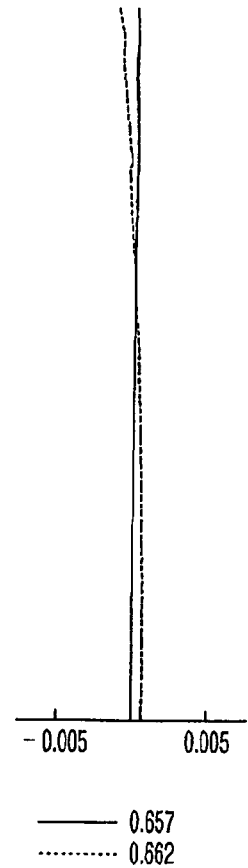
FIG. 34B is a graph illustrating the spherical aberration caused in the optical disc drive according to the thirteenth example when the second laser beam is used.
Figure 34C:
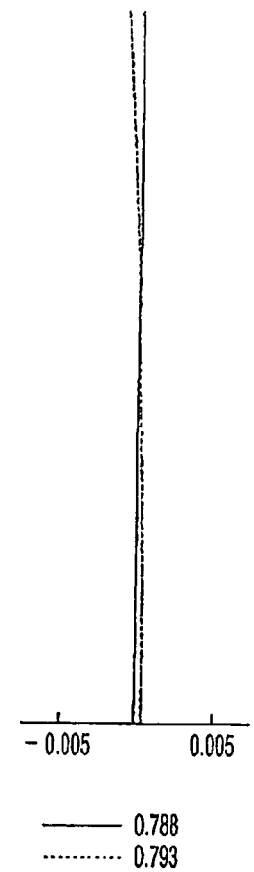
FIG. 34C is a graph illustrating the spherical aberration caused in the optical disc drive according to the thirteenth example when the third laser beam is used.

FIG. 34A is a graph illustrating the spherical aberration caused in the optical disc drive when the first laser beam (i.e., the optical disc D1) is used. FIG. 34B is a graph illustrating the spherical aberration caused in the optical disc drive when the second laser beam (i.e., the optical disc D2) is used. FIG. 34C is a graph illustrating the spherical aberration caused in the optical disc drive when the third laser beam (i.e., the optical disc D3) is used.

As can be seen from FIGS. 34A to 34C, the objective lens 10D according to the thirteenth example is able to suitably converge the first, second and third laser beams on the recording surfaces 22 of the optical discs D1, D2 and D3, respectively, without causing the spherical aberration. As shown in FIGS. 34A to 34C, the change of the spherical aberration caused by the wavelength shift is also suppressed. As shown in FIG. 34C, the change of the spherical aberration caused when the wavelength of the third laser beam shifts from the design wavelength is suppressed to an extremely low level (i.e., almost no aberration is caused when the optical disc D3 is used).

Fourteenth Example

Hereafter, a fourteenth example will be described. The objective lens 10D according to the fourteenth example is provided with a phase shifting structure producing three different changing amounts in an optical path length. Performance specifications of the objective lens 10D according to the fourteenth example are shown in Table 75.

TABLE 75

|  | First laser beam | Second laser beam | Third laser beam |
|---|---|---|---|
| Design wavelength (nm) | 408 | 660 | 790 |
| focal length (mm) | 3.100 | 3.204 | 3.223 |
| NA | 0.650 | 0.599 | 0.509 |
| magnification | 0.000 | 0.000 | 0.000 |

As shown by the values of the magnification in Table 75, the first, second and third laser beams are incident on the objective lens 10D as collimated beams, respectively.

Table 76 shows a numerical configuration of the optical disc drive according to the fourteenth example when the optical disc D1 is used. Table 77 shows a numerical configuration of the optical disc drive according to the fourteenth example when the optical disc D2 is used. Table 78 shows a numerical configuration of the optical disc drive according to the fourteenth example when the optical disc D3 is used.

TABLE 76

| surface No. | r | d | n(408 nm) |
|---|---|---|---|
| 0 |  | ∞ |  |
| 1 | 1.902 | 1.97 | 1.52424 |
| 2 | −7.187 | 1.63 |  |
| 3 | ∞ | 0.60 | 1.62110 |
| 4 | ∞ | — |  |

TABLE 77

| surface No. | r | d | n(660 nm) |
|---|---|---|---|
| 0 |  | ∞ |  |
| 1 | 1.902 | 1.97 | 1.50635 |
| 2 | −7.187 | 1.71 |  |
| 3 | ∞ | 0.60 | 1.57961 |
| 4 | ∞ | — |  |

TABLE 78

| surface No. | r | d | n(790 nm) |
|---|---|---|---|
| 0 |  | ∞ |  |
| 1 | 1.902 | 1.97 | 1.50313 |
| 2 | −7.187 | 1.34 |  |
| 3 | ∞ | 1.20 | 1.57307 |
| 4 | ∞ | — |  |

Each of the first and second surfaces #11 and #12 of the objective lens 10D is an aspherical surface. Table 79 shows the conical coefficient and aspherical coefficients of the first and second surfaces 11 and 12 (surfaces #1 and #2) of the objective lens 10D.

TABLE 79

| Surface No. | K | A4 | A6 | A8 | A10 | A12 | A14 |
|---|---|---|---|---|---|---|---|
| 1 | −0.6000 | 2.31426E−03 | −1.00171E−03 | 8.71258E−05 | −1.33877E−06 | −6.32427E−07 | 0.00000E+00 |
| 2 | 0.0000 | 1.69167E−02 | −4.35204E−03 | 8.12297E−04 | −9.44584E−05 | 5.07626E−06 | 0.00000E+00 |

In this example, a phase shifting structure is formed on the first surface 11 of the objective lens 10D. Table 80 shows coefficients $P_{2i}$ for OPD functions which define the phase shifting structure to be formed on the first surface 11 of the objective lens 10D. Table 81 shows diffraction orders m (at which the laser beams take the respective maximum diffraction efficiencies) for each the first to third OPD functions.

TABLE 80

| Surface No. | | P2 | P4 | P6 | P8 | P10 | P12 |
|---|---|---|---|---|---|---|---|
| 1 | 1st OPD Function | 0.00000E+00 | 1.57544E−01 | −1.80805E−01 | 3.15086E−02 | 0.00000E+00 | 0.00000E+00 |
|   | 2nd OPD Function | 0.00000E+00 | −8.84867E−01 | −6.34226E−02 | −1.23711E−02 | 0.00000E+00 | 0.00000E+00 |
|   | 3rd OPD Function | 0.00000E+00 | 4.62865E−01 | −1.15802E−01 | 2.12137E−02 | 0.00000E+00 | 0.00000E+00 |

TABLE 81

| wavelength [nm] | 1st laser beam | 2nd laser beam | 3rd laser beam |
|---|---|---|---|
| 1st OPD Function | 2 | 1 | 1 |
| 2nd OPD Function | 3 | 2 | 2 |
| 3rd OPD Function | 8 | 5 | 4 |

Table 82 shows the phase shifting structure formed on the first surface 11 of the objective lens 10D. In Table 82, the changing amounts in an optical path length are shown with respect to the wavelength of the first laser beams.

TABLE 82

| No. | hmin | hmax | changing amount in an optical path length |
|---|---|---|---|
| 0 | 0.000 | 0.855 | |
| 1 | 0.855 | 1.089 | −2.78 |
| 2 | 1.089 | 1.112 | 8.00 |
| 3 | 1.112 | 1.253 | −2.78 |
| 4 | 1.253 | 1.354 | −2.78 |
| 5 | 1.354 | 1.433 | −2.78 |
| 6 | 1.433 | 1.482 | −2.78 |
| 7 | 1.482 | 1.499 | 8.00 |
| 8 | 1.499 | 1.525 | −2.78 |
| 9 | 1.525 | 1.555 | 2.00 |
| 10 | 1.555 | 1.605 | −2.78 |
| 11 | 1.605 | 1.649 | −2.78 |
| 12 | 1.649 | 1.689 | −2.78 |
| 13 | 1.689 | 1.692 | −2.78 |
| 14 | 1.692 | 1.726 | 8.00 |
| 15 | 1.726 | 1.760 | −2.78 |
| 16 | 1.760 | 1.791 | −2.78 |
| 17 | 1.791 | 1.820 | −2.78 |
| 18 | 1.820 | 1.829 | −2.78 |
| 19 | 1.829 | 1.847 | 8.00 |
| 20 | 1.847 | 1.873 | −2.78 |
| 21 | 1.873 | 1.897 | −2.78 |
| 22 | 1.897 | 1.920 | −2.78 |
| 23 | 1.920 | 1.928 | −2.78 |
| 24 | 1.928 | 1.942 | 8.00 |
| 25 | 1.942 | 1.963 | −2.78 |
| 26 | 1.963 | 1.983 | −2.78 |
| 27 | 1.983 | 2.002 | −2.78 |
| 28 | 2.002 | 2.015 | 5.22 |

As shown in Table 82, in the first area, the changing amount in an optical path length given to the first laser beam by each step between adjacent annular zones is −3λ, −2λ or 8λ. That is, in this example, "$i_A$"=3, "$i_B$"=2, "$i_C$"=8, $\Delta_A$=0.22 and $\Delta_B$=$\Delta_C$=0. A step formed at a boundary between the annular zones #27 and #28 is a special step which produces the changing mount as a sum of the two different changing amounts in an optical path length obtained at $i_A$=3 and $i_C$=8.

Figure 35A:
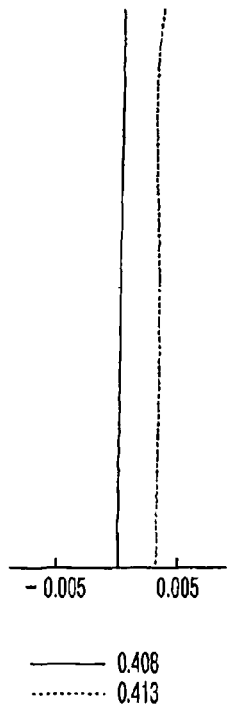
FIG. 35A is a graph illustrating a spherical aberration caused in an optical disc drive according to a fourteenth example when the first laser beam is used.
Figure 35B:
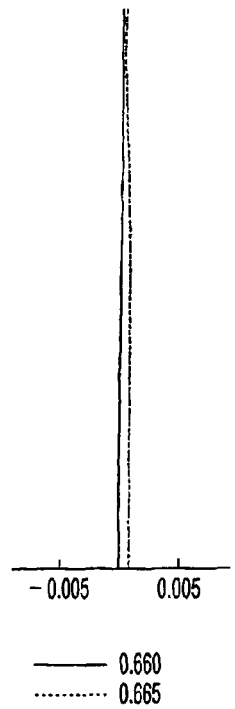
FIG. 35B is a graph illustrating the spherical aberration caused in the optical disc drive according to the fourteenth example when the second laser beam is used.
Figure 35C:
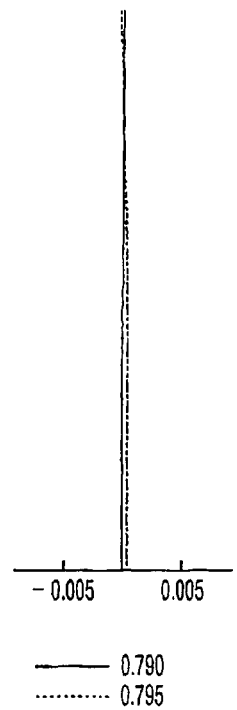
FIG. 35C is a graph illustrating the spherical aberration caused in the optical disc drive according to the fourteenth example when the third laser beam is used.

FIG. 35A is a graph illustrating the spherical aberration caused in the optical disc drive when the first laser beam (i.e., the optical disc D1) is used. FIG. 35B is a graph illustrating the spherical aberration caused in the optical disc drive when the second laser beam (i.e., the optical disc D2) is used. FIG. 35C is a graph illustrating the spherical aberration caused in the optical disc drive when the third laser beam (i.e., the optical disc D3) is used.

As can be seen from FIGS. 35A to 35C, the objective lens 10D according to the fourteenth example is able to suitably converge the first, second and third laser beams on the recording surfaces 22 of the optical discs D1, D2 and D3, respectively, without causing the spherical aberration. The phase shifting structure has steps producing three different changing amounts in an optical path length. That is, the objective lens 10D according to the fourteenth example has the three wavelength compatibility function and the wavelength shift compensation function. As shown in FIGS. 35A to 35C, the change of the spherical aberration caused by the wavelength shift when each of the optical discs D1, D2 and D3 is used is sufficiently suppressed, and the spherical aberration is kept at a sufficiently corrected level.

Fifteenth Example

Hereafter, a fifteenth example will be described. The objective lens 10D according to the fifteenth example is provided with a phase shifting structure producing three different changing amounts in an optical path length. Performance specifications of the objective lens 10D according to the fifteenth example are shown in Table 84.

TABLE 83

| | First laser beam | Second laser beam | Third laser beam |
|---|---|---|---|
| Design wavelength (nm) | 408 | 660 | 790 |
| focal length (mm) | 3.000 | 3.092 | 3.101 |
| NA | 0.650 | 0.631 | 0.510 |
| magnification | 0.000 | 0.000 | 0.000 |

As shown by the values of the magnification in Table 83, the first, second and third laser beams are incident on the objective lens 10D as collimated beams, respectively.

Table 84 shows a numerical configuration of the optical disc drive according to the fifteenth example when the optical disc D1 is used. Table 85 shows a numerical configuration the optical disc drive according to the fifteenth example when the optical disc D2 is used. Table 86 shows a numerical configuration of the optical disc drive according to the fifteenth example when the optical disc D3 is used.

TABLE 84

| surface No. | r | d | n(408 nm) |
|---|---|---|---|
| 0 | ∞ | | |
| 1 (first area) | 1.880 | 2.00 | 1.52424 |
| 1 (second area) | 1.900 | | |
| 2 | −6.634 | 1.51 | |
| 3 | ∞ | 0.60 | 1.62110 |
| 4 | ∞ | — | |

TABLE 85

| surface No. | r | d | n(660 nm) |
|---|---|---|---|
| 0 | ∞ | | |
| 1 (first area) | 1.880 | 2.00 | 1.50635 |
| 1 (second area) | 1.900 | | |
| 2 | −6.634 | 1.58 | |
| 3 | ∞ | 0.60 | 1.57961 |
| 4 | ∞ | — | |

TABLE 86

| surface No. | r | d | n(790 nm) |
|---|---|---|---|
| 0 | ∞ | | |
| 1 (first area) | 1.880 | 2.00 | 1.50313 |
| 1 (second area) | 1.900 | | |
| 2 | −6.634 | 1.21 | |
| 3 | ∞ | 1.20 | 1.57307 |
| 4 | ∞ | — | |

The surface 11 of the objective lens 10 is provided with a first area in which a phase shifting structure producing three different changing amounts in an optical path length is formed, and a second area in which a phase shifting structure producing three different changing amounts in an optical path length and having a function as an aperture stop for the third laser beam is formed. The first and second areas are formed in the following ranges of height h indicated with respect to the optical axis.

First area: $h \leq 1.580$
Second area: $1.580 < h \leq 1.950$

Each of the of the first and second surfaces #11 and #12 of the objective lens 10D is an aspherical surface. Table 87 shows the conical coefficient and aspherical coefficients of the first and second surfaces 11 and 12 (surfaces #1 and #2) of the objective lens 10D. As shown in Table 88, the shapes of the aspherical surfaces of the first and second areas are different from each other.

TABLE 87

| Surface No. | K | A4 | A6 | A8 | A10 | A12 | A14 |
|---|---|---|---|---|---|---|---|
| 1 (first area) | −0.6000 | 8.99290E−05 | 9.68944E−08 | −1.80648E−05 | 9.58597E−06 | −5.65629E−06 | 0.00000E+00 |
| 1 (second area) | −0.6000 | 3.79069E−03 | −1.12645E−03 | 2.77437E−04 | −4.82937E−05 | −4.76162E−07 | 0.00000E+00 |
| 2 | 0.0000 | 1.71169E−02 | −2.47311E−03 | −2.31135E−04 | 1.25232E−04 | −1.23453E−05 | 0.00000E+00 |

In this example, a phase shifting structure is formed on the first surface 11 of the objective lens 10D. Table 88 shows coefficients $P_{2i}$ for OPD functions which define the phase shifting structure to be formed on the first surface 11 of the objective lens 10D. Table 89 shows diffraction orders m (at which the laser beams take the respective maximum diffraction efficiencies) for each the OPD functions.

TABLE 88

| Surface No. | | P2 | P4 | P6 | P8 | P10 | P12 |
|---|---|---|---|---|---|---|---|
| 1 (first area) | 1st OPD Function | 3.25083E+00 | 8.46715E−01 | 1.58812E−01 | 2.28451E−03 | 0.00000E+00 | 0.00000E+00 |
| | 2nd OPD Function | −2.50000E+00 | −1.04426E+00 | −1.19818E−01 | −7.18440E−03 | 0.00000E+00 | 0.00000E+00 |
| | 3rd OPD Function | 0.00000E+00 | 2.84070E−01 | 1.81025E−02 | 2.91708E−03 | 0.00000E+00 | 0.00000E+00 |
| 1 (second area) | 1st OPD Function | −3.19849E+00 | −7.75735E−01 | −5.47251E−03 | −2.40359E−02 | 0.00000E+00 | 0.00000E+00 |
| | 2nd OPD Function | 0.00000E+00 | 1.05805E+00 | −2.37767E−01 | 3.06603E−02 | 0.00000E+00 | 0.00000E+00 |

TABLE 89

| surface No. | | 1st laser beam | 2nd laser beam | 3rd laser beam |
|---|---|---|---|---|
| 1 (first area) | 1st OPD Function | 2 | 1 | 1 |
| | 2nd OPD Function | 5 | 3 | 3 |
| | 3rd OPD Function | 8 | 5 | 4 |
| 1 (second area) | 1st OPD Function | 3 | 2 | — |
| | 2nd OPD Function | 5 | 3 | — |

Since the coefficient P2 takes a value which is not equal to zero in each of the first and second areas as shown in Table 88, the curvature radii "r" of the first and second areas are different from each other (see Tables 84 to 86).

As shown in Table 89, the diffraction orders m of each OPD function vary depending on the area and the laser beam being used. More specifically, the phase shifting structure in the first area is configured such that although the diffraction orders m vary among the OPD functions, the phase shifting structure contributes to converging each of the first to third laser beams. The phase shifting structure in the second area is configured to contribute to converging each of the first and second laser beams.

Table 90 shows the phase shifting structure formed on the first surface 11 of the objective lens 10D. In Table 90, the changing amounts in an optical path length are shown with respect to the wavelength of the first laser beams.

TABLE 90

| No. | area | hmin | hmax | changing amount in an optical path length |
|---|---|---|---|---|
| 0 | 1 | 0.000 | 0.385 | |
| 1 | | 0.385 | 0.431 | 2.05 |
| 2 | | 0.431 | 0.643 | −4.95 |
| 3 | | 0.643 | 0.702 | 2.05 |
| 4 | | 0.702 | 0.804 | −4.95 |
| 5 | | 0.804 | 0.864 | 2.05 |
| 6 | | 0.864 | 0.925 | −4.95 |
| 7 | | 0.925 | 0.982 | 2.05 |
| 8 | | 0.982 | 1.022 | −4.95 |
| 9 | | 1.022 | 1.077 | 2.05 |
| 10 | | 1.077 | 1.103 | −4.95 |
| 11 | | 1.103 | 1.125 | 2.05 |
| 12 | | 1.125 | 1.155 | 8.05 |
| 13 | | 1.155 | 1.173 | −4.95 |
| 14 | | 1.173 | 1.222 | 2.05 |
| 15 | | 1.222 | 1.235 | −4.95 |
| 16 | | 1.235 | 1.281 | 2.05 |
| 17 | | 1.281 | 1.290 | −4.95 |
| 18 | | 1.290 | 1.334 | 2.05 |
| 19 | | 1.334 | 1.340 | −4.95 |
| 20 | | 1.340 | 1.381 | 2.05 |
| 21 | | 1.381 | 1.425 | −2.90 |
| 22 | | 1.425 | 1.454 | −2.90 |
| 23 | | 1.454 | 1.465 | 8.05 |
| 24 | | 1.465 | 1.501 | −2.90 |
| 25 | | 1.501 | 1.536 | −2.90 |
| 26 | | 1.536 | 1.568 | −2.90 |
| 27 | | 1.568 | 1.580 | −2.90 |
| 28 | 2 | 1.580 | 1.604 | 5.05 |
| 29 | | 1.604 | 1.626 | −2.95 |
| 30 | | 1.626 | 1.637 | 5.05 |
| 31 | | 1.637 | 1.669 | −2.95 |
| 32 | | 1.669 | 1.699 | −2.95 |
| 33 | | 1.699 | 1.727 | −2.95 |
| 34 | | 1.727 | 1.754 | 2.10 |
| 35 | | 1.754 | 1.780 | −2.95 |
| 36 | | 1.780 | 1.804 | −2.95 |
| 37 | | 1.804 | 1.808 | −2.95 |
| 38 | | 1.808 | 1.827 | 5.05 |
| 39 | | 1.827 | 1.849 | −2.95 |
| 40 | | 1.849 | 1.870 | −2.95 |
| 41 | | 1.870 | 1.880 | −2.95 |

TABLE 90-continued

| No. | area | hmin | hmax | changing amount in an optical path length |
|---|---|---|---|---|
| 42 | | 1.880 | 1.890 | 5.05 |
| 43 | | 1.890 | 1.910 | −2.95 |
| 44 | | 1.910 | 1.928 | −2.95 |
| 45 | | 1.928 | 1.946 | −2.95 |
| 46 | | 1.946 | 1.950 | 2.10 |

Since the phase shifting structures formed in the first and second areas are different from each other, the changing amounts in an optical path length given by each step to the first laser beam vary among the areas (see Table 90). As shown in Table 90, in the first area, the changing amount in an optical path length given to the first laser beam by each step between adjacent annular zones is −5λ, 2λ or 8λ. That is, in this example, "$i_A$"=5, "$i_B$"=2, "$i_C$"=8 and $\Delta_A = \Delta_B = \Delta_C = 0.05$. In second area, that the changing amount in an optical path length is ±5λ or −3λ. That is, in this example, "$i_A$"=5, "$i_B$"=3 and $\Delta_A = \Delta_B = 0$.

In the first area, steps formed at a boundary between the annular zones #20 and #21, a boundary between the annular zones #21 and #22, and boundaries between the adjacent annular zones from #23 to #27 are formed as special steps which produce the changing mounts as a sum of the two different changing amounts in an optical path length obtained at $i_A$=5 and $i_C$=8. In the second area, steps formed at a boundary between the annular zones #33 and #34 and a boundary between the annular zones #45 and #46 are formed as special steps which produce the changing mounts as a sum of the two different changing amounts in an optical path length.

Figure 36A:
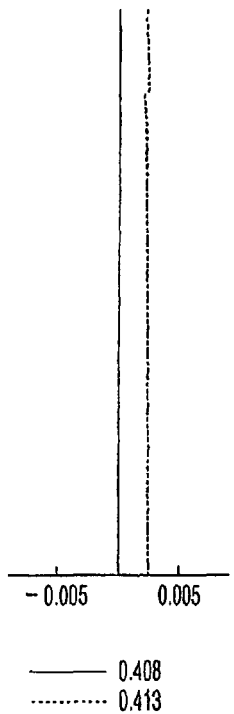
FIG. 36A is a graph illustrating a spherical aberration caused in an optical disc drive according to a fifteenth example when the first laser beam is used.
Figure 36B:
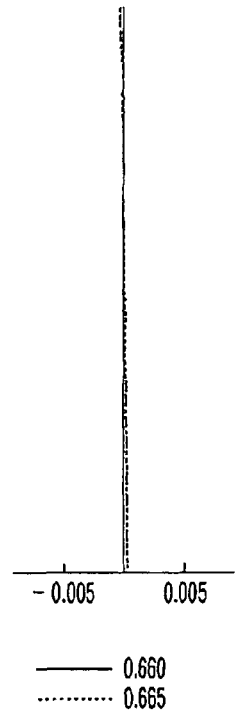
FIG. 36B is a graph illustrating the spherical aberration caused in the optical disc drive according to the fifteenth example when the second laser beam is used.
Figure 36C:
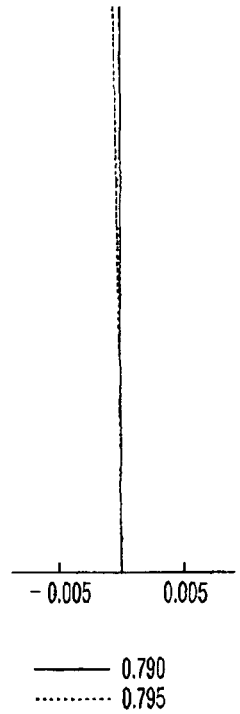
FIG. 36C is a graph illustrating the spherical aberration caused in the optical disc drive according to the fifteenth example when the third laser beam is used.

FIG. 36A is a graph illustrating the spherical aberration caused in the optical disc drive when the first laser beam (i.e., the optical disc D1) is used. FIG. 36B is a graph illustrating the spherical aberration caused in the optical disc drive when the second laser beam (i.e., the optical disc D2) is used. FIG. 36C is a graph illustrating the spherical aberration caused in the optical disc drive when the third laser beam (i.e., the optical disc D3) is used.

As can be seen from FIGS. 36A to 36C, the objective lens 10D according to the fifteenth example is able to suitably converge the first, second and third laser beams on the recording surfaces 22 of the optical discs D1, D2 and D3, respectively, without causing the spherical aberration. As shown in FIGS. 36A to 36C, the change of the spherical aberration caused by the wavelength shift when each of the optical discs D1, D2 and D3 is used is sufficiently suppressed. As shown in FIG. 36C, the change of the spherical aberration caused when the wavelength of the third laser beam shifts from the design wavelength is suitably suppressed, and the spherical aberration is constantly kept at a sufficiently corrected level.

Sixteenth Example

Hereafter, a sixteenth example will be described. The objective lens 10D according to the sixteenth example is provided with a phase shifting structure producing three different changing amounts in an optical path length. Performance specifications of the objective lens 10D according to the sixteenth example are shown in Table 91.

TABLE 91

|  | First laser beam | Second laser beam | Third laser beam |
|---|---|---|---|
| Design wavelength (nm) | 408 | 660 | 790 |
| focal length (mm) | 3.000 | 3.098 | 3.117 |
| NA | 0.650 | 0.600 | 0.510 |
| magnification | 0.000 | 0.000 | 0.000 |

As shown by the values of the magnification in Table 91, the first, second and third laser beams are incident on the objective lens 10D as collimated beams, respectively.

Table 92 shows a numerical configuration of the optical disc drive according to the sixteenth example when the optical disc D1 is used. Table 93 shows a numerical configuration of the optical disc drive according to the sixteenth example when the optical disc D2 is used. Table 94 shows a numerical configuration of the optical disc drive according to the sixteenth example when the optical disc D3 is used.

TABLE 92

| surface No. | r | d | n(408 nm) |
|---|---|---|---|
| 0 | ∞ |  |  |
| 1 | 1.895 | 2.20 | 1.52424 |
| 2 | −5.555 | 1.43 |  |
| 3 | ∞ | 0.60 | 1.62110 |
| 4 | ∞ | — |  |

TABLE 93

| surface No. | r | d | n(660 nm) |
|---|---|---|---|
| 0 | ∞ |  |  |
| 1 | 1.895 | 2.20 | 1.50635 |
| 2 | −5.555 | 1.51 |  |
| 3 | ∞ | 0.60 | 1.57961 |
| 4 | ∞ | — |  |

TABLE 94

| surface No. | r | d | n(790 nm) |
|---|---|---|---|
| 0 | ∞ |  |  |
| 1 | 1.895 | 2.20 | 1.50313 |
| 2 | −5.555 | 1.14 |  |
| 3 | ∞ | 1.20 | 1.57307 |
| 4 | ∞ | — |  |

Each of the first and second surfaces #11 and #12 of the objective lens 10D is an aspherical surface. Table 95 shows the conical coefficient and aspherical coefficients of the first and second surfaces 11 and 12 (surfaces #1 and #2) of the objective lens 10D.

TABLE 95

| Surface No. | K | A4 | A6 | A8 | A10 | A12 | A14 |
|---|---|---|---|---|---|---|---|
| 1 | −0.6000 | 6.86002E−03 | −1.01701E−03 | 1.04314E−04 | −1.42884E−05 | 3.48775E−06 | 0.00000E+00 |
| 2 | 0.0000 | 2.78102E−02 | −9.32131E−03 | 2.70529E−03 | −4.74103E−04 | 3.63962E−05 | 0.00000E+00 |

In this example, a phase shifting structure is formed on the first surface 11 of the objective lens 10D. Table 96 shows coefficients $P_{2i}$ for first to third OPD functions which define the phase shifting structure to be formed on the first surface 11 of the objective lens 10D. Table 97 shows diffraction orders m (at which the laser beams take the respective maximum diffraction efficiencies) for each the first to third OPD functions. In this example, the diffraction order at which the third laser beam takes the maximum efficiency is represented by "k".

TABLE 96

| Surface No. |  | P2 | P4 | P6 | P8 | P10 | P12 |
|---|---|---|---|---|---|---|---|
| 1 | 1st OPD Function | 0.00000E+00 | 1.89876E+00 | 3.66667E−02 | 4.45187E−02 | 0.00000E+00 | 0.00000E+00 |
|  | 2nd OPD Function | 0.00000E+00 | 1.09707E+00 | 4.90843E−02 | 1.90835E−02 | 0.00000E+00 | 0.00000E+00 |
|  | 3rd OPD Function | 0.00000E+00 | −1.12837E−02 | −2.00016E−01 | 2.68634E−03 | 0.00000E+00 | 0.00000E+00 |

TABLE 97

|  | $1^{st}$ laser beam | $2^{nd}$ laser beam | $3^{rd}$ laser beam |
|---|---|---|---|
| $1^{st}$ OPD Function | 2 | 1 | 1 |
| $2^{nd}$ OPD Function | 3 | 2 | 1 |
| $3^{rd}$ OPD Function | 10 | 6 | 5 |

Table 98 shows the phase shifting structure formed on the first surface 11 of the objective lens 10D. In Table 98, the changing amounts in an optical path length are shown with respect to the wavelength of the first laser beams.

TABLE 98

| No. | hmin | hmax | changing amount in an optical path length |
|---|---|---|---|
| 0 | 0.000 | 0.714 |  |
| 1 | 0.714 | 0.814 | 2.00 |
| 2 | 0.814 | 0.935 | 2.90 |
| 3 | 0.935 | 1.058 | 2.00 |
| 4 | 1.058 | 1.063 | 2.00 |
| 5 | 1.063 | 1.147 | 2.90 |
| 6 | 1.147 | 1.160 | 2.00 |
| 7 | 1.160 | 1.200 | −10.00 |
| 8 | 1.200 | 1.217 | 2.90 |
| 9 | 1.217 | 1.276 | 2.00 |
| 10 | 1.276 | 1.298 | 2.00 |
| 11 | 1.298 | 1.326 | 2.90 |
| 12 | 1.326 | 1.371 | 2.00 |
| 13 | 1.371 | 1.398 | 4.90 |
| 14 | 1.398 | 1.410 | −10.00 |
| 15 | 1.410 | 1.440 | 2.00 |
| 16 | 1.440 | 1.446 | 2.90 |
| 17 | 1.446 | 1.479 | 2.00 |
| 18 | 1.479 | 1.495 | 2.00 |
| 19 | 1.495 | 1.510 | 2.90 |
| 20 | 1.510 | 1.525 | 2.00 |
| 21 | 1.525 | 1.538 | −10.00 |
| 22 | 1.538 | 1.543 | 2.00 |
| 23 | 1.543 | 1.564 | 2.90 |
| 24 | 1.564 | 1.587 | 2.00 |
| 25 | 1.587 | 1.612 | 4.90 |
| 26 | 1.612 | 1.626 | −8.00 |
| 27 | 1.626 | 1.634 | 2.90 |
| 28 | 1.634 | 1.655 | 2.00 |
| 29 | 1.655 | 1.661 | 2.00 |
| 30 | 1.661 | 1.675 | 2.90 |
| 31 | 1.675 | 1.685 | 2.00 |
| 32 | 1.685 | 1.694 | −10.00 |
| 33 | 1.694 | 1.712 | 4.90 |
| 34 | 1.712 | 1.725 | 2.00 |
| 35 | 1.725 | 1.744 | 4.90 |
| 36 | 1.744 | 1.753 | −8.00 |
| 37 | 1.753 | 1.761 | 2.90 |
| 38 | 1.761 | 1.777 | 2.00 |
| 39 | 1.777 | 1.792 | 4.90 |
| 40 | 1.792 | 1.806 | −8.00 |
| 41 | 1.806 | 1.820 | 4.90 |
| 42 | 1.820 | 1.833 | 2.00 |
| 43 | 1.833 | 1.846 | −5.10 |
| 44 | 1.846 | 1.851 | 2.00 |
| 45 | 1.851 | 1.858 | 2.90 |
| 46 | 1.858 | 1.871 | 2.00 |
| 47 | 1.871 | 1.878 | 4.90 |
| 48 | 1.878 | 1.894 | −8.00 |
| 49 | 1.894 | 1.905 | 4.90 |
| 50 | 1.905 | 1.913 | 2.00 |
| 51 | 1.913 | 1.927 | −5.10 |
| 52 | 1.927 | 1.937 | 4.90 |
| 53 | 1.937 | 1.950 | 2.00 |

As shown in Table 98, in the first area, the changing amount in an optical path length given to the first laser beam by each step between adjacent annular zones is 3λ, 2λ or −10λ. That is, in this example, "$i_A$"=3, "$i_B$"=2, "$i_C$"=10, $\Delta_A$=−0.10 and $\Delta_B=\Delta_C$=0. Steps formed at a boundary between the annular zones #12 and #13, a boundary between the annular zones #24 and #25, a boundary between the annular zones #32 and #33, a boundary between the annular zones #34 and #35, a boundary between the annular zones #38 and #39, a boundary between the annular zones #40 and #41, a boundary between the annular zones #46 and #47, a boundary between the annular zones #48 and #49, and a boundary between the annular zones #51 and #52 are special steps which produce the changing mount as a sum of the two different changing amounts in an optical path length obtained at $i_B$=2 and $i_A$=3. Steps formed at a boundary between the annular zones #25 and #26, a boundary between the annular zones #35 and #36, a boundary between the annular zones #39 and #40, a boundary between the annular zones #47 and #48 are special steps which produce the changing mount as a sum of the two different changing amounts in an optical path length obtained at $i_B$=2 and $i_C$=10. Steps formed at a boundary between the annular zones #42 and #43, a boundary between the annular zones #50 and #51 are special steps which produce the changing mount as a sum of the three different changing amounts in an optical path length obtained at $i_A$=2, $i_B$=3 and $i_C$=10.

Figure 37A:
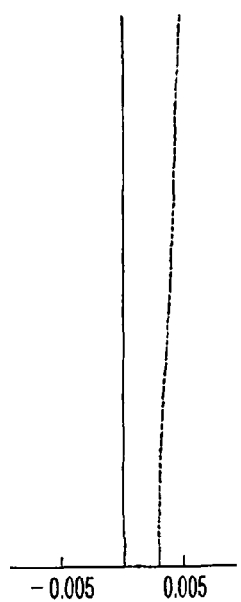
FIG. 37A is a graph illustrating a spherical aberration caused in an optical disc drive according to a sixteenth example when the first laser beam is used.
Figure 37B:
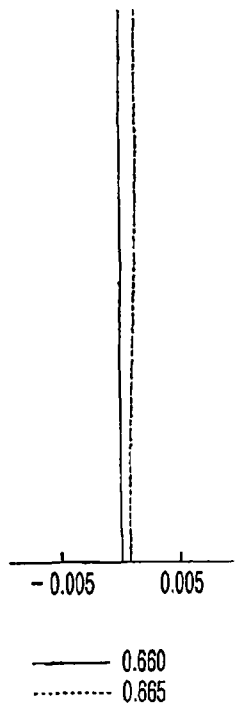
FIG. 37B is a graph illustrating the spherical aberration caused in the optical disc drive according to the sixteenth example when the second laser beam is used.
Figure 37C:
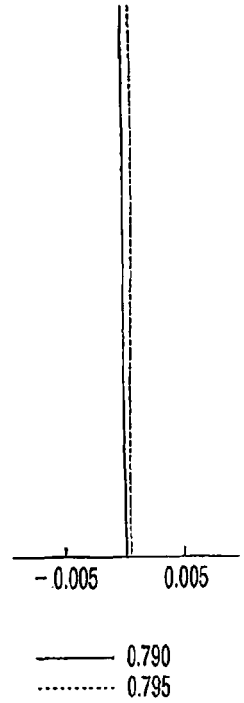
FIG. 37C is a graph illustrating the spherical aberration caused in the optical disc drive according to the sixteenth example when the third laser beam is used.

FIG. 37A is a graph illustrating the spherical aberration caused in the optical disc drive when the first laser beam (i.e., the optical disc D1) is used. FIG. 37B is a graph illustrating the spherical aberration caused in the optical disc drive when the second laser beam (i.e., the optical disc D2) is used. FIG. 37C is a graph illustrating the spherical aberration caused in the optical disc drive when the third laser beam (i.e., the optical disc D3) is used.

As can be seen from FIGS. 37A to 37C, the objective lens 10D according to the sixteenth example is able to suitably converge the first, second and third laser beams on the recording surfaces 22 of the optical discs D1, D2 and D3, respectively, without causing the spherical aberration. The phase shifting structure has steps producing three different changing amounts in an optical path length. That is, the objective lens 10D according to the sixteenth example has the three wavelength compatibility function and the wavelength shift compensation function. As shown in FIGS. 37A to 37C, the change of the spherical aberration caused by the wavelength shift when each of the optical discs D1, D2 and D3 is used is sufficiently suppressed, and the spherical aberration is kept at a sufficiently corrected level.

In the above mentioned fourteenth example, the usage efficiency of light is approximately 85% when the recording/reproducing operation for the optical disc D1 is performed (i.e., when the first laser beam is used), the usage efficiency of light is approximately 75% when the recording/reproducing operation for the optical disc D2 is performed (i.e., when the second laser beam is used), and the usage efficiency of light is approximately 56% when the recording/reproducing operation for the optical disc D3 is performed (i.e., when the third laser beam is used).

In the above mentioned fifteenth example, the usage efficiency of light is approximately 98% when the recording/reproducing operation for the optical disc D1 is performed (i.e., when the first laser beam is used), the usage efficiency of light is approximately 75% when the recording/reproducing operation for the optical disc D2 is performed (i.e., when the second laser beam is used), and the usage efficiency of light is approximately 41% when the recording/reproducing operation for the optical disc D3 is performed (i.e., when the third laser beam is used).

In the above mentioned sixteenth example, the usage efficiency of light is approximately 97% when the recording/reproducing operation for the optical disc D1 is performed (i.e., when the first laser beam is used), the usage efficiency of light is approximately 69% when the recording/reproducing operation for the optical disc D2 is performed (i.e., when the second laser beam is used), and the usage efficiency of light is approximately 51% when the recording/reproducing operation for the optical disc D3 is performed (i.e., when the third laser beam is used).

In the fourth embodiment, the objective lens is configured to satisfy the conditions depending on the diffraction order at which the diffraction efficiency for the third laser beams is maximized. Therefore, it is possible to further increase the usage efficiency of light when the each of the optical discs D1 and D2 having a higher recording density is used while keeping an enough amount of light for the recording/reproducing operation for the optical disc D3.

Possible combinations of values of "i" are not limited to those shown in the above mentioned examples. For example, if the three different changing amounts in an optical path length are brought by the phase shifting structure, a combination of values may be $i_A=5$, $i_B=2$ and $i_C=10$.

According to the fourth embodiment, the spherical aberration can be suitably suppressed for each of the optical discs D1, D2 and D3. Since the collimated beam is used for each of the optical discs D1, D2 and D3, the objective lens (optical disc drive) according to the fourth embodiment is able to sufficiently suppress aberrations caused during the tracking operation as well as the spherical aberration. That is, according to the fourth embodiment, an objective lens (and an optical disc drive) capable of forming a beam spot suitable for each of the three types of optical discs based on different standards can be obtained.

Although the present invention has been described in considerable detail with reference to certain preferred embodiments thereof, other embodiments are possible.

It should be understood that the objective lens designed by the design method according to the invention is not limited to those shown in the above mentioned embodiments. For example, the above mentioned objective lens may be configured as an objective lens system including a plurality of optical elements. If the objective lens is configured as an objective lens system including a plurality of optical elements, an optical element in the objective lens system may have phase shifting structures on its both surfaces, respectively.

The optical disc drive does not necessarily require the spherical aberration, which is corrected by the two (or three) wavelength compatibility function, to be suppressed to zero. Therefore, a designer is allowed to adjust the above mentioned design method so that the two or three wavelength compatibility function suppressing the spherical aberration to a sufficiently low level can be attained. The optical disc drive does not necessarily require the change of the spherical aberration due to the wavelength shift to be cancelled completely. Therefore, a designer is allowed to adjust the above mentioned design method so that the change of the spherical aberration due to the wavelength shift can be suppressed to a sufficiently low level.

This application claims priority of Japanese Patent Applications No. 2004-348943, filed on Dec. 1, 2004, and No. 2005-114599, filed on Apr. 12, 2005. The entire subject matters of the applications are incorporated herein by reference.

What is claimed is:

1. A method of designing an optical element having a diffraction function to be used for an optical disc drive in which each of a plurality of light beams having different design wavelengths passes through the optical element, the optical drive configured to record data to and/or reproduce data from each of first and second optical discs based on different standards, by selectively using a first light beam of the plurality of light beams having a first design wavelength for the first optical disc and a second light beam of the plurality of light beams having a second design wavelength, different from the first design wavelength, for the second optical disc, the method comprising:

determining at least two types of optical path difference functions including first and second optical path difference functions in such a manner that:

proportion, brought by the first optical path difference function, between diffraction orders at which diffraction efficiencies of the plurality of light beams are maximized is different from proportion, brought by the second optical path difference function, between diffraction orders at which diffraction efficiencies of the plurality of light beams are maximized, wherein the proportion brought by the first optical path difference function is determined such that each of the plurality of light beams is used as diffracted light, and the proportion brought by the second optical path difference function is determined such that each of the plurality of light beams is used as diffracted light, and a plurality of types of optical path difference functions including the at least two types of optical path difference functions having the same kind of function which is a function of correcting spherical aberration, are determined such that a sum of additional optical path lengths defined by the plurality of types of optical path difference functions corrects a spherical aberration caused when a corresponding one of the first and second optical discs is used; and obtaining a combined shape by combining shapes respectively defined by the determined plurality of types of optical path difference functions having the same kind of function which is a function of correcting spherical aberration, and the combined shape is applied to the at least one surface of surfaces of the optical element.

2. The method according to claim 1, wherein:

the at least one surface to which the shape is applied is divided into an inner area including an optical axis of the optical element and an outer area situated outside the inner area; and the determining step is applied separately to the inner and the outer areas and the obtaining step is applied separately to the inner and outer areas so that diffracting structures having different diffracting functions are formed in the inner and outer areas, respectively.

3. The method according to claim 2, wherein a diffracting structure having the shape obtained by the obtaining step is symmetrical about an optical axis of the optical element.

4. The method according to claim 1, wherein:

the shape is obtained as a diffracting structure by the obtaining step;

a first diffraction function of adjusting a spherical aberration, caused when the first optical disc is used, to a desired value and adjusting a spherical aberration, caused when the second optical disc is used, to a desired value is principally given to the diffracting structure by the first optical path difference function; and a second diffraction function of adjusting change of a spherical aberration caused by a wavelength shift which occurs when at least one of the first and second optical discs is used is principally given to the diffracting structure by the second optical path difference function.

5. The method according to claim 4, wherein:

by the first diffraction function, the diffracting structure generates an aberration having a direction in which each of the spherical aberration caused when the first optical disc is used and the spherical aberration caused when the second optical disc is used is corrected; and by the second diffraction function, the diffracting structure decreases change of the spherical aberration caused by the wavelength shift in which a wavelength of the first light beam shifts from the first design wavelength when the first optical disc is used.

6. The method according to claim 4, wherein the first diffraction function, in which the spherical aberrations caused when the first and second optical discs are used are adjusted, is determined under a condition in which each of the first and second light beams is incident on the optical element as a collimated beam.

7. The method according to claim 6, wherein:

the optical disc drive is configured to be capable of recording data to and/or reproducing data from a third optical disc based on a standard different from the standards of the first and second optical discs, by using a third light beam having a third design wavelength, different from the wavelengths of the first and second light beams, for the third optical disc; and the first and second optical path difference functions are determined separately so that a spherical aberration caused when each of the first, second and third optical discs is used is adjusted to a desired value.

8. The method according to claim 7, wherein:

if thicknesses of cover layers of the first, second and third optical discs are defined as t1, t2 and t3, respectively, the thicknesses of the cover layers have a following relationship:

$$t1 \leq t2 < t3;$$

if a numerical aperture suitable for recording data to and/or reproducing data from the first optical disc is defined as NA1, a numerical aperture suitable for recording data to and/or reproducing data from the second optical disc is defined as NA2, and a numerical aperture suitable for recording data to and/or reproducing data from the third optical disc is defined as NA3, the NA1, NA2 and NA3 have a relationship:

NA1>NA3 and NA2>NA3;

the first design wavelength of the first light beam is the shortest of all of the first, second and third design wavelengths;

the second design wavelength of the second light beam is longer than the first design wavelength of the first light beam; and the third design wavelength of the third light beam is the longest of all of the first, second and third design wavelengths.

9. The method according to claim 8, wherein:

the proportion, brought by the first optical path difference function, between the diffraction orders at which the diffraction efficiencies of the first, second and third light beams are maximized, respectively, is represented by 2:1:1 in order of the first, second and third light beams; and the proportion, brought by the second optical path difference function, between the diffraction orders at which the diffraction efficiencies of the first, second and third light beams are maximized, respectively, is represented by 3:2:2 in order of the first, second and third light beams.

10. The method according to claim 7, further comprising:

determining a third optical path difference function giving principally to the diffracting structure a third diffraction function of adjusting change of a spherical aberration caused by a wavelength shift which occurs when at least one of the first, second and third optical discs is used.

11. The method according to claim 10, wherein:

the proportion, brought by the first optical path difference function, between the diffraction orders at which the diffraction efficiencies of the first, second and third light beams are maximized, respectively, is represented by 2:1:1 in order of the first, second and third light beams;

the proportion, brought by the second optical path difference function, between the diffraction orders at which the diffraction efficiencies of the first, second and third light beams are maximized, respectively, is represented by 3:2:2 in order of the first, second and third light beams; and the proportion, brought by the third optical path difference function, between the diffraction orders at which the diffraction efficiencies of the first, second and third light beams are maximized, respectively, is represented by 10:6:5 in order of the first, second and third light beams.

12. The method according to claim 1, wherein the optical disc drive is configured to be capable of recording data to and/or reproducing data from a third optical disc based on a standard different from the standards of the first and second optical discs, by using a third light beam having a third design wavelength, different from the wavelengths of the first and second light beams, for the third optical disc.

13. An optical disc drive, comprising:

a plurality of light source devices that respectively emit a plurality of light beams having different design wavelengths; and the optical element designed by the method according to claim 12.

14. An optical disc drive, comprising:

a plurality of light source devices that respectively emit a plurality of light beams having different design wavelengths; and the optical element designed by the method according to claim 1.

15. The optical disc drive according to claim 14, wherein:

in order to record data to and/or reproduce data from each of first and second optical discs based on different standards, a first light beam having a first design wavelength is used for the first optical disc, and a second light beam having a second design wavelength is used for the second optical disc; and in order to record data to and/or reproduce data from a third optical disc based on a standard different from the standards of the first and second optical discs, a third light beam having a third design wavelength is used for the third optical disc in such a manner that the third light beam is incident on the optical element as a diverging beam.

16. An optical element produced by the design method according to claim 1.

17. An optical disc drive, comprising the optical element according to claim 16.

18. The method according to claim 1, wherein proportions, each of which is defined between correcting effects of correcting spherical aberrations for the plurality of types of optical discs, respectively given by the plurality of types of optical path difference functions giving additional optical path lengths are different from each other.

19. The method according to claim 1,
wherein:
the combined shape has a suppressing effect of suppressing change of the spherical aberration caused when a wavelength of each of the plurality of light beams shifts from a design wavelength; and
wherein proportions, each of which is defined between suppressing effects of suppressing change of the spherical aberrations for the plurality of types of optical discs, respectively given by the plurality of types of optical path difference functions are different from each other.

20. The method according to claim 19,
wherein:
the plurality of types of optical discs include a first optical disc and a second optical disc;
shapes defined by the first and second optical path difference functions are defined as first and second shapes, respectively;
the correcting effects for correcting spherical aberrations for the plurality of types of optical discs are provided principally by the first shape; and
the suppressing effect of suppressing change of the spherical aberration is provided principally by the second shape.

21. The method according to claim 20,
wherein in the determining step, the at least two types of optical path difference functions are determined under a condition in which each of the plurality of light beams for the plurality of types of optical discs is incident on the optical element as a collimated beam.

22. The method according to claim 20,
wherein:
the plurality of types of optical discs include a third optical disc;
in the determining step, the first and second optical path difference functions are determined under a condition in which each of two of the plurality of light beams respectively used for the first and second optical discs is incident on the optical element as a collimated beam, and that one of the plurality of light beams used for the third optical disc is incident on the optical element as a diverging beam.

23. The method according to claim 1,
wherein:
the plurality of types of optical discs include first, second and third optical discs;
shapes defined by the first and second optical path difference functions are defined as first and second shapes, respectively; and
proportions, each of which is defined between correcting effects of correcting spherical aberrations for the first, second and third optical discs, respectively given by the first and second shapes are different from each other.

24. The method according to claim 23,
wherein:
the plurality of types of optical path difference functions further include a third optical path difference function;
shapes defined by the first, second and third optical path difference functions are defined as first, second and third shapes, respectively;
the correcting effects for correcting spherical aberrations for the first, second and third optical discs are provided principally by the first and second shapes; and
the suppressing effect of suppressing change of the spherical aberration is provided principally by the third shape.

25. The method according to claim 24, wherein:
the optical element is mounted on an optical disc drive configured such that:
recording data to and/or reproducing data from the first optical disc is performed by using a first light beam of the plurality of light beams, the first light beam having a first design wavelength which is the shortest of all of design wavelengths of the plurality of light beams;
recording data to and/or reproducing data from the second optical disc is performed by using a second light beam of the plurality of light beams, the second light beam having a second design wavelength which is longer than the first design wavelength of the first light beam;
recording data to and/or reproducing data from the third optical disc is performed by using a third light beam of the plurality of light beams, the third light beam having a third design wavelength which is longest of all of the first, second and third design wavelengths;
if thicknesses of cover layers of the first, second and third optical discs are defined as t1, t2 and t3, respectively, the thicknesses of the cover layers have a following relationship:

$t1 \leq t2 < t3;$ if a numerical aperture suitable for recording data to and/or reproducing data from the first optical disc is defined as NA1, a numerical aperture suitable for recording data to and/or reproducing data from the second optical disc is defined as NA2, and a numerical aperture suitable for recording data to and/or reproducing data from the third optical disc is defined as NA3, the NA1, NA2 and NA3 have a relationship:

NA1>NA3 and NA2>NA3.

26. The method according to claim 25, wherein:
the proportion, brought by the first optical path difference function, between the diffraction orders at which the diffraction efficiencies of the first, second and third light beams are maximized, respectively, is represented by 2:1:1 in order of the first, second and third light beams;
the proportion, brought by the second optical path difference function, between the diffraction orders at which the diffraction efficiencies of the first, second and third light beams are maximized, respectively, is represented by 3:2:2 in order of the first, second and third light beams; and
the proportion, brought by the third optical path difference function, between the diffraction orders at which the diffraction efficiencies of the first, second and third light beams are maximized, respectively, is represented by 10:6:5 in order of the first, second and third light beams.

27. The method according to claim 23, wherein:
the optical element is mounted on an optical disc drive configured such that:
recording data to and/or reproducing data from the first optical disc is performed by using a first light beam of the plurality of light beams, the first light beam having a first design wavelength which is the shortest of all of design wavelengths of the plurality of light beams;
recording data to and/or reproducing data from the second optical disc is performed by using a second light beam of the plurality of light beams, the second light beam having a second design wavelength which is longer than the first design wavelength of the first light beam;
recording data to and/or reproducing data from the third optical disc is performed by using a third light beam of the plurality of light beams, the third light beam having a third design wavelength which is longest of all of the first, second and third design wavelengths;

if thicknesses of cover layers of the first, second and third optical discs are defined as t1, t2 and t3, respectively, the thicknesses of the cover layers have a following relationship:

$t1 \leq t2 < t3;$ if a numerical aperture suitable for recording data to and/or reproducing data from the first optical disc is defined as NA1, a numerical aperture suitable for recording data to and/or reproducing data from the second optical disc is defined as NA2, and a numerical aperture suitable for recording data to and/or reproducing data from the third optical disc is defined as NA3, the NA1, NA2 and NA3 have a relationship:

NA1>NA3 and NA2>NA3.

28. The method according to claim 27, wherein:
the proportion, brought by the first optical path difference function, between the diffraction orders at which the diffraction efficiencies of the first, second and third light beams are maximized, respectively, is represented by 2:1:1 in order of the first, second and third light beams; and
the proportion, brought by the second optical path difference function, between the diffraction orders at which the diffraction efficiencies of the first, second and third light beams are maximized, respectively, is represented by 3:2:2 in order of the first, second and third light beams.

29. The method according to claim 1, wherein:
the at least one surface of the optical element is divided into an inner area including an optical axis of the optical element and an outer area situated outside the inner area; and
the determining step is applied separately to the inner and the outer areas and the obtaining step is applied separately to the inner and outer areas so that combined shapes different from each other are formed in the inner and outer areas, respectively.

30. The method according to claim 1, wherein the combined shape is symmetrical about an optical axis of the optical element.

31. The method according to claim 1,
wherein the optical element is used to record data to and/or reproduce data from each of a plurality of types of optical discs based on different standards, by selectively using the plurality of light beams having the different wavelengths,
wherein the determining step includes:
determining a plurality of diffraction order combinations, each of which defines a proportion of diffraction orders at which diffraction efficiencies of the plurality of light beams are maximized, such that the proportions of the plurality of diffraction order combinations are different from each other; and
determining a plurality of types of optical path difference functions including the at least two types of optical path difference functions such that a sum of additional optical path lengths defined by the plurality of types of optical path difference functions corresponding to the plurality of diffraction order combinations corrects a spherical aberration caused when a corresponding one of the plurality of types of optical discs is used,
wherein in the obtaining step, a combined shape is obtained by combining shapes respectively defined by the determined plurality of types of optical path difference functions, and the combined shape is applied to the at least one surface of surfaces of the optical element.

* * * * *